US011920389B2

(12) United States Patent
Riley

(10) Patent No.: US 11,920,389 B2
(45) Date of Patent: Mar. 5, 2024

(54) REVERSIBLE LATCHBOLT

(71) Applicant: ASSA ABLOY ACCESS AND EGRESS HARDWARE GROUP, INC., Berlin, CT (US)

(72) Inventor: Daniel W. Riley, Meriden, CT (US)

(73) Assignee: ASSA ABLOY ACCESS AND EGRESS HARDWARE GROUP, INC., Berlin, CT (US)

( * ) Notice: Subject to any disclaimer, the term of this patent is extended or adjusted under 35 U.S.C. 154(b) by 610 days.

(21) Appl. No.: 17/006,425

(22) Filed: Aug. 28, 2020

(65) Prior Publication Data

US 2021/0047871 A1 Feb. 18, 2021

Related U.S. Application Data

(63) Continuation-in-part of application No. 16/262,246, filed on Jan. 30, 2019, now Pat. No. 11,639,618.

(60) Provisional application No. 62/624,242, filed on Jan. 31, 2018.

(51) Int. Cl.
*E05C 21/00* (2006.01)
*E05C 1/08* (2006.01)

(52) U.S. Cl.
CPC ................ *E05C 21/00* (2013.01); *E05C 1/08* (2013.01); *E05Y 2900/132* (2013.01)

(58) Field of Classification Search
CPC ..... E05C 21/00; E05C 1/08; E05Y 2900/132; E05B 63/044; E05B 63/08; E05B 63/046; Y10T 292/1094; Y10T 292/1037; Y10T 292/1028; Y10T 292/0969; Y10T 292/0961
See application file for complete search history.

(56) References Cited

U.S. PATENT DOCUMENTS

| | | | |
|---|---|---|---|
| 168,986 | A | 10/1875 | Griscom |
| 197,531 | A | 11/1877 | Vetter |
| 286,580 | A | 10/1883 | Billings |

(Continued)

FOREIGN PATENT DOCUMENTS

| | | | |
|---|---|---|---|
| DE | 1938639 | A1 | 2/1971 |
| DE | 2031370 | A1 | 12/1971 |

(Continued)

OTHER PUBLICATIONS

U.S. Appl. No. 16/262,246, filed Jan. 30, 2019, Pending.
U.S. Appl. No. 62/624,242, filed Jan. 31, 2018, Expired.

*Primary Examiner* — Christine M Mills
*Assistant Examiner* — Faria F Ahmad
(74) *Attorney, Agent, or Firm* — Jeffrey R. Gray; Moore & Van Allen PLLC

(57) ABSTRACT

A latch bolt with a bolt head that is removably mounted on a latch tail through the use of a reversibility assembly, such as bolt head adjustment mechanism, or the like. The reversibility assembly may comprise one or more locking members (e.g., within the bolt head, the latch tail, tail plate, and/or independent from the other components of the latch bolt) that allow the bolt head and/or the latch tail to be removed, rotated, and reassembled without opening the case of the mortise lock. The bolt head may comprise an anti-friction latch that is configured to pivot within the flanges of the bolt head in a way that maintains contact between the anti-friction lock and the strike plate.

19 Claims, 41 Drawing Sheets

(56) References Cited

U.S. PATENT DOCUMENTS 302,657 A 7/1884 Heizmann et al.
950,108 A 2/1910 Lawrence
1,057,663 A * 4/1913 Page .................... E05B 63/044 292/244
1,126,181 A 1/1915 Cleaver
1,469,829 A 10/1923 Teich
1,514,528 A * 11/1924 Hurd ....................... E05B 85/22 292/192
1,627,420 A * 5/1927 Thomas ................ E05B 35/006 70/107
1,706,486 A * 3/1929 Casey ..................... E05B 15/10 292/164
2,107,300 A * 2/1938 Kilpatrick ............. E05B 63/127 292/192
2,516,991 A * 8/1950 Heyer ..................... E05B 55/12 70/151 R
2,673,758 A * 3/1954 Schlage ................ E05B 63/044 292/1.5
2,696,398 A * 12/1954 Teetor ..................... E05B 57/00 292/64
2,823,538 A * 2/1958 Fresard ................... E05B 55/00 70/462
3,211,486 A 10/1965 Crandell
3,235,301 A * 2/1966 Russell ................... E05B 63/04 70/462
3,242,706 A 3/1966 Check
3,257,136 A 6/1966 Russell et al.
3,361,462 A 1/1968 Foster
3,361,464 A * 1/1968 Foster ................... E05B 63/044 292/165
RE26,677 E 10/1969 Russell et al.
3,631,695 A 1/1972 Perlick et al.
3,672,714 A 6/1972 Schultz
3,750,433 A 8/1973 Sanders
3,769,822 A 11/1973 Yulkowski
3,808,849 A 5/1974 Alexander
4,071,270 A 1/1978 Alexander
4,118,056 A 10/1978 Alexander
4,243,256 A 1/1981 Frydrych
4,286,812 A 9/1981 Sprekeler
4,389,061 A 6/1983 Foshee
4,462,230 A 7/1984 Evans
4,468,059 A 8/1984 Nelson et al.
4,470,278 A 9/1984 Hale et al.
4,470,279 A 9/1984 Neary et al.
4,583,382 A 4/1986 Hull
4,674,776 A 6/1987 James
4,695,082 A * 9/1987 Marks ................... E05B 63/044 70/486
4,696,174 A 9/1987 Marks
4,798,065 A 1/1989 Deforrest, Sr.
4,817,404 A 4/1989 Eisermann et al.
4,950,005 A 8/1990 Cudd
4,988,133 A 1/1991 Shih
5,113,676 A 5/1992 Panossian
5,123,684 A 6/1992 Yeh
5,201,200 A 4/1993 Hauber
5,259,652 A 11/1993 Adams et al.
5,308,131 A 5/1994 Galindo et al.
5,395,144 A 3/1995 Galindo
5,604,970 A 2/1997 Aigner et al.
5,676,407 A 10/1997 Smallegan et al.
5,678,870 A 10/1997 Pelletier
5,813,255 A 9/1998 Tell, III et al.
6,045,169 A 4/2000 Frolov
6,125,670 A 10/2000 Fuss et al.
6,349,982 B2 2/2002 Fayngersh et al.
6,393,878 B1 5/2002 Fayngersh et al.
6,557,909 B2 5/2003 Morris
7,108,300 B2 * 9/2006 Hodgin ................. E05B 63/044 70/462
7,603,880 B2 * 10/2009 Chen ..................... E05B 13/004 70/110
8,261,584 B2 9/2012 Yang
8,292,336 B2 * 10/2012 Moon ..................... E05B 63/04 70/462
8,366,158 B2 * 2/2013 Chen ..................... E05B 15/102 292/DIG. 60
8,371,627 B2 2/2013 Chiang et al.
8,397,548 B1 3/2013 Lin
8,419,086 B2 4/2013 Moon
8,523,249 B2 * 9/2013 Hodgin ................. E05B 63/044 292/169.14
8,690,203 B1 * 4/2014 Hickman ................ E05B 55/12 292/169.15
9,957,734 B2 5/2018 Ali et al.
10,094,141 B2 10/2018 Helisten
10,208,507 B2 2/2019 Kondi et al.
10,738,514 B2 8/2020 Hickman
10,774,565 B2 9/2020 Colligan
2003/0061848 A1 * 4/2003 Morris ...................... E05C 1/16 70/107
2004/0169378 A1 * 9/2004 Hodgin ................. E05B 63/044 292/244
2006/0232078 A1 * 10/2006 Hodgin ................. E05B 63/044 292/244
2006/0243008 A1 11/2006 Etlicher
2007/0273158 A1 11/2007 Berger
2008/0246288 A1 10/2008 Hodgin et al.
2010/0263418 A1 10/2010 Moon
2011/0210566 A1 9/2011 Chen
2021/0047871 A1 2/2021 Riley

FOREIGN PATENT DOCUMENTS

DE 2136636 A1 2/1973
DE 1938639 B2 5/1978
DE 2160563 B2 9/1979
DE 2827939 A1 1/1980
NO 63812 8/1941
WO 9425709 A1 11/1994

* cited by examiner

REVERSIBLE LATCHBOLT

RELATED APPLICATIONS AND PRIORITY CLAIM

The present Application for a Patent is a is a continuation-in-part of, and claims priority to U.S. patent application Ser. No. 16/262,246 entitled "REVERSIBLE LATCHBOLT," filed on Jan. 30, 2019, which claims priority to United States Provisional Patent Application Ser. No. 62/624,242 entitled "REVERSIBLE LATCHBOLT" filed on Jan. 31, 2018 and assigned to the assignees hereof and hereby expressly incorporated by reference herein.

FIELD

This invention relates generally to mortise locks, and more particularly, to latch assemblies for use in reversible locks.

BACKGROUND

A mortise lock is designed to fit into a mortised recess formed in the edge of a door. The mortise lock generally includes a housing, or case, which encloses the lock components. One component of a mortise lock is a latch bolt that is movable in the case between an extended position and a retracted position. In the extended position a beveled bolt head projects outside of the case and beyond the edge of the door and into an opening in the door frame to latch the door in a closed position. In the retracted position the beveled bolt head is retracted into the case to permit opening of the door. The latch bolt is moved between the extended and retracted position by operation of a latch operator, such as a door knob or lever handle.

Mortise locks are typically configured so that the latch operators, mounted on the inside and outside surfaces of the door, can operate independently. The outside latch operator can either be rotated to retract the latch bolt, or locked against rotation to prevent retraction of the latch bolt. Typically, the inside latch operator can always be rotated to retract the latch bolt. The locking of the outside latch operator is usually controlled by a manual actuator, such as, for example, a push button or a pivoted toggle, which may be exposed at the edge of the mortise lock near the latch. The manual actuator has an associated link within the mortise lock case which, in a first position of the manual actuator, prevents rotation of the outside latch operator and in a second position permits rotation of the outside latch operator. The inside latch operator is usually unaffected by the manipulation of the manual actuator and remains rotatable at all times.

Adjustments must be made to the mortise lock depending on whether the lock is mounted in a left-hand or right-hand door. The mortise lock is rotated 180 degrees about a vertical axis depending on whether the lock is mounted in a left-hand or right-hand door. The latch bolt must also be rotated 180 degrees about a horizontal axis so that the beveled face of the bolt head faces the door-closing direction.

SUMMARY

In some embodiments, a latch bolt comprises a bolt head that is removably mounted on a latch tail through the use of a bolt head adjustment mechanism. The bolt head adjustment mechanism may comprise one or more locking members (e.g., within the bolt head, the latch tail, and/or independent from the other components of the latch bolt) that allow the bolt head to be removed, rotated, and reassembled while the latch bolt is located within the case of the mortise lock, as will described in further detail herein. It should be further understood that the anti-friction latch of the present invention is configured to pivot within the flanges of the bolt head in a way that maintains contact between the anti-friction lock and the strike plate as opposed to allowing the anti-friction lock to recede within the flanges of the bolt head such that the flanges contact the strike plate, as will be described in further detail herein.

In some embodiments, a latch bolt comprises a latch tail supporting a bolt head for reciprocating motion between an extended position and a retracted position. The bolt head is secured to the latch tail in a first orientation using one or more removable locking members (e.g., a clip and/or locking spring, a pin, a screw, or the like) that are operatively coupled to the latch tail within a locking aperture of the bolt head. When the one or more locking members are released the bolt head may be removed, rotated and reinserted onto the latch tail, and the one or more locking members are reengaged in order to operatively couple the bolt head to the latch. A tail plate is mounted to the latch tail to prevent rotation of the latch tail in order to maintain the alignment of the latch tail with the one or more locking members.

In some embodiments, the bolt head is secured to the latch tail in a first relative angular orientation of the latch tail to the bolt head and the bolt head is released from the latch tail in a second relative angular orientation of the latch tail to the bolt head. A tail plate is mounted for reciprocating motion relative to the latch tail where movement of the latch tail relative to the tail plate rotates the latch tail between the first relative angular orientation and the second relative angular orientation, as will be described in further detail herein.

In some embodiments, the latch tail is operatively coupled to the tail plate through the use of a catch, catch biasing members, a restraint member, and/or a restraint biasing member. The catch may be moved from an engaged position to a disengaged position, and concurrently the restraint member may move from a deactivated position to an activated position in order to hold the catch in the disengaged position. While the catch is in the disengaged position, the bolt head and the latch tail may be removed from the tail plate and the casing, rotated 180 degrees, and reinserted into the casting. As the latch tail engages the tail plate the restraint member is moved from the activated position to the deactivated position, which allows the catch to move from the disengaged position to the engaged position. In the engaged position a catch lock is operatively coupled to a tail lock in order to operatively couple the latch tail to the tail plate.

The latch tail, the bolt head (including the anti-friction latch), the tail plate, and other components may be releasably mounted in one of two positions by a retaining member. In some embodiments, a method of reversing a bolt head is provided in which the retaining member is removed from the case, the one or more locking members are disengaged, the bolt head is removed from the case, rotated (e.g., from a left hand orientation to a right hand orientation, or the reverse), and reassembled into the case, the locking members are reengaged, and the retaining member is assembled to the opposite wall of the case to retain the bolt head.

Embodiments of the present disclosure comprise a latch bolt. The latch bolt comprises a latch tail, a bolt head operatively coupled to the latch tail, a tail plate operatively coupled to the latch tail, and a reversibility assembly. The reversibility assembly allows removing the bolt head from the latch tail or the latch tail from the latch plate while the latch bolt is located in a case.

In further accord with embodiments of the disclosure, the reversibility assembly comprises a catch operatively coupled to the tail plate, a catch biasing member operatively coupled to the catch, a restraint member operatively coupled to the catch, and a restraint biasing member operatively coupled to the restraint member. The catch is moveable between an engaged position and a disengaged position through the catch biasing member. The restraint member is moveable between an activated position and a deactivated position. When the catch is in the engaged position the restraint member is in the deactivated position and the latch tail is operatively coupled to the tail plate. When the catch is in the disengaged position the restraint member is in the activated position and the latch tail is removable from the tail plate.

In other embodiments of the disclosure, the catch comprises a catch lock and the latch tail comprises a tail lock, wherein the catch lock and the tail lock are locked when the catch is in the engaged position, and wherein the catch lock and the tail lock are unlocked when the catch is in the disengaged position.

In yet other embodiments of the disclosure, the restraint member comprises a first portion and a second portion. The second portion has a width larger than the first portion. When the restraint member is activated with the catch in the disengaged position, the second portion is operatively coupled to a second aperture portion of the catch. When the restraint member is deactivated with the catch in the engaged position, the first portion is operatively coupled to a first aperture portion of the catch.

In still other embodiments of the disclosure the reversibility assembly comprises a bolt head adjustment mechanism operatively coupled to the latch tail. The bolt head and the latch tail allow for reciprocating motion between an extended position and a retracted position, and the bolt head adjustment mechanism allows for reversible assembly of the bolt head to the latch tail.

In other embodiments of the disclosure, the bolt head adjustment mechanism comprises one or more locking members operatively coupled to the bolt head or the latch tail. The bolt head comprises a locking aperture and a latch tail aperture. The one or more locking members comprise a bolt head locking member and a stub locking member operatively coupled to the latch tail. The latch tail is located within the latch tail aperture of the bolt head and the bolt head locking member is located within the locking aperture and is operatively coupled to the stub locking member of the latch tail. The bolt head locking member is removably operatively coupled to the bolt head.

In further accord with embodiments of the disclosure, the bolt head locking member comprises a clip and a locking spring. The clip is located within the locking aperture and is operatively coupled to the stub locking member of the latch tail, and wherein the locking spring is operatively coupled to the clip to secure the clip in the locking aperture of the bolt head.

In other embodiments of the disclosure, the bolt head locking member comprises a locking pin, wherein the locking pin is located within the locking aperture and is operatively coupled to the stub locking member of the latch tail.

In yet other embodiments of the disclosure, the bolt head locking member is releasably operatively coupled to the latch tail, and wherein the bolt head locking member is retained within the case when the latch bolt is installed within the case.

In still other embodiments of the disclosure, the tail plate prevents rotational movement of the latch tail with respect to the tail plate regardless of when the bolt head is operatively coupled to or removed from the latch tail.

In other embodiments of the of the disclosure, the bolt head adjustment mechanism of the latch bolt comprises a latch tail aperture in the bolt head. The one or more locking members comprise a bolt head locking member operatively coupled within the latch tail aperture and a stud locking member operatively coupled to the latch tail. The bolt head is operatively coupled to the latch tail in a first relative angular orientation of the latch tail to the bolt head, and the bolt head being released from the latch tail in a second relative angular orientation of the latch tail to the bolt head. The tail plate is mounted for reciprocating motion relative to the latch tail where movement of the latch tail relative to the tail plate rotates the latch tail between the first relative angular orientation and the second relative angular orientation.

In further accord with embodiments of the disclosure, the reciprocating motion of the latch tail relative to the tail plate moves a first camming surface on the latch tail into a second camming surface in the tail plate, and wherein the reciprocating motion of the latch tail relative to the tail plate moves a third camming surface on the latch tail into a fourth camming surface in the tail plate.

In other embodiments of the disclosure, the latch tail comprises a first locking member and the bolt head comprises a second locking member, the first locking member engaging the second locking member when the latch tail is in the first relative angular orientation and the first locking member being released from the second locking member when the latch tail is in the second relative angular orientation.

In yet other embodiments of the disclosure, the bolt head comprises a first flange, a second flange, an angular surface operatively coupling the first flange to the second flange and forming a slot there between, and an anti-friction latch comprising a sliding face and a strike engaging face. The anti-friction latch is located within the slot between the first flange and the second flange. The strike engaging face is configured to engage a strike plate or door frame as the bolt head is retracted and prevent the first flange and the second flange from contacting the strike plate or the door frame until a door is closed. The sliding face is configured to contact the angular surface as the bolt head is retracted and the strike engaging face is engaging the strike plate or the door frame.

Embodiments of the present disclosure comprises a mortise lock. The mortise lock comprises a case, a retaining member, and a latch bolt. The latch bolt comprises a latch tail, a bolt head operatively coupled to the latch tail, a tail plate operatively coupled to the latch tail, and a reversibility assembly. The reversibility assembly allows removing the bolt head from the latch tail or the latch tail from the latch plate while the latch bolt is located in the case.

In further accord with embodiments of the disclosure, the reversibility assembly comprises a catch operatively coupled to the tail plate, a catch biasing member operatively coupled to the catch, a restraint member operatively coupled to the catch, and a restraint biasing member operatively coupled to the restraint member. The catch is moveable between an engaged position and a disengaged position through the catch biasing member. The restraint member is moveable between an activated position and a deactivated position. When the catch is in the engaged position the restraint member is in the deactivated position and the latch tail is operatively coupled to the tail plate. When the catch is in the disengaged position the restraint member is in the activated position and the latch tail is removable from the tail plate.

In other embodiments of the disclosure, the reversibility assembly comprises a bolt head adjustment mechanism operatively coupled to the latch tail. The bolt head and the latch tail allow for reciprocating motion between an extended position and a retracted position. The bolt head adjustment mechanism allows for reversible assembly of the bolt head to the latch tail without removal of the latch bolt from the case in which the latch bolt is located.

In yet other embodiments of the disclosure, the bolt head adjustment mechanism of the latch bolt comprises one or more locking members operatively coupled to the bolt head or the latch tail. The bolt head comprises a locking aperture and a latch tail aperture. The one or more locking members comprise a bolt head locking member and a stub locking member operatively coupled to the latch tail. The latch tail is located within the latch tail aperture of the bolt head. The bolt head locking member is located within the locking aperture and is operatively coupled to the stub locking member of the latch tail. The bolt head locking member is removably operatively coupled to the bolt head.

In still other embodiments, the bolt head adjustment mechanism of the latch bolt comprises a latch tail aperture in the bolt head. The one or more locking members comprise a bolt head locking member operatively coupled within the latch tail aperture and a stud locking member operatively coupled to the latch tail. The bolt head is operatively coupled to the latch tail in a first relative angular orientation of the latch tail to the bolt head and the bolt head being released from the latch tail in a second relative angular orientation of the latch tail to the bolt head. The tail plate is mounted for reciprocating motion relative to the latch tail where movement of the latch tail relative to the tail plate rotates the latch tail between the first relative angular orientation and the second relative angular orientation.

Embodiments of the disclosure comprise a method of reversing a latch bolt within a case of a mortise lock. The latch bolt comprises a bolt head operatively coupled to a latch tail, and the bolt head is operatively coupled to a tail plate. The method comprises disengaging the bolt head from the latch tail, or the latch tail from the tail plate, while the latch bolt is within a casing. The method further comprises removing the bolt head or the latch tail from the case in a first position, and rotating the bolt head or the latch tail to a second position that is different from the first position. The method also comprises inserting the bolt head or the latch tail into the case, and operatively coupling the bolt head to the latch tail, or the latch tail to the tail plate, while the latch bolt is within the case.

Embodiments of the present disclosure comprise a latch bolt. The latch bolt comprising a latch tail, a bolt head operatively coupled to the latch tail, a tail plate operatively coupled to the latch tail, and a bolt head adjustment mechanism operatively coupled to the latch tail. The bolt head and the latch tail allow for reciprocating motion between an extended position and a retracted position. The bolt head adjustment mechanism allows for reversible assembly of the bolt head to the latch tail without removal of the latch bolt from a case in which the latch bolt is located.

In further accord with embodiments of the present disclosure, the bolt head adjustment mechanism comprises one or more locking members operatively coupled to the bolt head or the latch tail.

In other embodiments of the present disclosure, the bolt head comprises a locking aperture and a latch tail aperture. The one or more locking members comprise a bolt head locking member, and a stub locking member operatively coupled to the latch tail. The latch tail is located within the latch tail aperture of the bolt head. The bolt head locking member is located within the locking aperture and is operatively coupled to the stub locking member of the latch tail. The bolt head locking member is removably operatively coupled to the bolt head.

In still other embodiments of the present disclosure, the bolt head locking member comprises a clip and a locking spring. The clip is located within the locking aperture and is operatively coupled to the stub locking member of the latch tail, and the locking spring is operatively coupled to the clip to secure the clip in the locking aperture of the bolt head.

In yet other embodiments of the present disclosure, the bolt head locking member comprises a locking pin, and the locking pin is located within the locking aperture and is operatively coupled to the stub locking member of the latch tail.

In further accord with embodiments of the present disclosure, the bolt head locking member is releasably operatively coupled to the latch tail, and the bolt head locking member is retained within the case when the latch bolt is installed within the case.

In other embodiments of the present disclosure, the tail plate prevents rotational movement of the latch tail with respect to the tail plate regardless when the bolt head is operatively coupled to or removed from the latch tail.

In still other embodiments of the present disclosure, the bolt head comprises a latch tail aperture. The one or more locking members comprise a bolt head locking member operatively coupled within the latch tail aperture, and a stud locking member operatively coupled to the latch tail. The bolt head is operatively coupled to the latch tail in a first relative angular orientation of the latch tail to the bolt head, and the bolt head being released from the latch tail in a second relative angular orientation of the latch tail to the bolt head. The tail plate is mounted for reciprocating motion relative to the latch tail where movement of the latch tail relative to the tail plate rotates the latch tail between the first relative angular orientation and the second relative angular orientation.

In yet other embodiments of the present disclosure, the reciprocating motion of the latch tail relative to the tail plate moves a first camming surface on the latch tail into a second camming surface in the tail plate, and the reciprocating motion of the latch tail relative to the tail plate moves a third camming surface on the latch tail into a fourth camming surface in the tail plate.

In further accord with embodiments of the present disclosure, the latch tail comprises a first locking member and the bolt head comprises a second locking member, the first locking member engaging the second locking member when the latch tail is in the first relative angular orientation and the first locking member being released from the second locking member when the latch tail is in the second relative angular orientation.

In other embodiments of the invention, the latch bolt is mounted in the case in one of two positions by a retaining member on opposing sides of the case.

In still other embodiments of the present disclosure, the bolt head comprises a first flange, a second flange, an angular surface operatively coupling the first flange to the second flange and forming a slot there between, and an anti-friction latch comprising a sliding face and a strike engaging face. The anti-friction latch is located within the slot between the first flange and the second flange. The strike engaging face is configured to engage a strike plate or door frame as the bolt head is retracted and prevent the first flange and the second flange from contacting the strike plate or the door frame until a door is closed. The sliding face is configured to contact the angular surface as the bolt head is retracted and the strike engaging face is engaging the strike plate or the door frame.

Embodiments of the present disclosure comprises a mortise lock. The mortise lock comprises a case, a retaining member, and a latch bolt. The latch bolt comprises a latch tail, a bolt head operatively coupled to the latch tail, a tail plate operatively coupled to the latch tail, and a bolt head adjustment mechanism operatively coupled to the latch tail. The latch bolt is operatively coupled at least partially within the case by the retaining member in one of two positions on opposing sides of the case. The bolt head and the latch tail allow for reciprocating motion between an extended position and a retracted position. The bolt head adjustment mechanism allows for reversible assembly of the bolt head to the latch tail without removal of the latch bolt from the case.

In further accord with embodiments of the present disclosure, the bolt head adjustment mechanism of the latch bolt comprises one or more locking members operatively coupled to the bolt head or the latch tail.

In other embodiments of the present disclosure, the bolt head comprises a locking aperture and a latch tail aperture. The one or more locking members comprise a bolt head locking member, and a stub locking member operatively coupled to the latch tail. The latch tail is located within the latch tail aperture of the bolt head. The bolt head locking member is located within the locking aperture and is operatively coupled to the stub locking member of the latch tail. The bolt head locking member is removably operatively coupled to the bolt head.

In yet other embodiments of the present disclosure, the bolt head locking member comprises a clip and a locking spring. The clip is located within the locking aperture and is operatively coupled to the stub locking member of the latch tail, and the locking spring is operatively coupled to the clip to secure the clip in the locking aperture of the bolt head. Alternatively, the bolt head locking member comprises a locking pin. The locking pin is located within the locking aperture and is operatively coupled to the stub locking member of the latch tail.

Embodiments of the present disclosure comprises a method of reversing a bolt head on a latch bolt within a case of a mortise lock. The method comprises removing a retaining member from the case, retracting the bolt head into the case, disengaging one or more locking members operatively coupling the bolt head to a latch tail, removing the bolt head from the case, rotating the bolt head, reinserting the bolt head into the case, engaging the one or more locking members to operatively coupled the latch tail to the bolt head, and reassembling the retaining member to the case.

In further accord with embodiments of the present disclosure, the method further comprises retracting the bolt head into the case comprises retracting to an assembly position located past a retracted position during operation when the retaining member is operatively coupled to the case, and wherein reinserting the bolt head into the case comprising reinserting to the assembly position.

In other embodiments of the present disclosure, disengaging the one or more locking members operatively coupling the bolt head to the latch tail comprises releasing a bolt head locking member from engagement with a stub locking member of the latch tail. The bold head locking member is retained within the case after removal of the bolt head, and engaging the one or more locking members to operatively couple the latch tail to the bolt head comprises re-engaging the bolt head locking member to the stub locking member.

In still other embodiments of the present disclosure, the method further comprises holding a tail plate operatively coupled to the latch tail stationary, and releasing the bolt head after retracting to rotate the latch tail relative to the bolt head through a first angular rotation to release the bolt head from the latch tail. Rotating the bolt head comprises reorienting the bolt head relative to the latch tail from a first orientation to a second orientation. Reinserting the bolt head into the case comprises depressing and releasing the bolt head to rotate the latch tail relative to the bolt head through a second angular rotation to secure the bolt head to the latch tail.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The following figures illustrate embodiments of the invention, which are not necessarily drawn to scale, and wherein.

DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the singular forms "a", "an" and "the" are intended to include the plural forms as well, unless the context clearly indicates otherwise. Also, as used herein, the term "and/or" includes any and all combinations of one or more of the associated listed items. It will be further understood that the terms "include" and/or "including" when used herein, specify the presence of stated features, steps, operations, elements, and/or components, but do not preclude the presence or addition of one or more other features, steps, operations, elements, components, and/or groups thereof.

It will be understood that when an element is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected," "coupled", "operatively coupled", or the like to another element, it can be directly connected, coupled, or operatively coupled to the other element or intervening elements may be present. Moreover, it can be removable or integral with the other element and/or intervening elements. In contrast, when an element is referred to as being "directly connected", "directly coupled", or "directly operatively coupled" to another element, there are no intervening elements present.

Relative terms such as "below," "above," "upper," "lower," "horizontal," "vertical," "top," "bottom," "rear," "front," "side," or the like may be used herein to describe a relationship of one element or component to another element or component as illustrated in the figures. It will be understood that these terms are intended to encompass different orientations of the device in addition to the orientation depicted in the figures.

Figure 33:
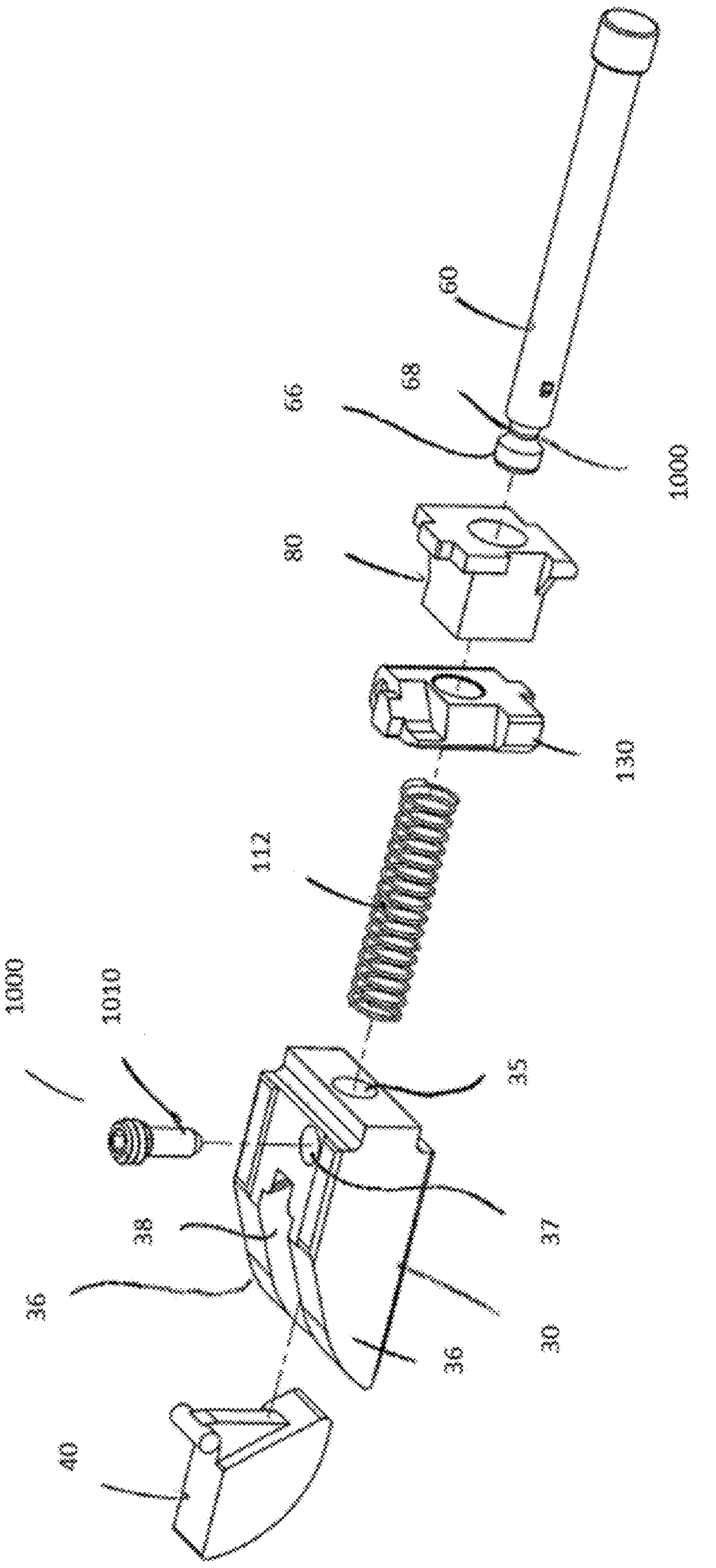
FIG. 33 is a perspective exploded view of the reversible latch bolt according to embodiments of the present invention.

FIGS. 1 through 39 illustrate various embodiments of the latch bolt for a lock, such as a mortise lock 1. FIGS. 1 through 21 illustrate one or more embodiments of the invention in accordance with a type of lock. FIGS. 22 through 32 illustrate one or more embodiments of the invention in accordance with another lock type. FIG. 33 illustrates one or more embodiments of the invention in accordance with another lock type. FIGS. 34 through 39 illustrate one or more embodiments of the invention in accordance with other lock types. While the one or more embodiments of the invention are illustrated with respect to different types of locks, it should be understood that any of the embodiments and/or features thereof illustrated with respect to one lock may be utilized with any of the other embodiments and/or features thereof.

Figure 1:
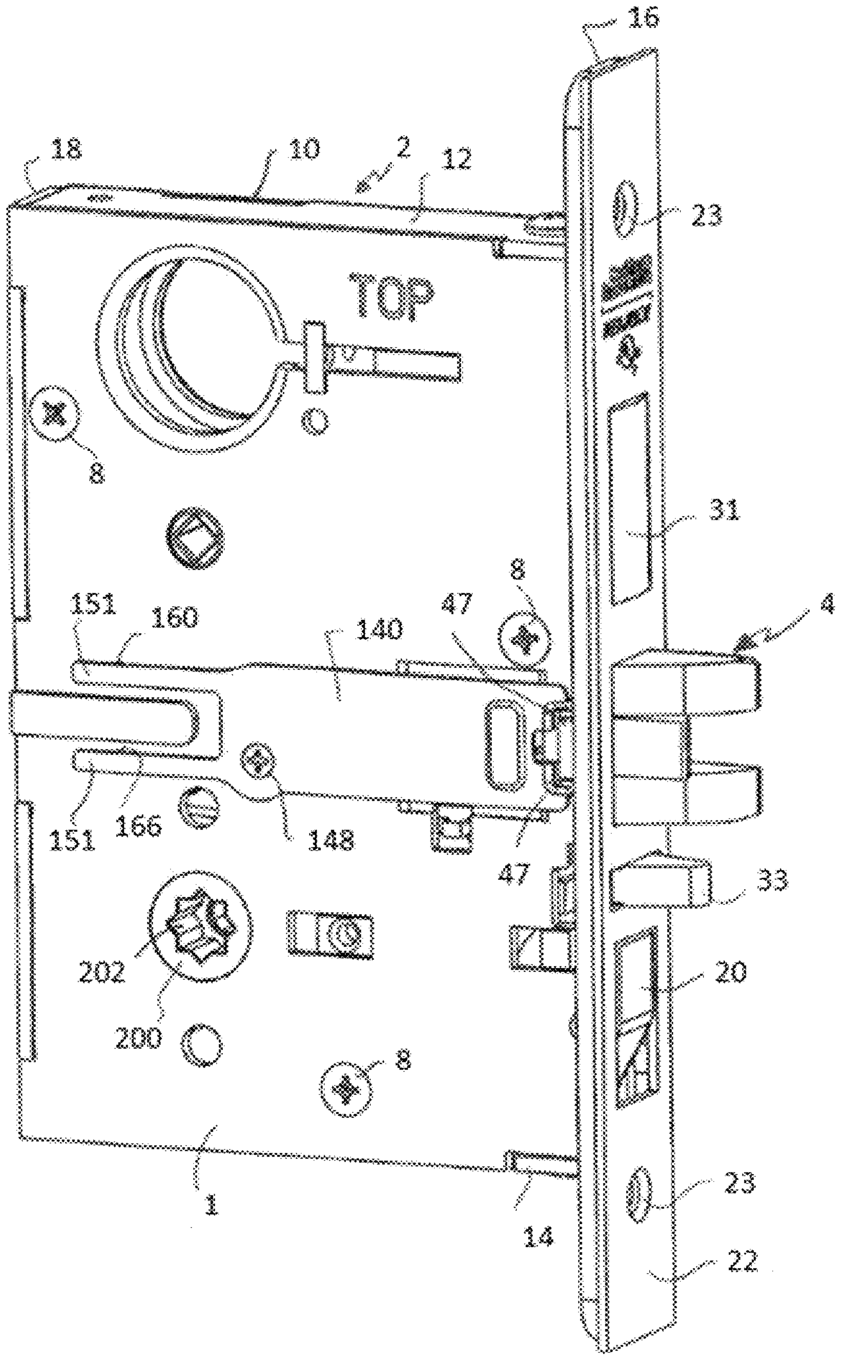
FIG. 1 is a perspective view of an embodiment of a mortise lock assembly according to embodiments of the present invention.
Figure 2:
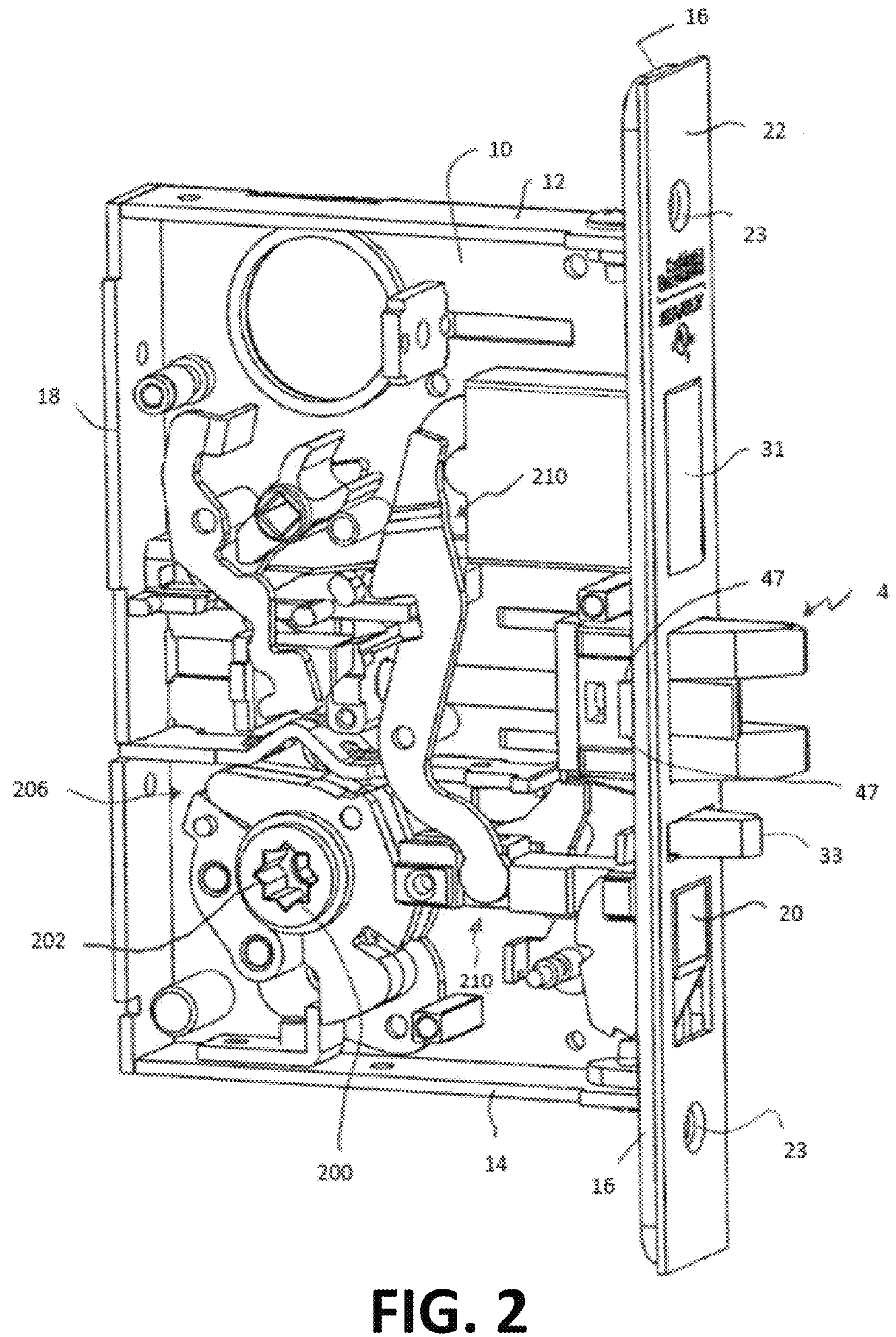
FIG. 2 is a perspective view of the mortise lock assembly of FIG. 1 with the case cover removed according to embodiments the present invention.

The one or more embodiments illustrated in FIGS. 1 through 21 will be discussed first. Referring to FIG. 1, a mortise lock 1 is shown comprising a case 2 and a reversible latch bolt 4. The case 2 houses the lock components and is configured and dimensioned to be received in a mortise in a free, or unhinged, edge of a door. One of the side walls of the case 2 may comprise a removable cap 6 which is releasably coupled to the remainder of the case 2, such as by fasteners 8, and forms a closure for allowing access to the interior of the case 2. FIG. 2 shows the lock 1 with the cap 6 removed. The case 2 includes a side wall 10 opposite to the cap 6 and a top wall 12, bottom wall 14, front wall 16 and rear wall 18. The front wall 16 has an opening for receiving a latch bolt 4. The front wall 16 may also include openings for a deadbolt 31, an auxiliary bolt 33 and a flush-mounted toggle 20. A face plate 22 may be secured to the front wall 16 of case 2 and has openings which correspond to the openings in the front wall 16. The latch bolt 4 is shown in an extended position projecting from the openings in the front wall 16 and face plate 22. The face plate 22 and front wall 16 may include apertures 23 for receiving fasteners for securing the lock 1 in a door.

Figure 3:
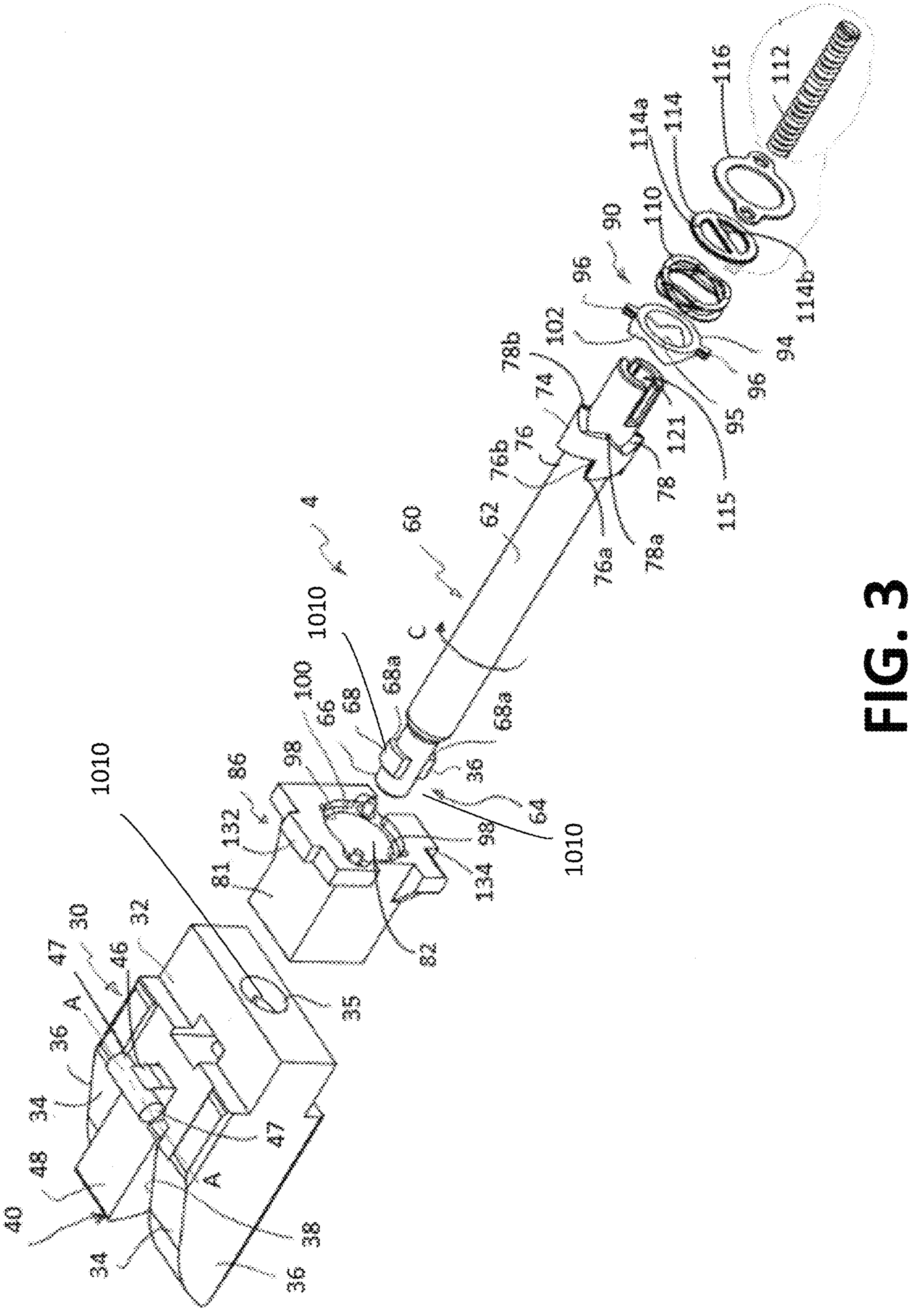
FIG. 3 is a perspective exploded view of the reversible latch bolt according to embodiments of the present invention.

Referring to FIG. 3, in one embodiment the latch bolt 4 comprises a bolt head 30 that is removably mounted on a latch tail 60 through the use of a reversibility assembly, such as bolt head adjustment mechanism 1000, as will be described herein in further detail. The bolt head 30 comprises a body 32 that at one end defines a latch tail receiving aperture (e.g., a bore 35) that releasably receives a first end of the latch tail 60. A pair of flanges 36 project from the opposite end of the body 32 that include beveled faces 34. Flanges 36 are separated by a slot 38. The slot 38 may have an angled surface 39 between the flanges 36 and abut with a sliding face 49 (e.g., surface) of the anti-friction latch 40, as will be described herein in further detail. The anti-friction latch 40 is disposed in the slot 38 for pivoting motion relative to the bolt head 30. The anti-friction latch 40 has a face 48 that extends from between the flanges 36 and that strikes the door frame or strike plate to retract the latch bolt when the door is closed. Referring to FIGS. 4 through 6 and 18 through 21 at least one lateral side of the anti-friction latch 40 has a groove 42 (e.g., extending at least partially into the anti-friction latch 40) for receiving a pin 44 that is fixed to and extends from one or more of the facing flanges 36. A groove 42 may be provided on both sides of the anti-friction latch 40 with a pin 44 extending from each of the flanges 36. Alternatively, the pin 44 may extend from each of the flanges 36 and is received by the groove 42, which comprises an aperture that extends through the anti-friction latch 40. The anti-friction latch 40 is slipped into the slot 38 during manufacture of the latch bolt with the pin 44 inserted into the facing groove 42 via open end **42*a*. The open end 42*a* may be closed using, for example, a press operation or any other suitable mechanism or process to keep the anti-friction latch 40 in the bolt head 30. A stub 46 extends from one side of the anti-friction latch and terminates in a pair of laterally extending tabs 47 that define the pivot axis A-A for the anti-friction latch. When the latch bolt 4 is mounted in the case 2, the tabs 47 are supported such that the anti-friction latch 40 is free to pivot about axis A-A but is otherwise held in position relative to the case 2**.

Figure 4:
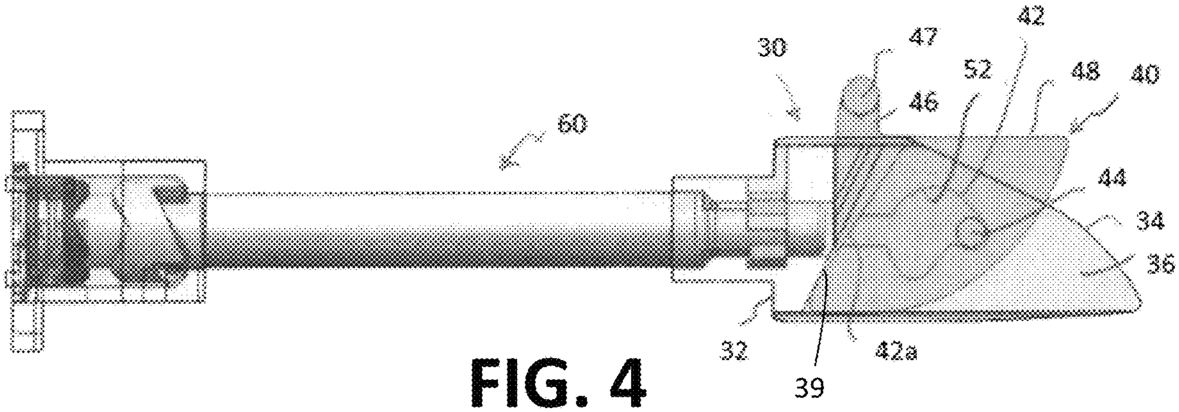
FIG. 4 is a top view of the of the anti-friction latch bolt in the extended position according to embodiments of the present invention.
Figure 6:
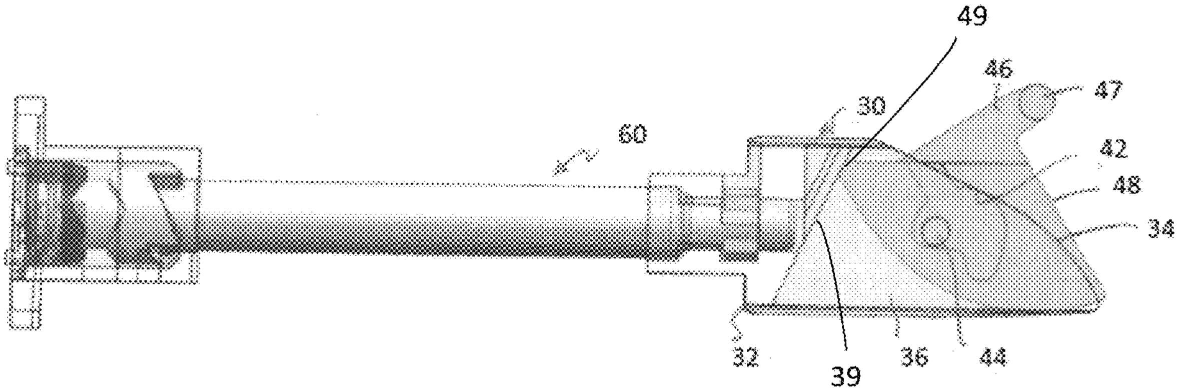
FIG. 6 is a top view of the anti-friction latch bolt in a retracted position according to embodiments of the present invention.
Figure 18:
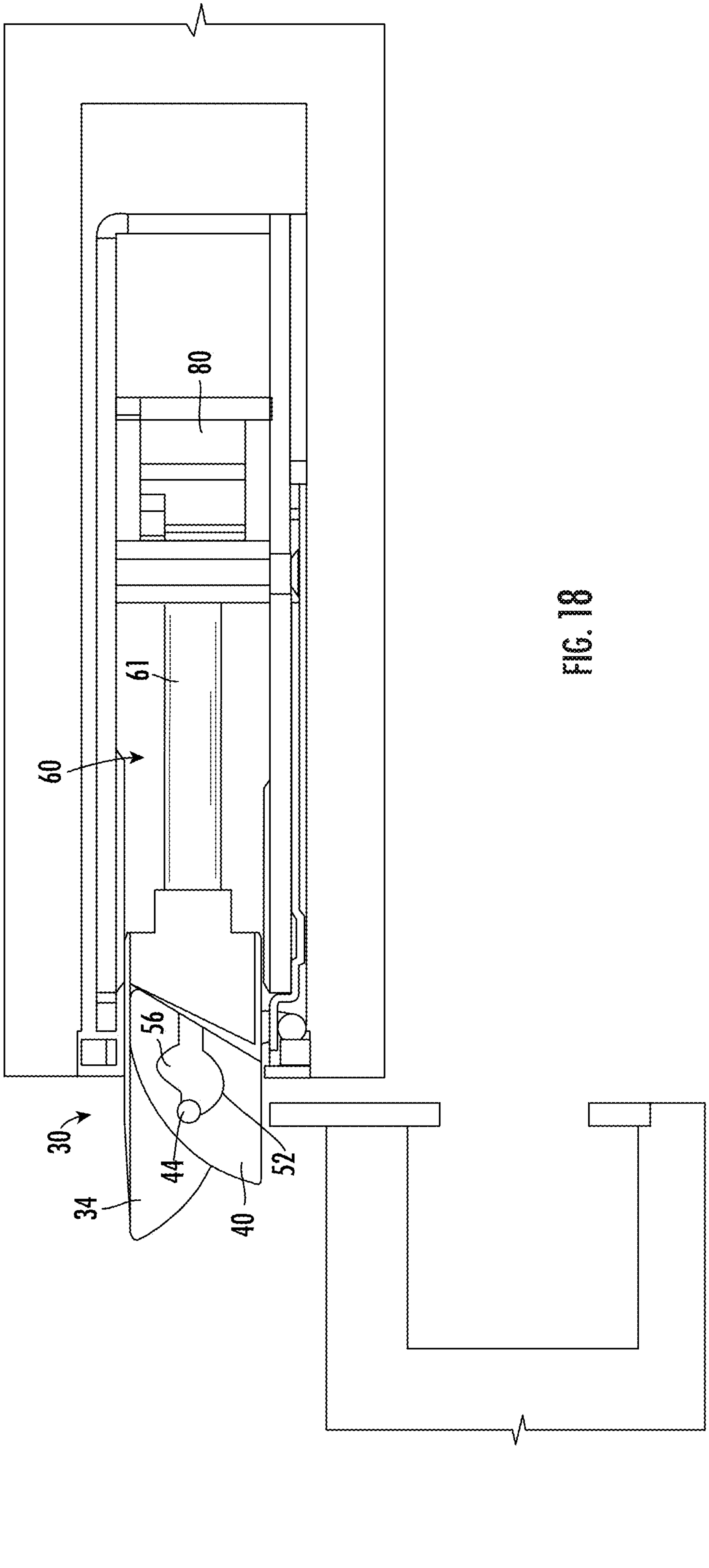
FIG. 18 shows a top view of the latch bolt mounted in a door before engagement of a strike box mounted in a door frame according to embodiments of the present invention.
Figure 20:
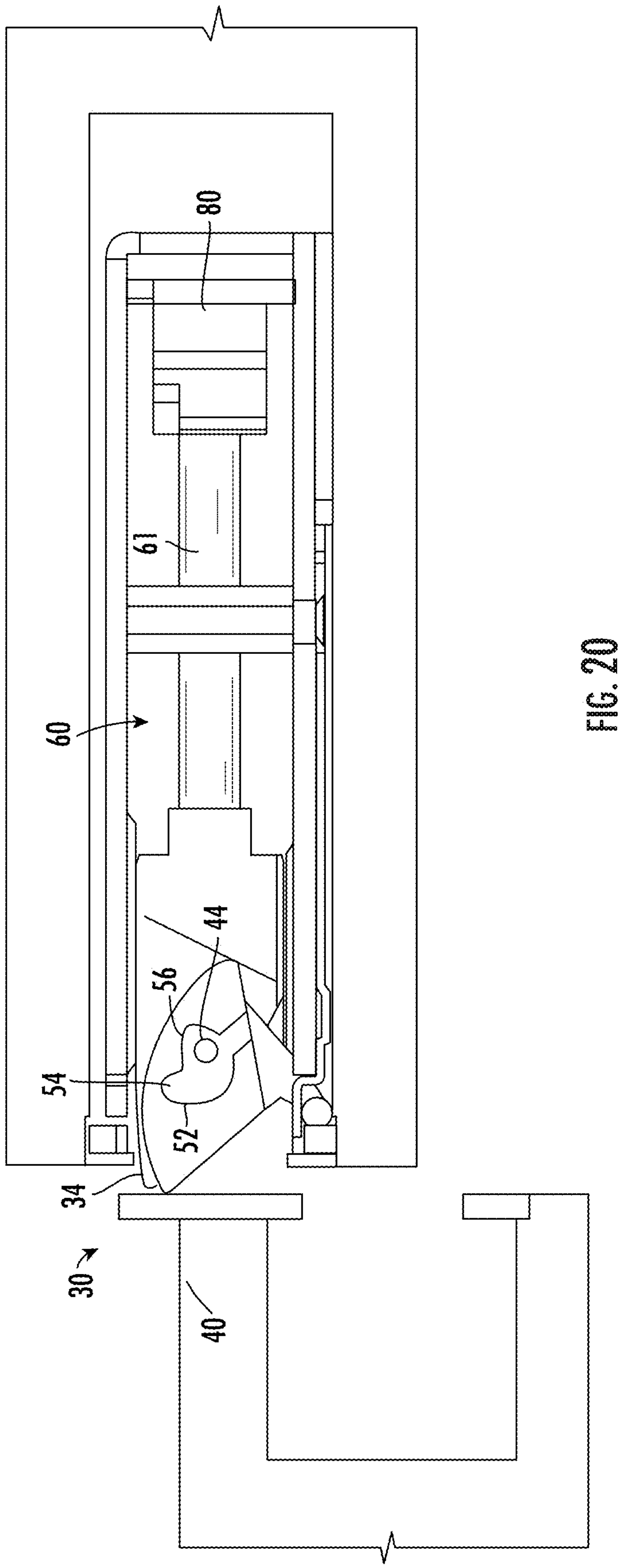
FIG. 20 shows the top view of the latch bolt mounted in a door during engagement of a strike box mounted in a door frame according to embodiments of the present invention.

The groove 42 defines a generally arcuate surface having a generally semi-circular center portion 52 that terminates in a first recessed area 54 at one end and a second recessed area 56 at the opposite end. When the anti-friction latch 40 is in the extended position as shown in FIGS. 4 and 18 the pin 44 is positioned in first recessed area 54. The pin 44 abuts the substantially flat face **54*a* of recessed area 54 to limit the rotation of the anti-friction latch 40 relative to the bolt head. Similarly, when the anti-friction latch 40 is in the retracted position as shown in FIGS. 6 and 20 the pin 44 is positioned in second recessed area 56. The pin 44 abuts the substantially flat face 56*a* of recessed area 56 to limit the rotation of the anti-friction latch 40 relative to the bolt head. Between the two end positions the anti-friction latch 40 pivots around axis A-A and the arcuate surface 52 traverses the pin 44. The anti-friction latch 40 is positioned and dimensioned such that the face 48 of the anti-friction latch 40 contacts the door frame or strike plate through the entire range of contact of the bolt head 30** with the door frame or strike plate during the closing of the door.

The anti-friction latch 40 further comprises a sliding face 49 (e.g., rounded or flat surface at an end opposite the face 48 that engages a strike plate), which is configured to abut and slide with respect to the angled surface 39 of the bolt head 30 within the slot 38. The angled surface 39 may be linear, hyperbolic, parabolic, non-uniform, or the like; however, it should be understood that the angled surface 39 may be configured to maintain contact with the anti-friction latch 40 as the anti-friction latch 40 engages the strike plate and the latch bolt 4 retracts within the lock 1. As such, the angled surface 39 (e.g., also referred to as an acceleration ramp) and the sliding face 49 act to accelerate the retraction of the latch bolt (e.g., latch tail 60) in a way that reduces the force required to close the door. In typical configurations, there is no angled surface 39 in the slot 38 of the bolt head 30, and as such, the anti-friction latch loses contact with a surface within the slot 38 (e.g., is no longer restrained), which results in the anti-friction latch 40 losing contact with the strike plate, which may increase the force required to close the door.

It should be understood that in some embodiments of the disclosed invention, the latch bolt 4, and in particular, the anti-friction latch 40, reduces the force required to close a door. Since the anti-friction latch 40 maintains contact with the strike plate of the door frame (e.g., due in part to the positioning of the groove 42 and pin 44) and/or the anti-friction latch 40 maintains contact with the angled surface 39, the force required to close the door may be reduced by 10, 20, 25, 30, 35, 40, 45, 50, 55, 60, 65, 70, 75, 80, 90, 100, or other like percentage, and/or range within, overlap, or fall outside of these percentages.

It should be understood that the anti-fraction latch 40 described herein may operate (e.g., maintains engagement with the strike plate and the angled surface 39) in the same way regardless of the how the bolt head 30 of the latch bolt 4, 400 is reversibly operatively coupled to the latch tail 60 through the bolt head adjustment mechanism 1000 (including traditional couplings of the bolt head 30 to the latch tail 60 which are not expressly discussed herein).

Referring now to the operative coupling of the bolt head 30 to the latch tail 60, it should be understood that the bolt head 30 may be operatively coupled to the latch tail 60 using a reversibility assembly, such as a bolt head adjustment mechanism 1000. Generally, it should be understood that the bolt head adjustment mechanism 1000 may comprise of independent components that are removably operatively coupled or integrally operatively coupled to the bolt head 30, the latch tail 60, the latch tail plate 80, or the like, as will be discussed in further detail herein. With respect to FIGS. 3, 23, 33, and 35, in some embodiments the latch tail 60 is releasably secured to the bolt head 30 through the bolt head adjustment mechanism 1000, such that the bolt head 30 may be uncoupled from the latch tail 60 in order to allow the bolt head to be reversed. It should be understood that the latch tail 60 comprises an elongated rigid member 62 having a connector 64 formed at the first end thereof. It should be understood that one or more locking members 1010 may be used, which may be independent of, or formed within, the bolt head 30, and/or independent of, or formed on, the latch tail 60 (e.g., on the stub 66 of the connector 64).

Referring specifically to FIG. 3, in some embodiments the connector 64 comprises a stub 66 having one or more stub locking members 68 formed as one or more projections that extend outwardly from stub 66. It should be understood that the stub may be the portion of the latch tail 60 that is operatively coupled to the bolt head 30 (e.g., inserted into the bolt head 30). The stub 66 may be the same size, smaller than, and/or larger than the latch tail 60 (e.g., same, larger, or smaller diameter, or the like). In some embodiments, the stub locking members 68 may comprise a pair of stub locking members 68, which are spaced from one another approximately 180 degrees about the perimeter of the latch tail 60. The one or more stub locking members 68 define locking surfaces 68*a* that extend generally perpendicular to the longitudinal axis B-B of the latch tail 60 and that face away from the bolt head 30 toward the opposite end of the latch tail 60. The one or more stub locking members 68 may engage one or more mating bolt head locking members 70 formed inside of bore 35 of the bolt head 30 to releasably lock the bolt head 30 to the latch tail 60. In some embodiments, the stub locking members 68 may project into the latch tail 60 (e.g., instead of projecting from the latch tail 60) and also mate with bolt head locking members 70 on the inside of the bore 35 of the bolt head 30. As will be described in further detail with respect to FIGS. 22 through 32 and FIG. 33, the one or more locking members 1010 may be stub locking members 68 that project into the latch tail 60 (e.g., instead of projecting from the latch tail 60) and mate with one or more removable locking members 1010 (e.g., clip, spring, pin, or the like) outside of and/or within the bolt head 30.

Figure 8:
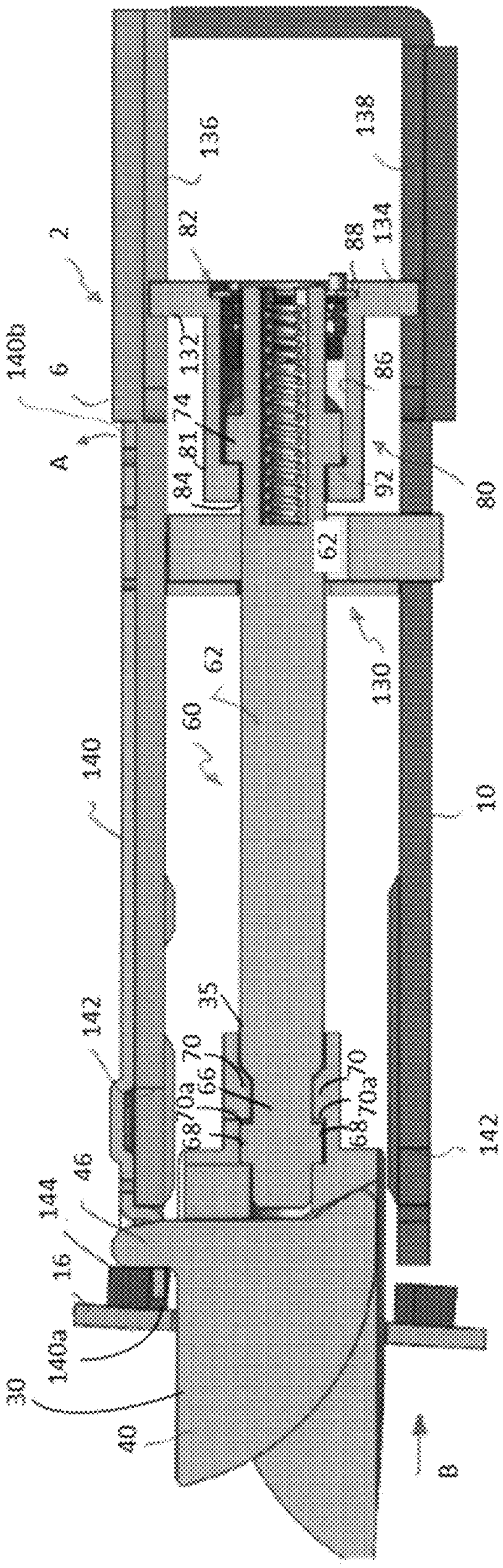
FIG. 8 is a section top view of the latch bolt in a first position mounted in a case according to embodiments of the present invention.
Figure 9A:
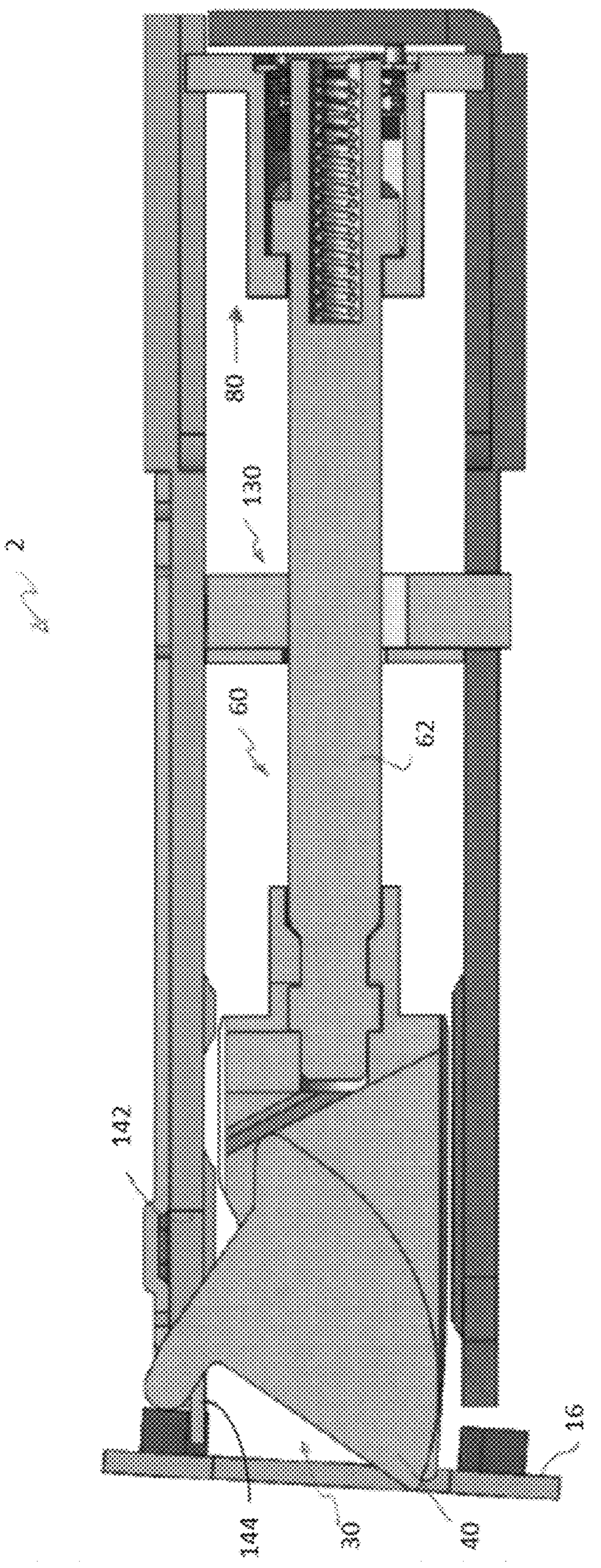
FIG. 9A is a section top view of the latch bolt in a second position mounted in a case according to embodiments of the present invention.
Figure 9B:
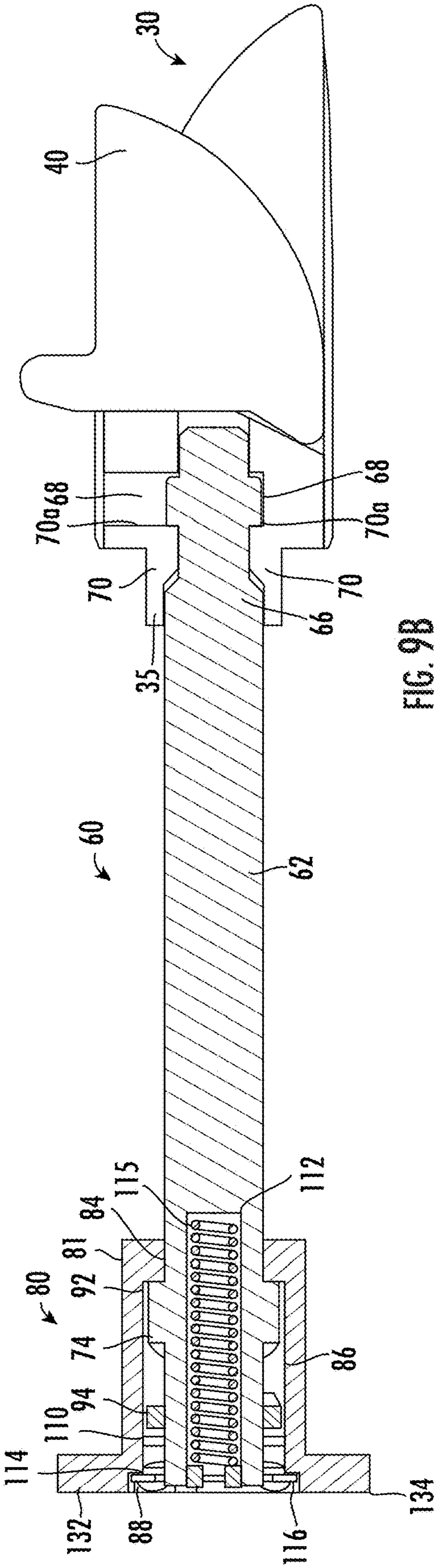
FIG. 9B is a section top view of the latch bolt in the second position according to embodiments of the present invention.
Figure 9C:
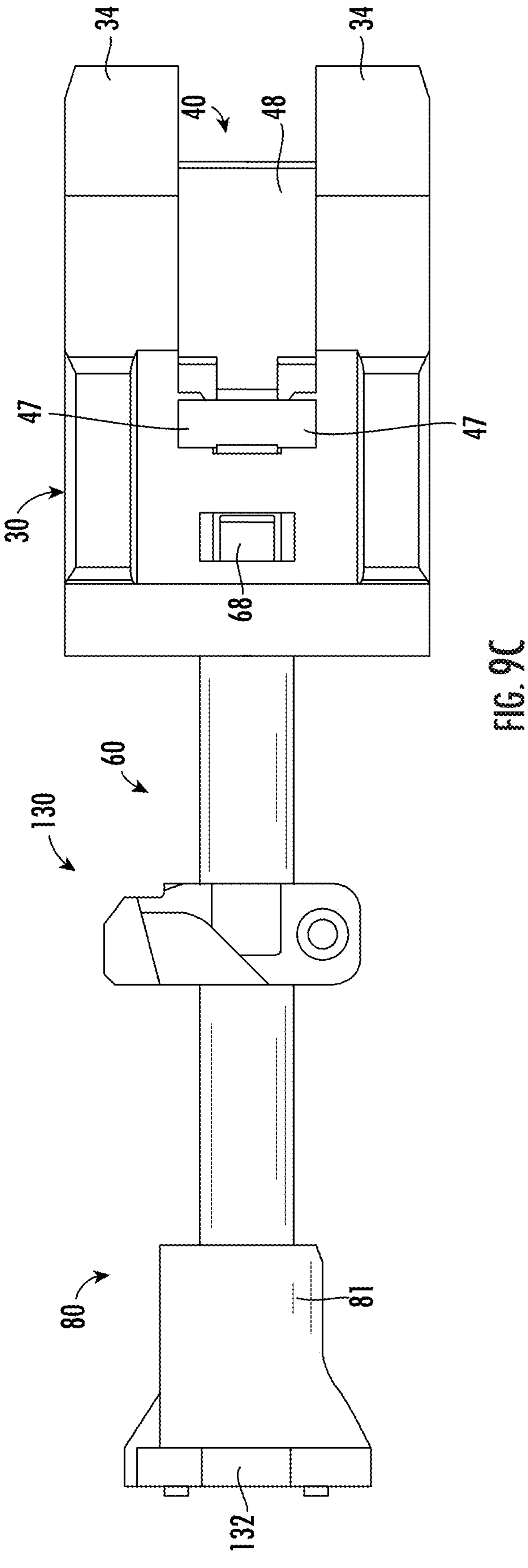
FIG. 9C is a side view of the latch bolt according to embodiments of the present invention.
Figure 10:
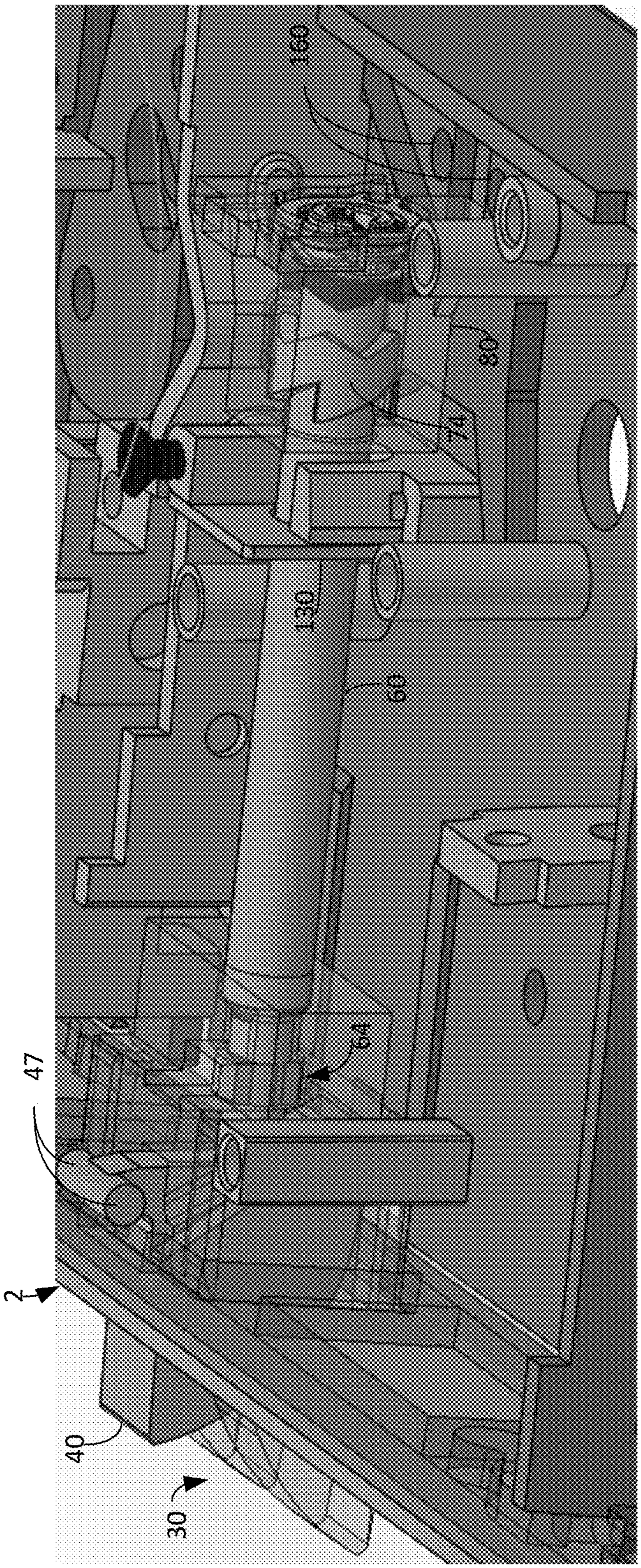
FIG. 10 is a perspective partially cut-away view of the latch bolt mounted in the case according to embodiments of the present invention.
Figure 11:
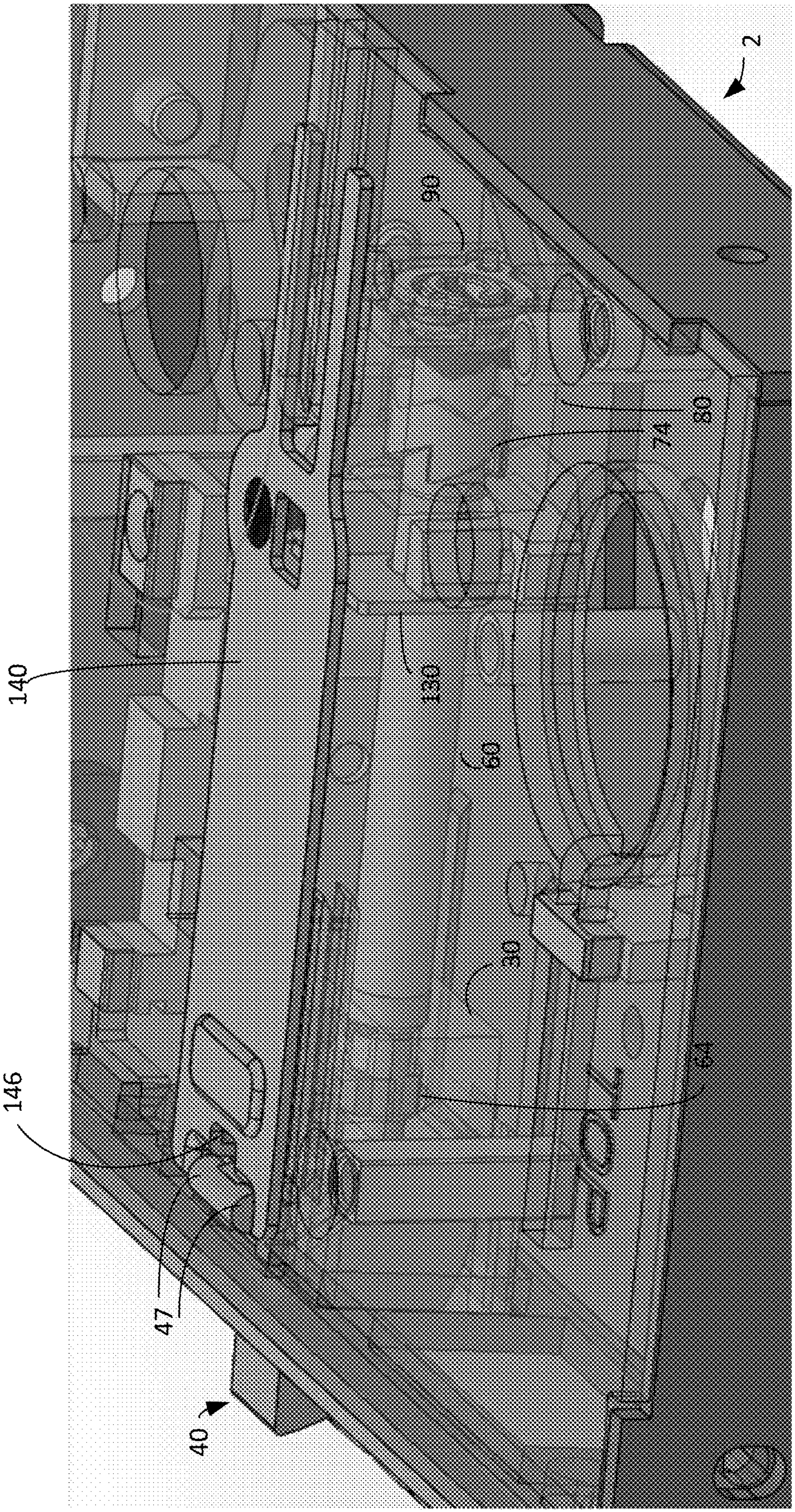
FIG. 11 is a perspective partially cut-away view of the latch bolt mounted in the case according to embodiments of the present invention.

Referring to FIGS. 8, 9A and 9B, the bore 35 in bolt head 30 is dimensioned to receive the stub 66. A pair of bolt head locking members 70 are formed as projections that extend inwardly from the wall of bore 35. The bolt head locking members 70 are spaced from one another approximately 180 degrees about the perimeter of bore 35. The bolt head locking members 70 define locking surfaces 70*a* that extend generally perpendicular to the longitudinal axis B-B of the latch tail 60 and that face toward the external end of the bolt head 30. The bolt head locking members 70 are arranged such that when the stub 66 of latch tail 60 is inserted into the bore 35 the stub locking members 68 fit into the spaces between locking members 70. Likewise, the bolt head locking members 70 can fit into the spaces between the stub locking members 68. To secure the bolt head 30 to the latch tail 60, the stub 66 is inserted into bore 35 in an angular orientation where the bolt head locking members 70 are angularly offset from the stub locking members 68 by 90 degrees. The stub 66 is inserted into bore 35 until stub locking members 68 pass the bolt head locking members 70. The latch tail 60 is then rotated 90 degrees relative to bolt head 30 such that the stub locking members 68 are positioned behind the bolt head locking members 70. In this relative angular orientation of the latch tail 60 and bolt head 30, the locking surfaces 68*a* engage locking surfaces 70*a* to prevent the bolt head 30 from being removed from the latch tail 60. To remove the bolt head 30 from the latch tail 60, the latch tail is rotated 90 degrees about its longitudinal axis such that the stub locking members 68 are positioned between the bolt head locking members 70 and the bolt head locking members 70 are not disposed behind the stub locking members 68. In this relative angular orientation of the latch tail 60 and bolt head 30 the stub 66 can be withdrawn from the bore 35 to remove the bolt head 30 from the latch tail 60. The end of stub 66 is received in a mating end of bore 35 to stabilize the latch tail 60 relative to the bolt head 30 while allowing the bolt head 30 to rotate relative to the latch tail.

While the invention has been described with a pair of locking members on each of the latch tail 60 and bolt head 30, the releasable connection may use a greater or fewer number of locking members provided the bolt head 30 may be securely connected to the latch tail 60 and the bolt head 30 may be removed from the latch tail 60 by rotating the latch tail relative to the bolt head about axis B-B as described. Moreover, while the locking members are described as being spaced 180 degrees apart from one another the locking members may be spaced from one another at other angular orientations and the latch tail may be rotated other that 90 degrees to release and lock the bolt head to the latch tail. The locking members 68 and 70 may be shaped other than as shown in the drawings provided that when the locking members are in the locked, abutting position the engagement of the locking members prevents the bolt head 30 from being removed from the latch tail 60. From the foregoing description it is to be understood that the bolt head 30 and latch tail 60 may be moved between the locked and unlocked positions by the sequential rotation of these parts relative to one another.

Referring again to FIG. 3, the reversibility assembly, such as the bolt head adjustment mechanism 1000, may further have one or more components operatively coupled to the end of the latch tail 60 opposite to connector 64. For example, a camming member 74 may be operatively coupled to the latch tail 60 such that the camming member 74 moves with the latch tail 60. The camming member 74 may be formed as one-piece with the latch tail 60 or the camming member 74 may be formed as a separate component that is fixed to the latch tail. The camming member 74 has two camming surfaces 76 and 78 that extend around the periphery of member 62. The first camming surface 76 faces toward the bolt head 30 and the second camming surface 78 faces away from the bolt head 30 toward the internal end of the latch tail 60. The camming surface 76 is arranged with a series of peaks 76*a* and troughs 76*b*. Likewise, the camming surface 78 is arranged with a series of peaks 78*a* and troughs 78*b*. The peaks 76*a* are arranged substantially in-line with troughs 78*b* and the peaks 78*a* are arranged substantially in-line with troughs 76*b* such that camming surfaces 76 and 78 are circumferentially offset from one another. The arrangement and operation of the peaks and troughs on the camming surfaces 76, 78 will be explained in detail hereinafter.

The arrangement and mounting of the tail plate 80 to the latch tail 60 will now be described. The tail plate 80 comprises a generally block shaped body 81, although the body may have other configurations (e.g., any type of shape, including but not limited to circular, oval, triangular, polygonal or the like). The body 81 defines a through hole 82 that extends entirely through the tail plate 80. The through hole 82 is stepped to create a forward portion 84 that is dimensioned to closely but rotatably receives the shaft 62 of latch tail 60, a center portion 86 that is dimensioned to closely but rotatably receive the camming member 74, and a rear portion 88 that receives a camming assembly 90. The latch tail 60 extends into through hole 82 such that it may freely rotate relative to the tail plate 80. An internal shoulder is formed between the forward portion 84 and the center portion 86 that defines a camming surface 92 that faces camming surface 76 of the camming member 74. The camming surface 92 is formed with a series of peaks 92*a* and troughs 92*b* that cooperate with the peaks 76*a* and troughs 76*b* of camming surface 76 as will be described.

The camming assembly 90 comprises an annular camming member 94 that has a central opening 95 dimensioned to receive the end of latch tail 60 such that the latch tail 60 is able to reciprocate along and rotate relative to camming member 94. The camming member 94 defines a camming surface 102 having a series of peaks 102*a* and troughs 102*b*. The camming surface 102 faces the camming surface 78 of camming member 74 and engages the camming surface 78 as will be described.

In one embodiment, the mechanism for mounting the camming member 94 in the tail plate 80 comprises a pair of projections or tabs 96 that extend laterally from the annular camming member 94. The tabs 96 are received in slots 98 formed in the shoulder 100 formed between the center portion 86 and the rear portion 88 of through hole 82. When the tabs 96 are engaged with the slots 98 the camming member 94 is prevented from rotating relative to the tail plate 80. Other mechanisms for mounting the camming member 94 to the tail plate may also be used.

A spring 110 provides a bias force against the camming member 94 that presses the camming member 94 against shoulder 100 of the tail plate 80. In one embodiment the spring 110 is a wave spring having a central opening dimensioned to fit over the latch tail 60 such that the latch tail can reciprocate relative to the spring. A coil spring 112 is inserted into the longitudinally extending cavity 115 formed in elongated rigid member 62. The coil spring 112 is under compression and exerts a force tending to bias the latch tail 60 toward the closed end of the tail plate 80 such that camming surface 76 is normally biased against camming surface 92. A washer 114 abuts the ends of springs 110 and 112 to hold the camming member 94, spring 110 and spring 112 in position. The washer 114 is formed as an annular shaped ring 114*a* with a cross-member 114*b*. The annular ring 114*a* abuts spring 110 and the cross-member 114*b* abuts the end of spring 112. The end of tail latch 60 is formed with two grooves 121 that receive the cross-member 114*b* such that the latch tail 60 may reciprocate relative to the washer. A tail retainer 116 (e.g., retaining ring, plate, or the like) is mounted over the washer 114 and is secured to the tail plate 80 to hold the camming assembly 90 in place and to hold the latch tail 60 in the tail plate 80. The tail retainer 116 may have a central opening dimensioned to fit over the latch tail 60 such that the latch tail can reciprocate relative to the tail retainer 116. The tail retainer 116 may be mounted to the tail plate 80 by any suitable mechanism and in the illustrated embodiment is staked to the tail plate using deformable nubs 120 on the tail plate 80 that engage apertures 118 on the tail retainer 116. Other connection mechanisms may be used to secure the tail retainer 116 to the tail plate 80 including separate fasteners, welding or the like.

Referring to FIGS. 7 through 11 and 18 through 21 when the latch bolt 4 is mounted in case 2, the latch tail 60 is supported for reciprocating motion in a bearing member or cradle 130. The latch tail 60 is constrained for longitudinal reciprocating movement along longitudinal axis B-B. The tail plate 80 is also constrained for longitudinal reciprocating movement along longitudinal axis B-B. The tail plate 80 comprises tabs or projections 132, 134 that extend from the tail plate 80 and are supported for linear reciprocating motion in guide slots or rails 136, 138, respectively, on case 2.

The anti-friction latch 40 is mounted for rotational motion such that the antifriction latch 40 is pivoted when the latch tail 60 is retracted and extended. Each of the housing side walls 6, 10 define an aperture 142 through which the stub 46 and tabs 47 of anti-friction latch 40 may be extended. Retaining member 140 may be releasably secured to either one of the side walls 6 to secure the anti-friction latch 40 for rotation on that side wall depending on whether the latch bolt 4 is oriented for a right hand or a left hand door. The tabs 47 are retained on bearing surfaces 144 formed on the removable retaining member 140. The bearing surfaces 144 are separated by a slot 146 that receives stub 46. When the latch bolt 4 is installed in the case 2, the stub is inserted through the aperture 142 in one of side wall 6 or side wall 10. The retaining member 140 is secured to the side wall with the stub 46 extending through the slot 146 and one of tabs 47 supported on each of bearing surfaces 144. When the latch is retracted the tabs 47 are free to rotate on the bearing surfaces 144 but are otherwise constrained from moving. To secure the retaining member 140 to the case 2 one end 140*a* of the retaining member 140 extends under the edge of the casing wall 6, 10 and the retaining member 140 is secured to the case 2 by a screw or other releasable connection mechanism 148. Other mechanisms may be used to secure the retaining member 140 to the case 2 (e.g., sliding within a slot, using a rotating member, clip, or the like). The retaining member 140 may also conveniently include a tool 150 for engaging the latch tail 80 during the reversing operation as will herein after be described. However, the tool need not form part of the retaining member 140 and may be provided as a separate tool.

Figure 7A:
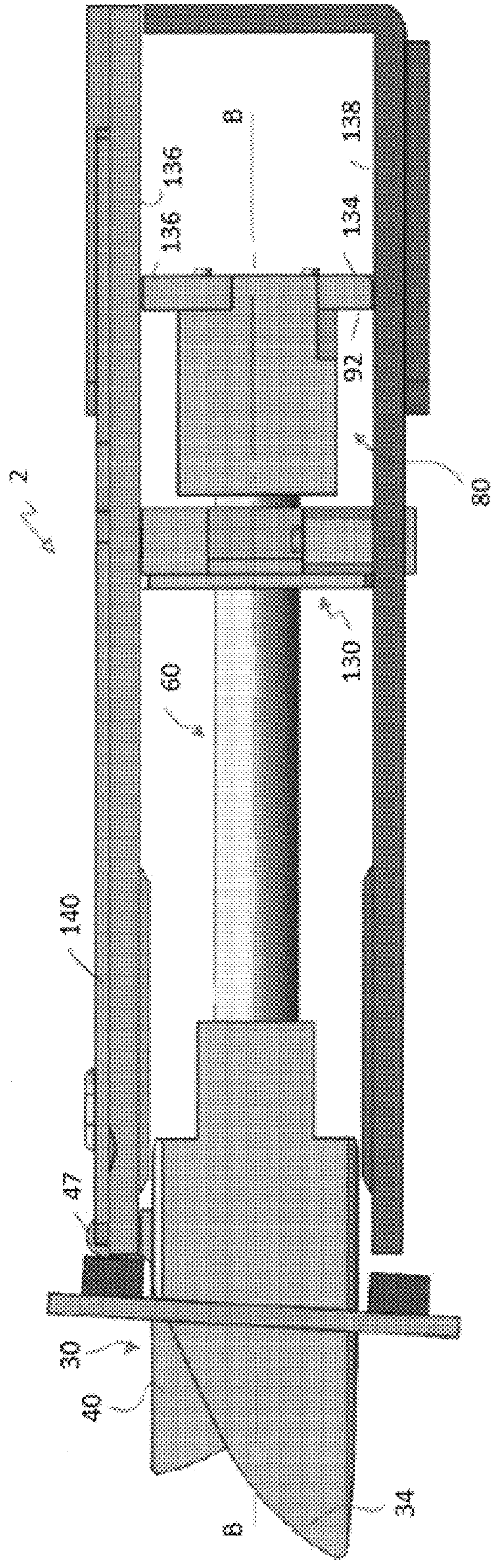
FIG. 7A is a top view of the latch bolt mounted in the case according to embodiments of the present invention.
Figure 7B:
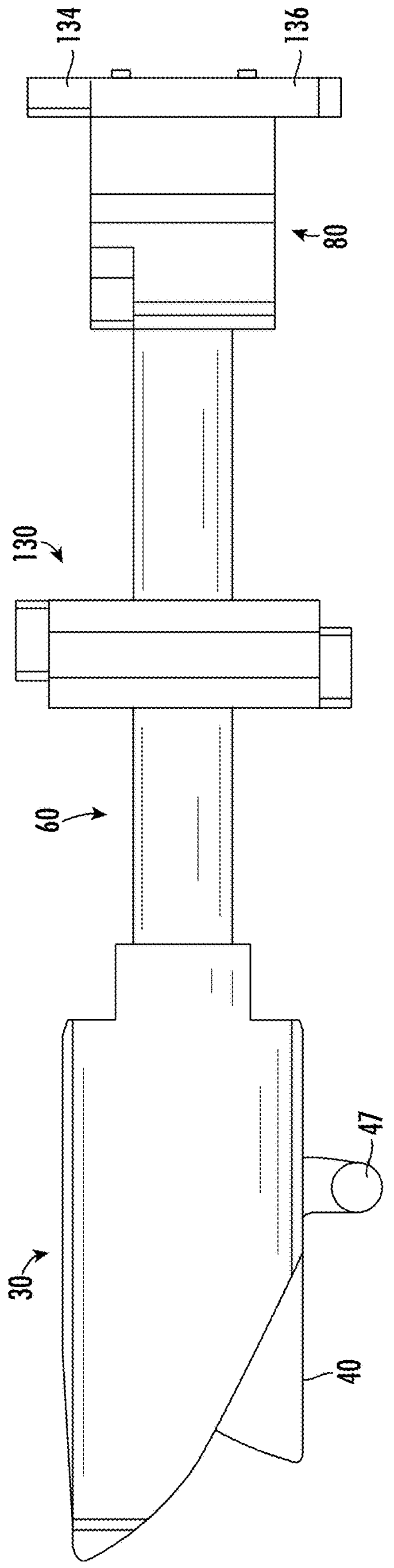
FIG. 7B is a top view of the latch bolt according to embodiments of the present invention.

During operation of the latch bolt, the latch bolt is normally biased to the extended position of FIGS. 7 and 8. In this position, the bolt head 30 extends through the case 2 and beyond the edge of the door in which the mortise lock 1 is secured. When the latch is in this position and the door is in a closed position relative to a door frame the bolt head 30 extends into a strike box or door frame to hold the door in the closed position. The latch bolt may be locked in this position to prevent retraction of the latch bolt and the opening of the door.

When the latch bolt is in the extended position, the bolt head 30 is also positioned to contact a strike plate or door frame as the door is moved from an open position to a closed position. Contact between the bolt head 30 and the strike plate or door frame causes the latch bolt to retract such that the door can be closed. When the door is fully closed and the bolt head 30 is aligned with the strike box in the door frame, the latch bolt returns to its extended position under the biasing force of spring 112 to hold the door in the closed position.

Figure 5:
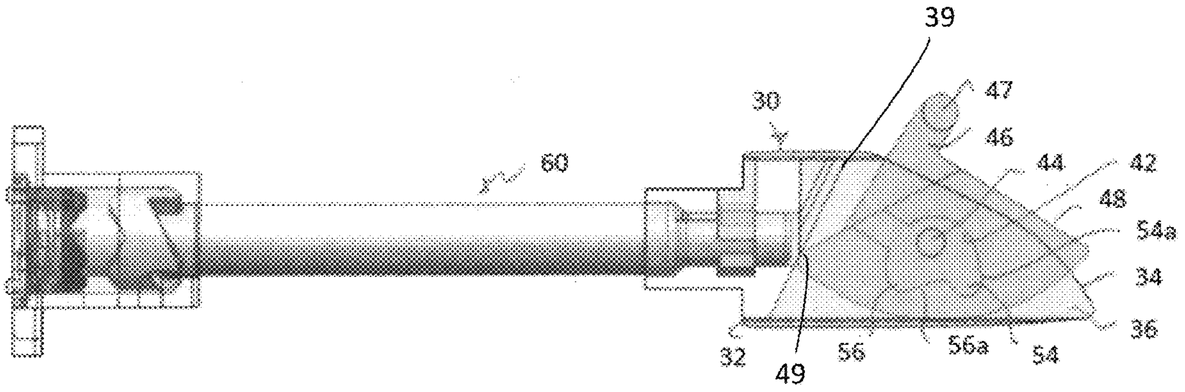
FIG. 5 is a top view of the anti-friction latch bolt in a partially retracted position according to embodiments of the present invention.
Figure 19:
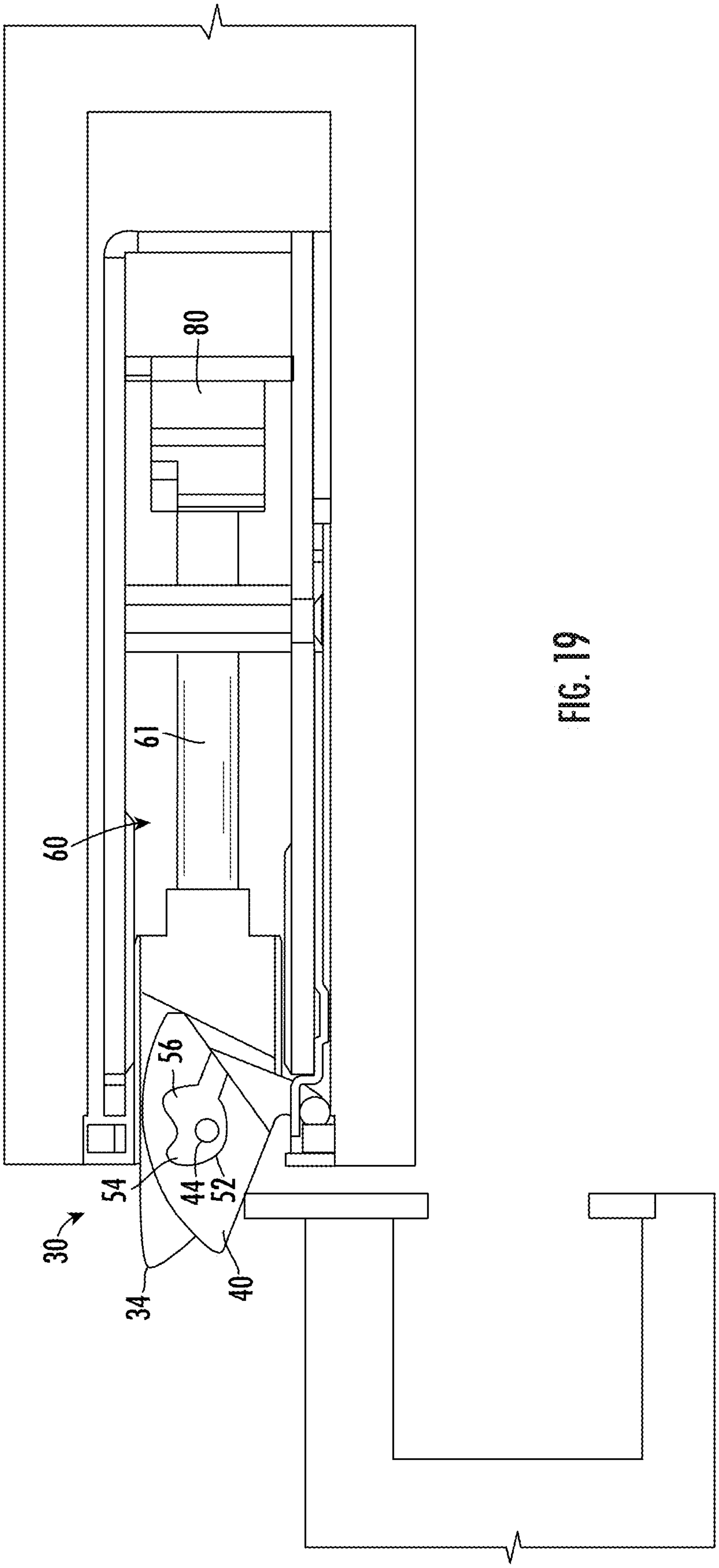
FIG. 19 shows the top view of the latch bolt mounted in a door during engagement of a strike box mounted in a door frame according to embodiments of the present invention.
Figure 21:
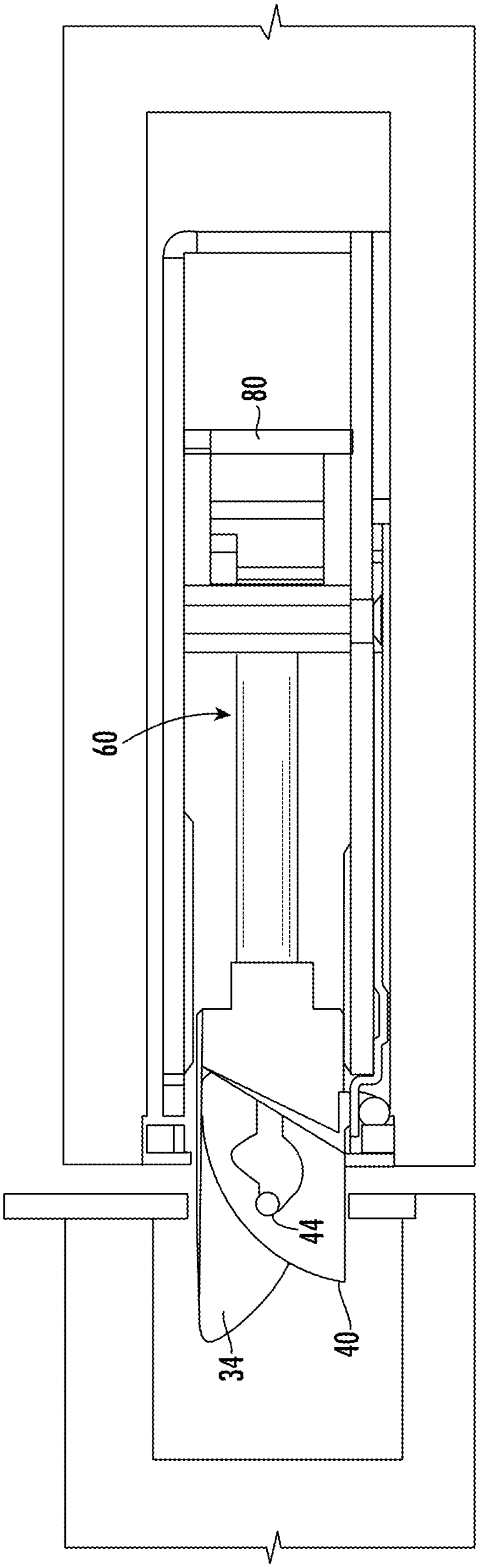
FIG. 21 shows the latch bolt mounted in a door engaging a strike box mounted in a door frame according to embodiments of the present invention.

The bolt head 30 is configured such that during the closing of the door the anti-friction latch 40 contacts the strike plate, or door frame, during the entire contact of the bolt head 30 with the strike plate/door frame. FIGS. 4 and 18 show the position of the bolt head as the bolt head is initially moved into contact with the strike plate/door frame. The anti-friction latch 40 is positioned to contact the strike plate/door frame. When the bolt head 30 contacts the strike plate/door frame the anti-friction latch 40 begins to be pivoted about axis A-A and the latch bolt begins to be retracted into the case 2. FIGS. 5 and 19 show the engagement of the bolt head 30 with the strike plate//door frame at a midpoint of the engagement of the bolt head 30 with the strike plate//door frame. In this position, the anti-friction latch 40 has been rotated relative to the bolt head body 32 about axis A-A and the latch bolt is partially retracted into the case 2. The anti-friction latch 40 remains in contact with the strike plate/door frame. FIGS. 6 and 20 show the engagement of the bolt head 30 with the strike plate/door jamb at the end of the engagement of the bolt head 30 with the strike plate// door frame, just before the latch bolt extends the bolt head 30 into the strike box. At this point the anti-friction latch 40 is fully rotated and the latch bolt is fully retracted into the case 2. As is evident from FIGS. 6 and 20 the anti-friction latch 40 remains in contact with the strike plate//door frame to this point such that the anti-friction latch 40 is in contact with the strike plate//door frame during the entire time that the bolt head 30 contacts the strike plate//door frame. FIG. 21 shows the latch bolt engaged with the strike box in the latched position.

Any suitable mechanism may be used to retract the latch bolt and open the door and to lock the latch bolt in the extended position. One such suitable mechanism is disclosed in U.S. Pat. No. 6,349,982, titled "Reversible Mortise Lock" issued to Fayngersh et al. on Feb. 26, 2002 which is incorporated by reference herein in its entirety. A latch operator retracts the latch bolt and may include a knob or lever handle mounted to the inside and/or outside the door with which the mortise lock is used. The latch operator may also include a remotely controlled or automated device. Independent, coaxial rollback hubs 200, which are mirror images of one another, are mounted on the case 2. The hubs 200 are rotatably mounted in opposed holes in the side walls of the case 2 below the latch bolt. The hubs 200 each include a star-shaped aperture 202 for non-rotatable connection to inside and outside spindle drives (not shown) connected to the knobs or lever handles or other latch operator for rotating the hubs 108.

The latch bolt 31 is retracted by rotating one of the rollback hubs 200. Rotation of the rollback hub 200 causes a transmission 206 operatively connected between the roll back hub 200 and the tail plate 80 to act against the tail plate 80 to move the tail plate 80, latch tail 60 and connected latch bolt 31 to the retracted position of FIG. 9A.

The mortise lock 1 may also include a locking mechanism for selectively securing one or both of the rollback hubs 200 from rotation. The locking mechanism may comprise a slide plate 210 and the toggle 20. The slide plate is cooperatively linked to the toggle 20 which is accessible through the opening in the front wall 16 and face plate 22. Manipulation of the toggle 20 moves the slide plate relative to the hubs 200 between an unlocked position and a locked position. The locking mechanism is moved to the locked position by depressing the one end of the toggle 20 thereby moving the slide plate to the locked position. In the locked position a locking member is in the path of at least one of the retractor hubs 200 thereby preventing rotation of the hub 200. The hub 200 affected by the locking mechanism is typically the hub associated with the actuator on the outside of the door. The locking mechanism is unlocked by depressing the opposite end of the toggle 20 thereby moving the slide plate away from the hubs 108.

The mortise lock assembly 1 may also include a deadbolt 31 and/or auxiliary bolt 33. The deadbolt 31 may be selectively moved between an extended position and retracted position by operation of a key cylinder or thumb turn (not shown) in a conventional manner. A transmission 210 may be provided for functionally connecting the deadbolt 31 and the latch bolt. The latch bolt may be automatically moved to the locked position when the deadbolt 31 is moved to the extended, locked position. The latch bolt 31 may remain in this position, even when the deadbolt 31 is retracted.

Operation of the reversible latch will now be described in further detail in accordance with one or more embodiments of the present disclosure. Assume for purposes of explanation that the bolt head 30 is in a first orientation relative to case 2 such as to be installed, for example, in a right hand door and the orientation of the bolt head 30 is to be reversed relative to case 2 and moved to a second orientation such as to be installed, for example, in a left hand door. The retaining member 140 is removed from the casing 2. In the illustrated embodiment the screw 148 is removed and the distal end 140*b* of the retaining member 140 is lifted away from the case 2 in the direction of arrow A (see FIG. 8) such that the front edge 140*a* of the retaining member 140 may be removed from under the edge of the case 2. Removing the retaining member 140 releases tabs 47 of the anti-friction latch 40 from being secured to the case 2. The tool 150 is inserted into apertures 160 formed in the case side wall (hidden in FIG. 1). Specifically, the prongs 151 are inserted into apertures 160 such that the prongs 151 are disposed to block the rearward movement of the tail plate 80 such that the position of the tail plate is fixed relative to the case 2 directly behind the tail plate 80. The prongs 151 may be positioned behind the tail plate 80 or the prongs 151 may engage any surface of the tail plate 80. It is to be understood that the latch bolt including tail plate 80 are typically movable together from the extended position of FIG. 8 to the retracted position of FIG. 9A during closing and opening of the door. By inserting the tool 150 into apertures 160 the normal retraction of the latch bolt and tail plate 80 is prevented. While the tool 150 is conveniently provided as part of the retaining member 140 such that when the retaining member 140 is removed from case 2 the tool is readily available for use, the tool 150 may be provided as a separate component and may or may not be secured to the case. Moreover, any rigid device that may be inserted into the apertures 160 to prevent movement of the latch tail 80 may be used, such as a screwdriver or the like.

After the tabs 47 of the anti-friction latch 40 are released, by removing retaining member 140, and the movement of the tail plate 80 is arrested, the user depresses or retracts the bolt head 30 by pushing the bolt head into the case 2 in the direction of arrow B. As the bolt head 30 is pushed into the case, the latch tail 60 is also moved in the direction of arrow B (see FIGS. 12A, 12B, 13 and 14). However, because movement of the tail plate 80 is prevented by tool 150, the latch tail 60 moves relative to the tail plate 80 in the direction of arrow B. As the latch tail 60 moves relative to the tail plate 80, spring 112 is compressed and camming member 74 is moved toward stationary camming member 94. Continued movement of the bolt head 30 and latch tail 60 moves camming face 78 of camming member 74 into engagement with camming face 102 of camming member 94 (see FIG.

12B, 14). Because camming member 94 is fixed in position on tail plate 80 but latch tail 60 is free to rotate relative to tail plate 80 engagement of camming member 74 with camming member 94 causes latch tail 60 to rotate about its longitudinal axis B-B in a first direction, represented by arrow C (see FIG. 3). Specifically, the peaks 78a on camming surface 78 contact near the peaks 102a on camming surface 102 (see FIGS. 12B, 14) such that as the latch tail 60 is moved linearly the camming surface 78 rides on camming surface 102 forcing the latch tail 60 to rotate relative to both the tail plate 80 and the bolt head 30. The camming surfaces 78 and 102 are configured such that the latch tail rotates approximately one-half of the total distance required to unlock the bolt head 30 from the latch tail 60. In the present embodiment the latch tail 60 is rotated approximately 45 degrees. The spring 110 absorbs some of the force exerted by the camming member 74 on camming member 94 to prevent binding of, or damage to, the assembly. Linear and rotary movement of the latch tail 60 continues until the peaks 78a of camming surface 78 are positioned in the troughs 102b of camming surface 102 and the peaks 102a of camming surface 102 are positioned in the troughs 78b of camming surface 78 (see FIGS. 12C, 15). At this point both linear and rotary movement of the latch tail 60 stops.

Figure 12A:
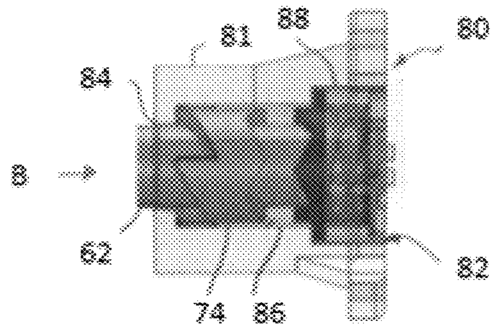
FIGS. 12A-12E show the engagement of the camming surfaces in the latch bolt according to embodiments of the present invention.
Figure 12B:
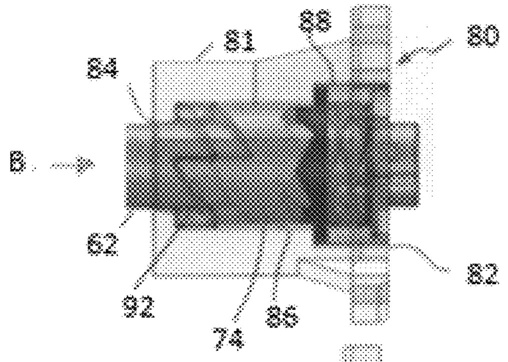
Figure 12C:
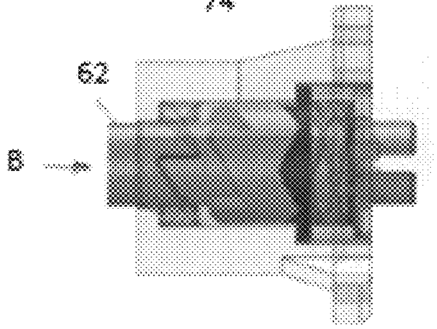
Figure 12D:
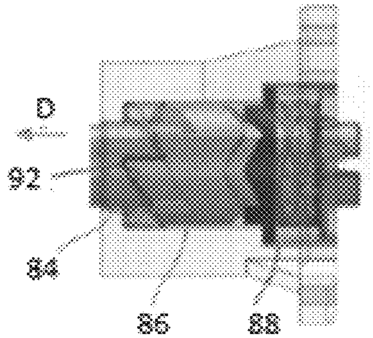
Figure 12E:
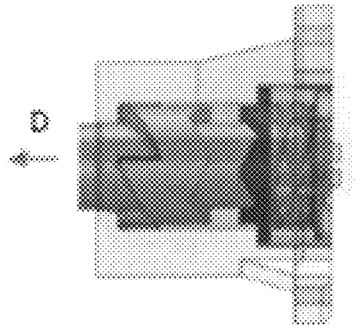
Figure 13:
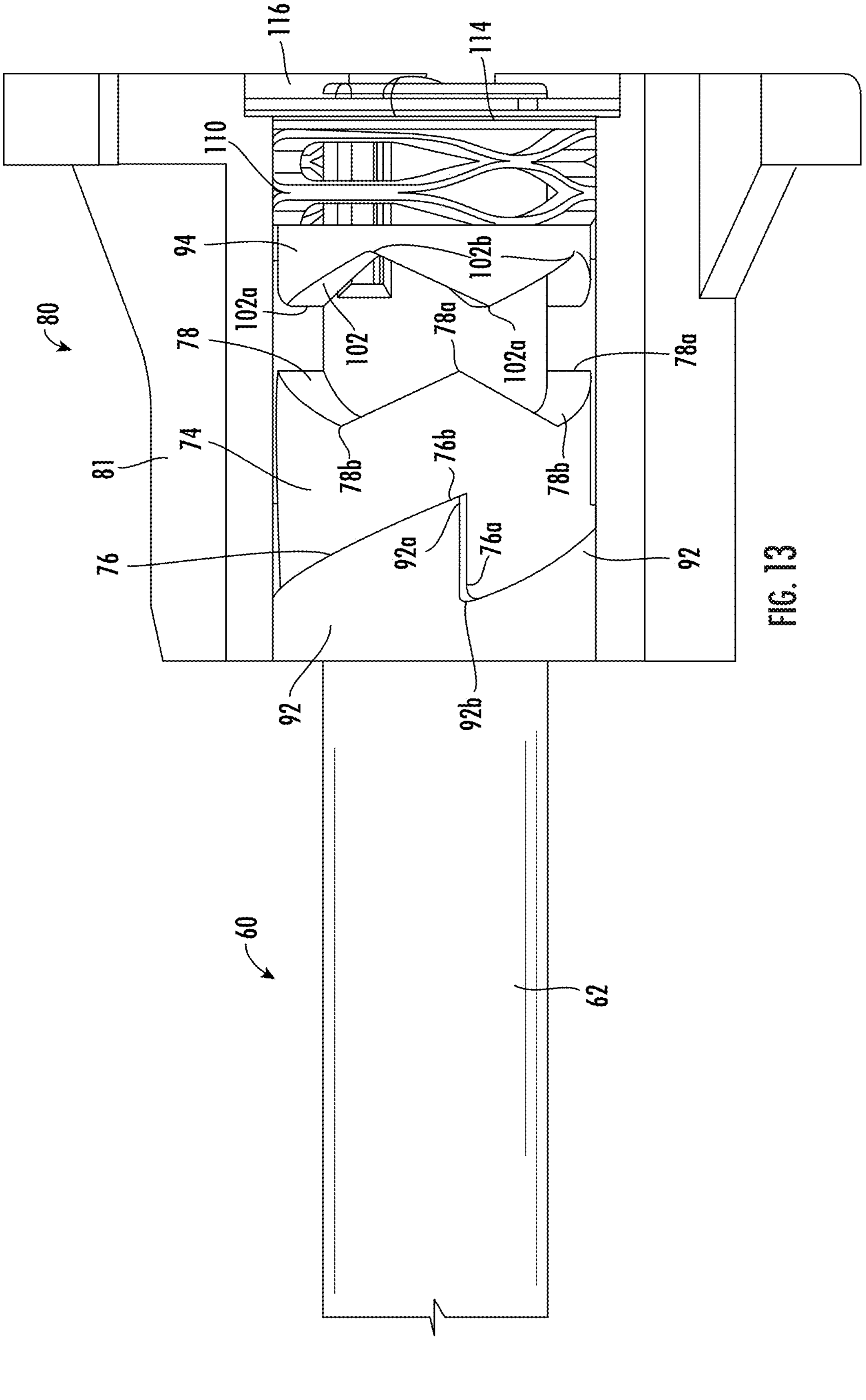
FIGS. 13-17 show the engagement of the camming surfaces in the latch bolt according to embodiments of the present invention.
Figure 14:
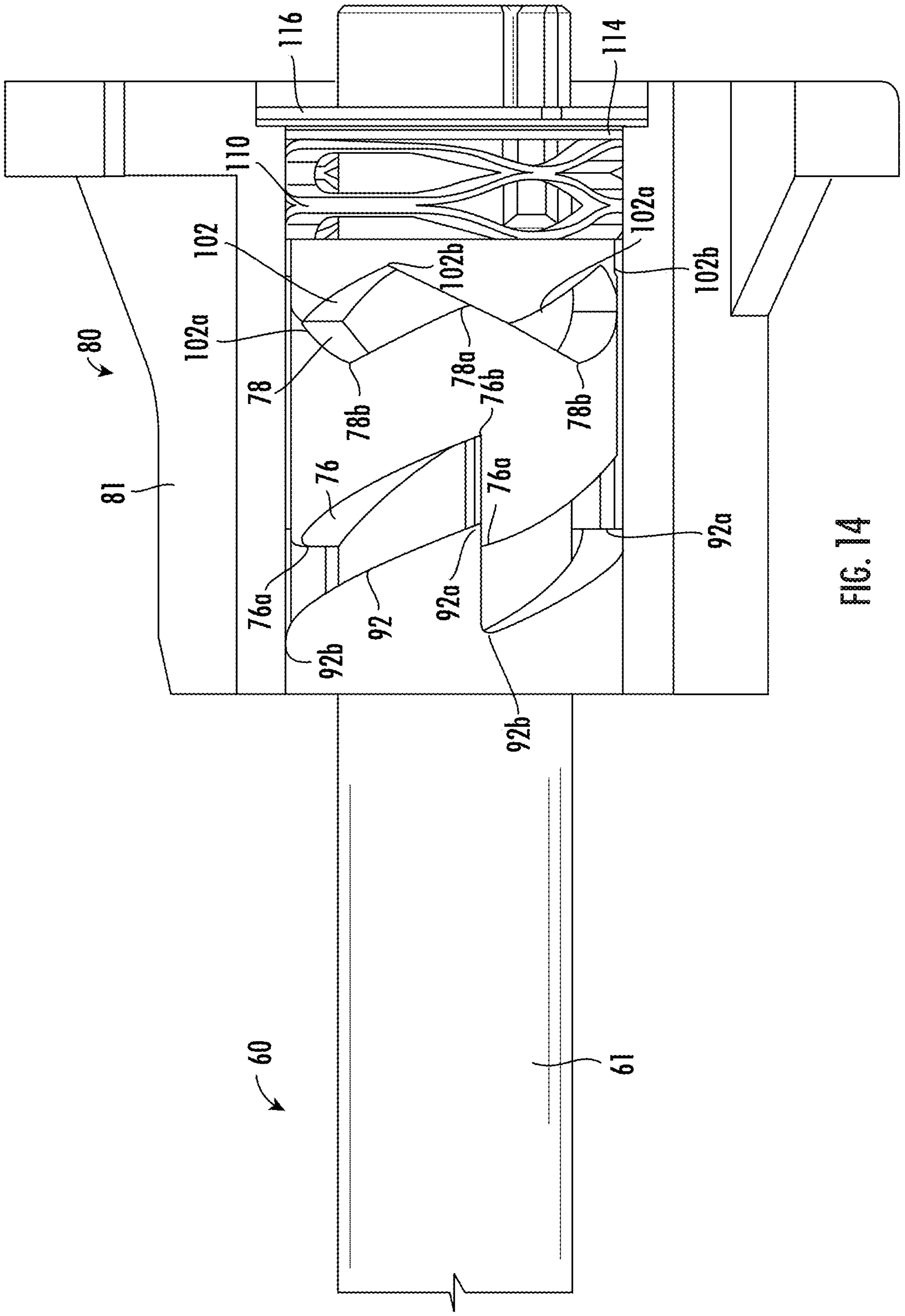
Figure 15:
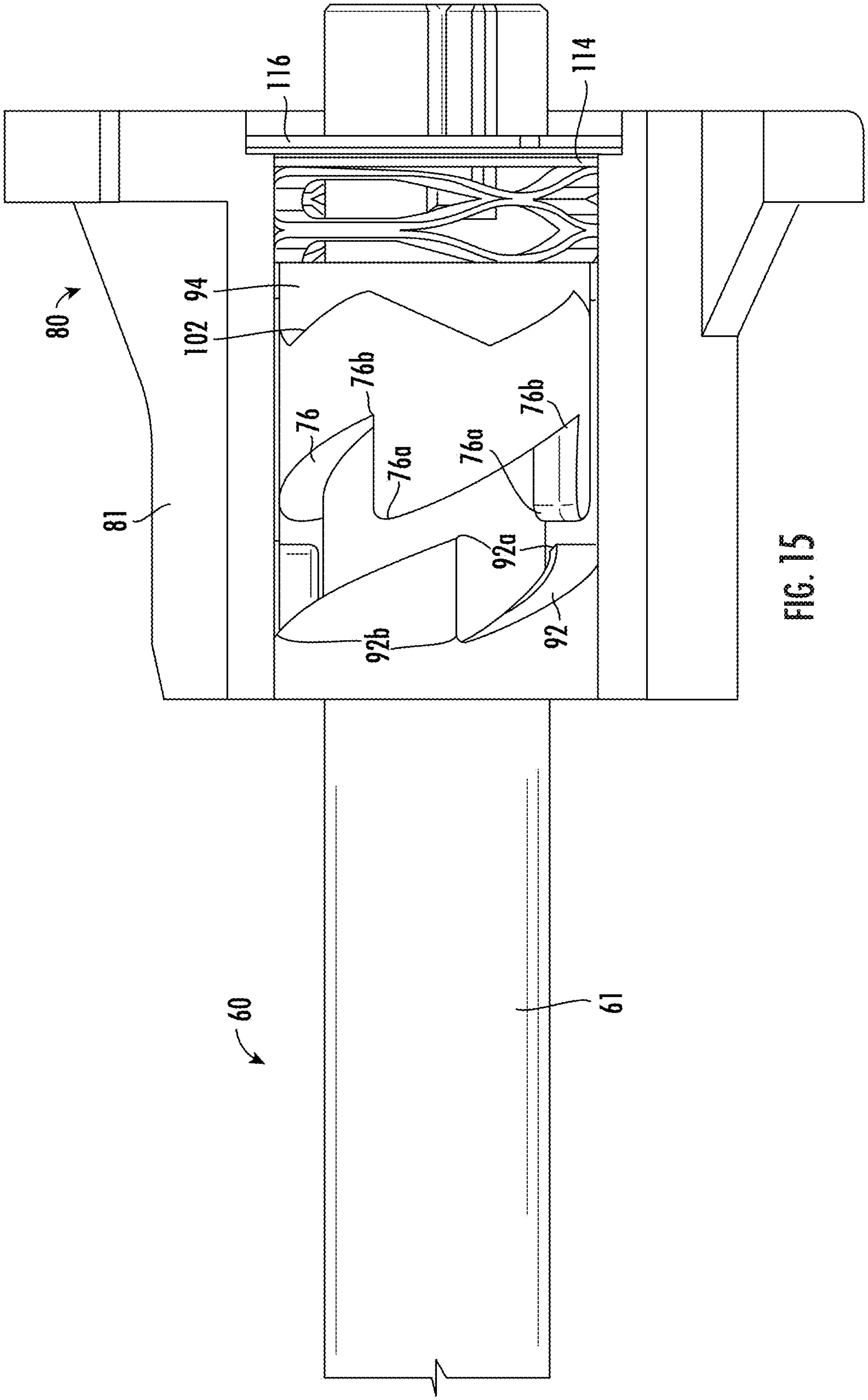
Figure 16:
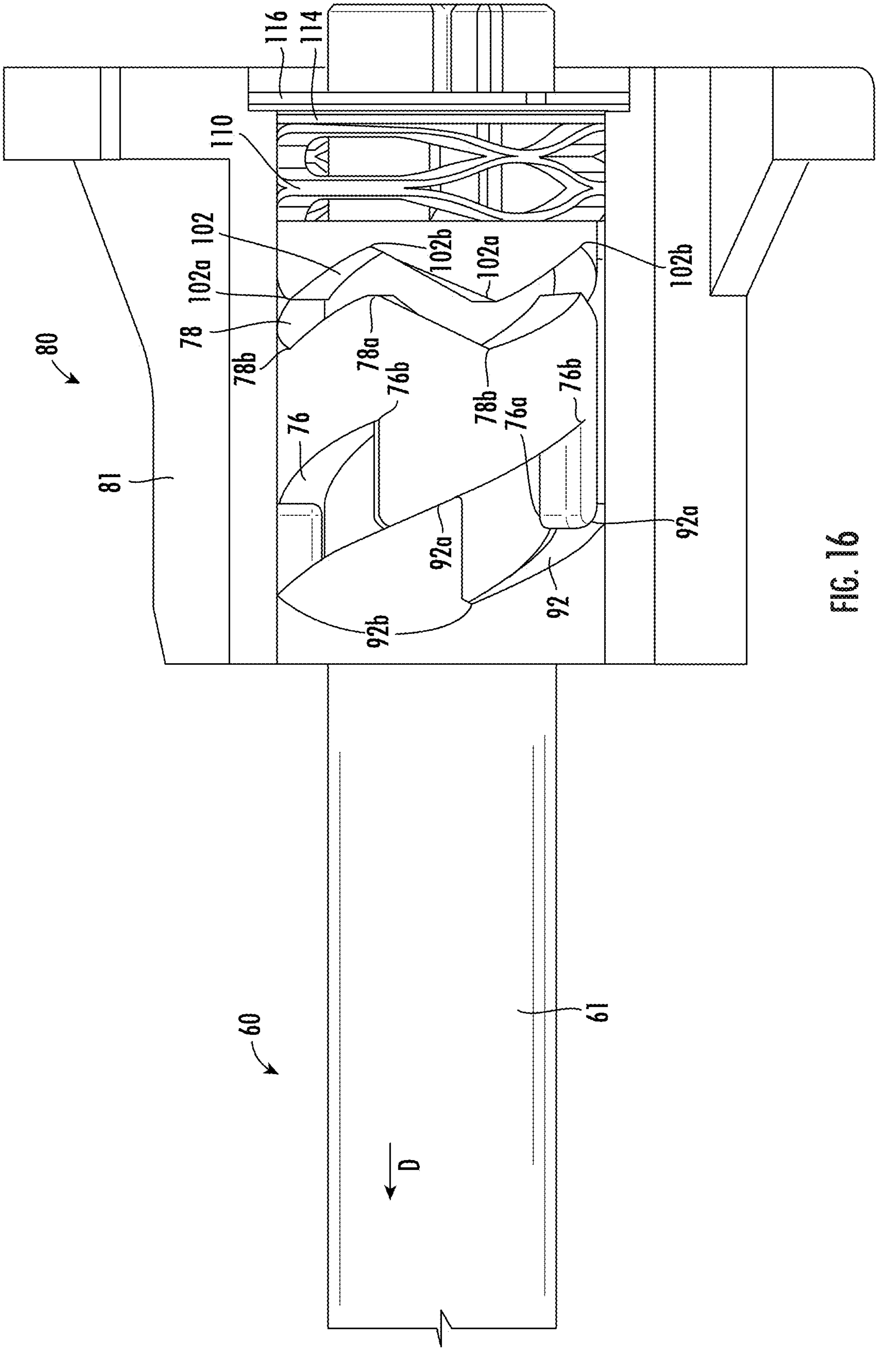
Figure 17:
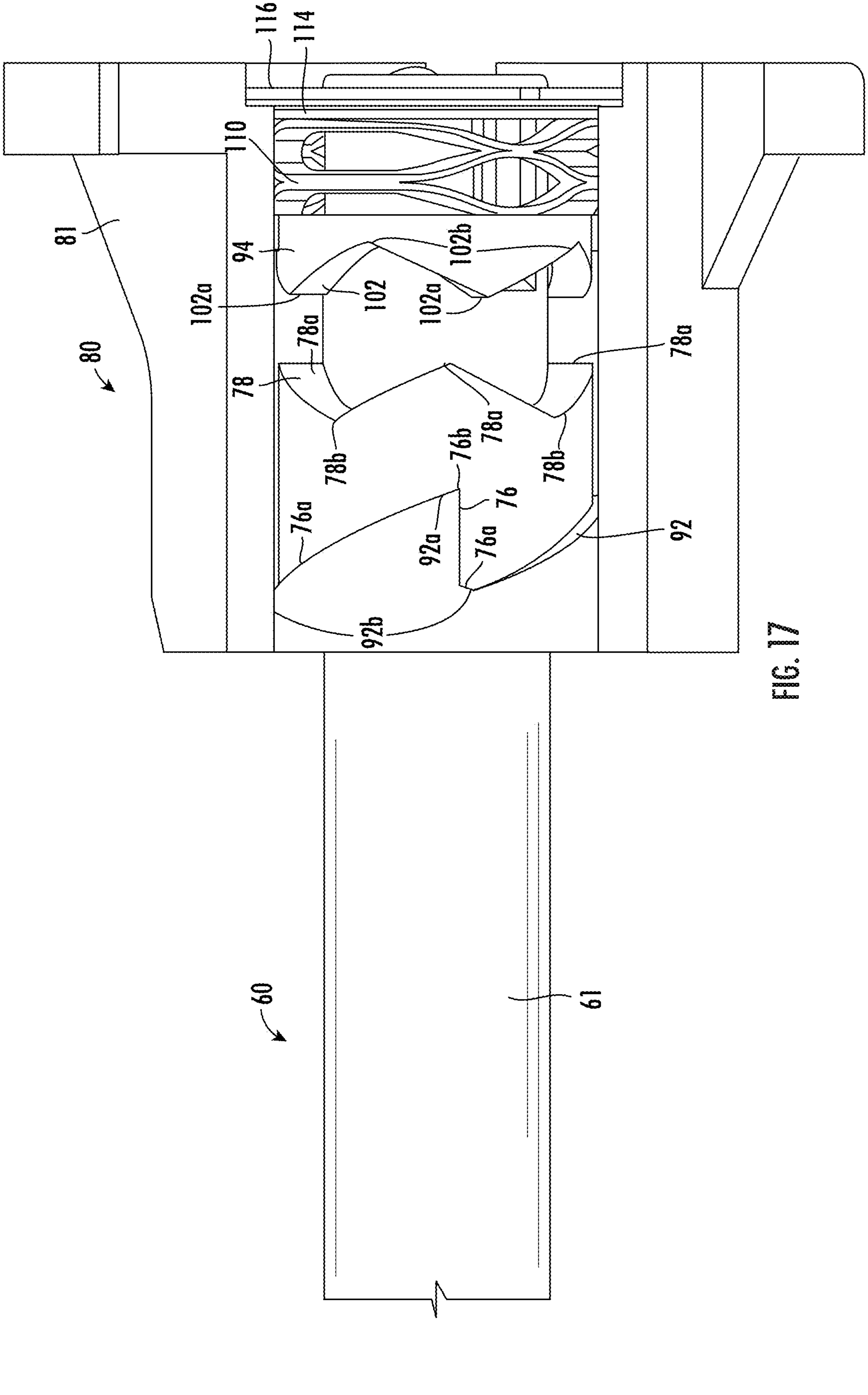

The user then releases pressure on the bolt head 30 such that the spring 112 returns the latch tail 60 and bolt head 30 to the extended position (see FIGS. 12D, 16 arrow D). As the latch tail 60 is moved linearly under the force of spring 112, the camming surface 76 of camming member 74 is moved into contact with the camming surface 92 formed on the leading wall of the latch plate 80 (FIG. 12D, 16). Because camming surface 92 is fixed in position in tail plate 80, but latch tail 60 is free to rotate relative to latch tail 80 engagement of camming surface 76 with camming surface 92 causes latch tail 60 to rotate about its longitudinal axis. The latch tail 60 is rotated in the same direction, arrow C, during this portion of angular rotation as it did during the first portion of angular rotation. Specifically, the peaks 76a on camming surface 76 contact near the peaks 92a on camming surface 92 such that as the latch tail 60 is moved linearly the camming surface 76 rides on camming surface 92 forcing the latch tail 60 to rotate relative to both the tail plate 80 and the bolt head 30. The camming surfaces 76 and 92 are configured such that the latch tail 60 rotates approximately one-half of the total distance required to unlock the bolt head 30 from the latch tail 60. In the present embodiment the latch tail 60 is rotated approximately 45 degrees. Linear and rotary movement of the latch plate continues until the peaks 74a of camming surface 74 are positioned in the troughs 92b of camming surface 92 and the peaks 92a of camming surface 92 are positioned in the troughs 74b of camming surface 74 (see FIG. 12E, 17). At this point the latch tail 60 is in the extended position and both linear and rotary movement of the latch tail 80 is stopped. The depression and extension of the bolt head 30 and latch tail 60 causes the latch tail 60 to rotate through the full angle required to unlock the bolt head 30 from the latch tail 30. In the present embodiment the latch tail 60 rotates 90 degrees relative to the bolt head.

As the latch tail rotates 90 degrees the tabs 68 formed on the end of the latch tail 60 are rotated from a position behind the projections 70 on the bolt head 30 to a position where the tabs 68 are positioned opposite the spaces between the projections 70. As a result the bolt head 30 may be removed from the latch tail 60 and from the casing 2 by pulling the bolt head linearly off of the latch tail 60 in a direction opposite the direction of arrow B.

To reverse the orientation of the bolt head 30, the bolt head is rotated 180 degrees about axis B-B and is inserted back into the casing 2 with the end of the latch tail 60 extending into bore 35. The bolt head 30 and latch tail 60 are depressed and released as previously described to rotate the latch tail another 90 degrees. In this position the projections 68 on the latch tail 60 are again positioned behind the projections 70 on the bolt head 80 such that the bolt head is locked on the latch tail.

The tool 150 is then removed from apertures 160 to allow the rearward movement of the tail plate 80. The retaining member 140 is mounted to the opposite side wall of the case 2 with the tabs 47 supported by bearing surfaces 144 for rotational movement. The front edge 140a of the retaining member 140 is positioned under the edge of the case 2. The distal end of the retaining member 140 is moved toward the case such that fastener 148 may be inserted into the retaining member 140 and secured to the case 2 to complete the reversal of the bolt head 30. The mortise lock 1 may then be operated in the reverse orientation. The steps may be repeated to reverse the orientation of the bolt head as needed.

Figure 22:
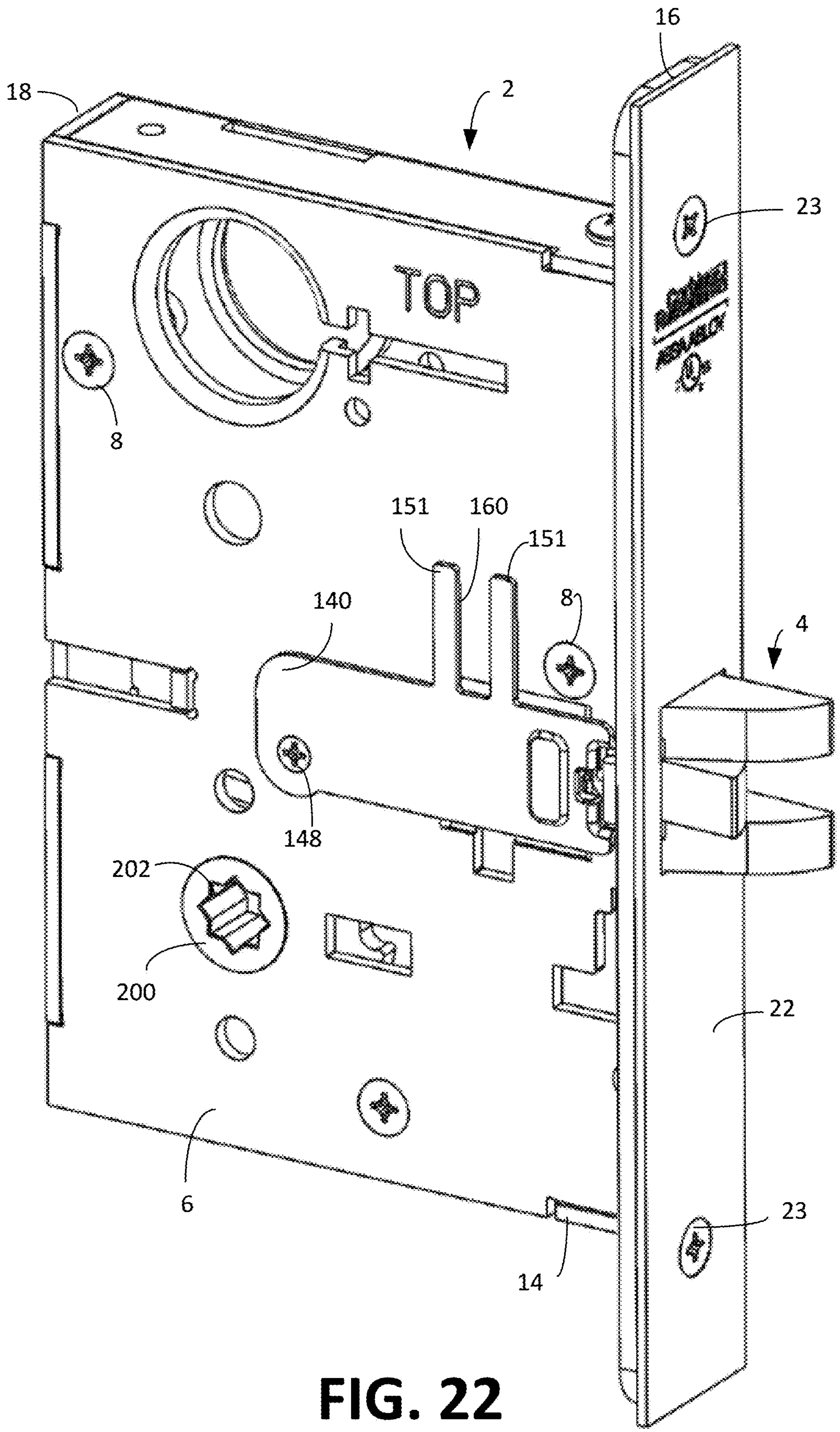
FIG. 22 is a perspective view of a mortise lock assembly according to embodiments of the present invention.

The one or more embodiments illustrated in FIGS. 22 through 32 will now be discussed in further detail, which may have the same, similar, and/or alternate features than were previously described with respect to FIGS. 1 through 21. FIG. 22 illustrates a mortise lock 1 comprising a case 2 and a reversible latch bolt 400. As previously discussed with respect to FIG. 1, the case 2 of FIG. 22 has the same or similar features as discussed with respect to FIG. 1. The case 2 of FIG. 22 also houses the lock components and is configured and dimensioned to be received in a mortise in a free, or unhinged, edge of a door.

Figure 23:
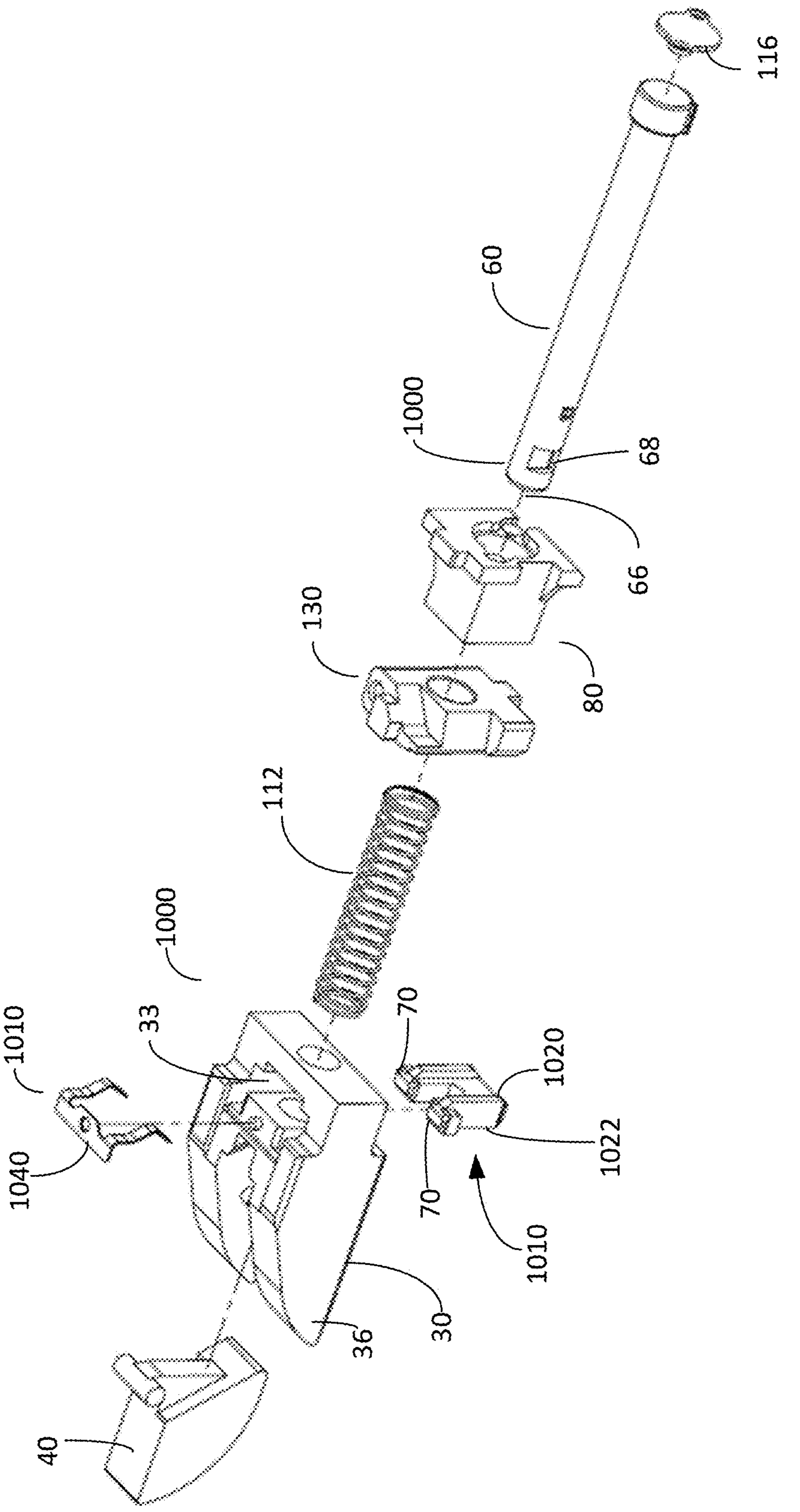
FIG. 23 is a perspective exploded view of the reversible latch bolt according to embodiments of the present invention.

Referring to FIG. 23, the latch bolt 400 comprises a bolt head 30 that is removably mounted on a latch tail 60 through the use of a reversibility assembly, such as a bolt head adjustment mechanism 1000, as previously referenced herein. However, unlike the bolt head adjustment mechanism 1000 previously described herein, it should be understood that the bolt head 30 may be operatively coupled to the latch tail 60 using one or more locking members 1010 that are removably operatively coupled to the bolt head 30. It should be understood that, the one or more locking members 1010 in this embodiment may be referred to as a clip 1020 (e.g., U-clip, V-clip, or the like) and a locking spring 1040.

As illustrated in FIGS. 23 through 29, the latch tail 60 is inserted through the tail plate 80 and the cradle 130. The tail plate 80 may be the same as, or similar to, the tail plate 80 previously discussed herein. The tail plate 80 may comprise a generally block shaped body 81, although the body may have other shapes and/or configurations. The body 81 defines a through hole 82 that extends entirely through the tail plate 80. The through hole 82 may be countersunk, have a key, a key hole, or the like that can be operative coupled to a mating flange, key, and/or key hole on the latch tail and/or latch plate (e.g., flange, key, or the like). In the embodiments illustrated in FIGS. 23 and 24 the latch tail 60 does not rotate with respect to the tail plate 80. Moreover, a tail retainer 116 (e.g., without the central opening) may be operatively coupled to the tail plate 80 over through hole 82 to prevent axial movement of the latch tail 60 with respect to the tail plate 80. The tail retainer 116 may be mounted to the tail plate 80 by any suitable mechanism and in the illustrated embodiment is riveted onto the tail plate 80. Other connection mechanisms may be used to secure the retaining ring to the tail plate including separate fasteners, welding or the like.

The latch tail 60 may be further operatively coupled to a spring 112 to create a latch tail sub-assembly. The spring 112 may be located between the bolt head 30 that will be operatively coupled to the latch tail 60 and/or the carriage 130 when assembled. As previously described herein, the latch tail 60 may comprise one or more stub locking members 68 (e.g., projected into the surface of the latch tail 60 in the illustrated embodiment). The stub 66 of the latch tail 60 may be inserted into one or more latch tail receiving apertures (e.g., bore 35, which as illustrated in FIG. 23 may include a discontinuous bore 35) of the bolt head 30. It should be understood that the bolt head 30 may further comprise a locking member aperture 37, which in some embodiments may intersect the one or more latch tail receiving apertures (e.g., bore 35). The locking member aperture 37 is configured to receive one or more removable locking members 1010 that are utilized to retain the stub 66 of the latch tail 60 within the bolt head 30. In some embodiments, the one or more locking members 1010 may comprise the clip 1020 and the locking spring 1040. The one or more locking members 1010 (e.g., clip 1020) may be operatively coupled to the stub locking members 68 (e.g., clip arms 1022 slid within channels within the latch tail 60).

Figure 24:
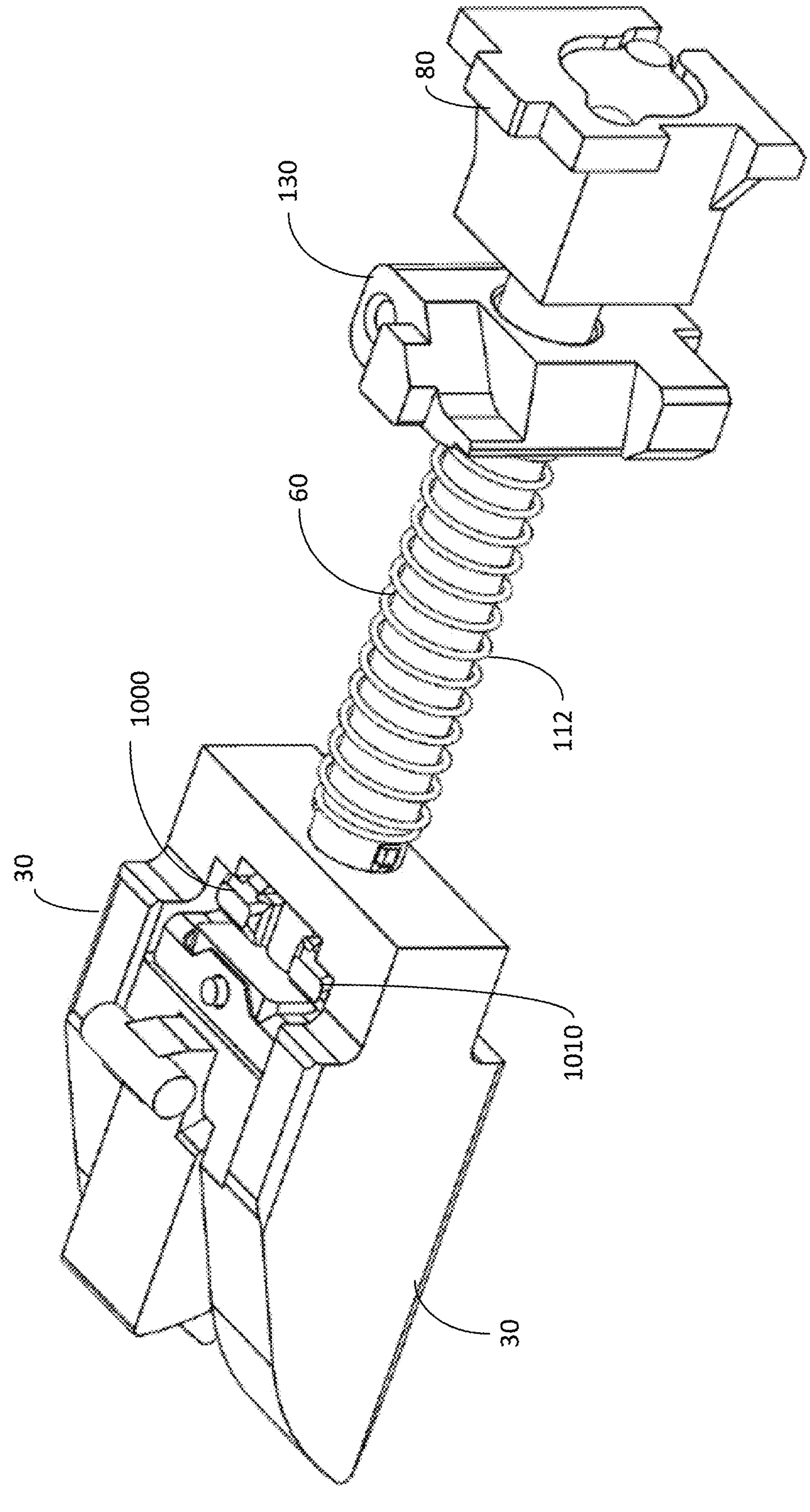
FIG. 24 is a perspective assembled view of the reversible latch bolt according to embodiments of the present invention.
Figure 25A:
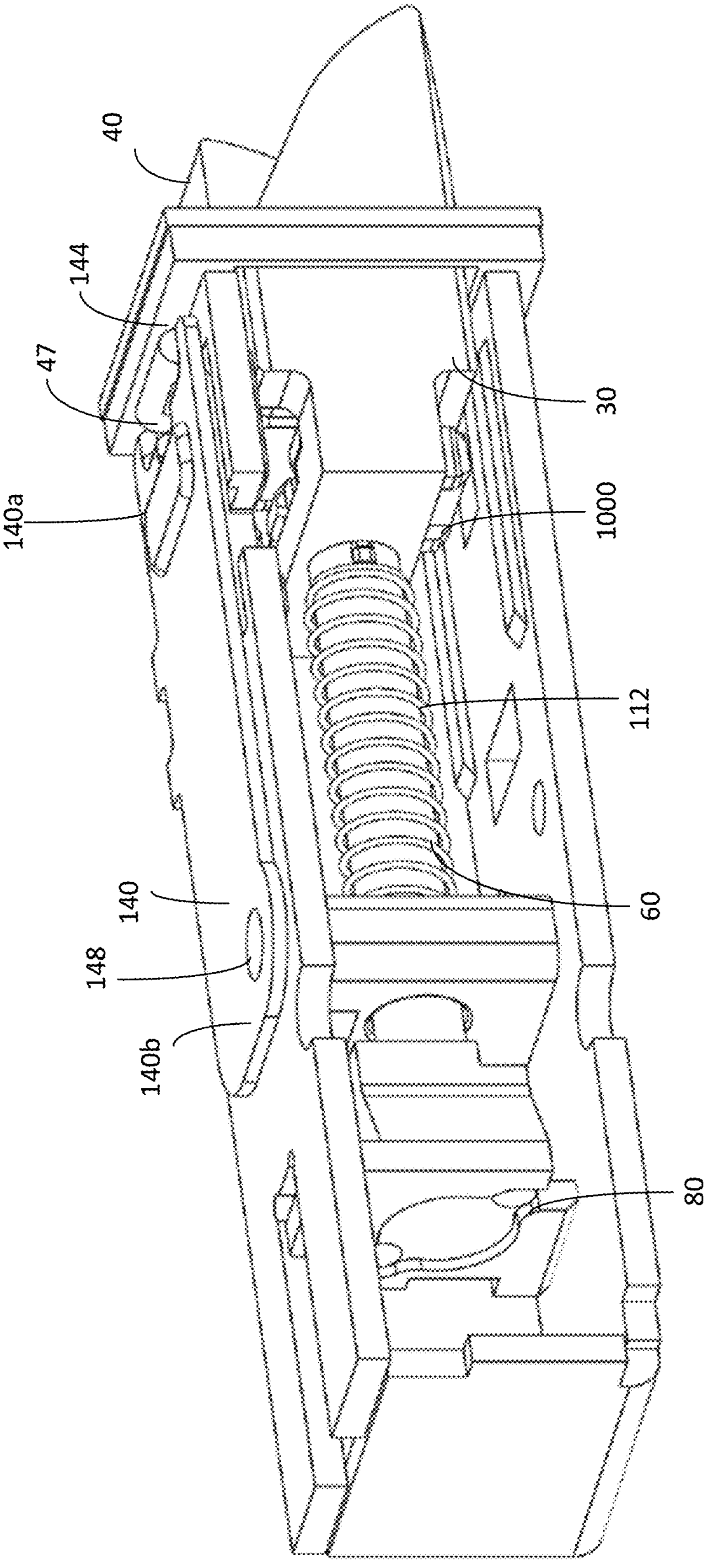
FIG. 25A is a perspective cut away view of the latch bolt in an extended position mounted in the case according to embodiments of the present invention.
Figure 25B:
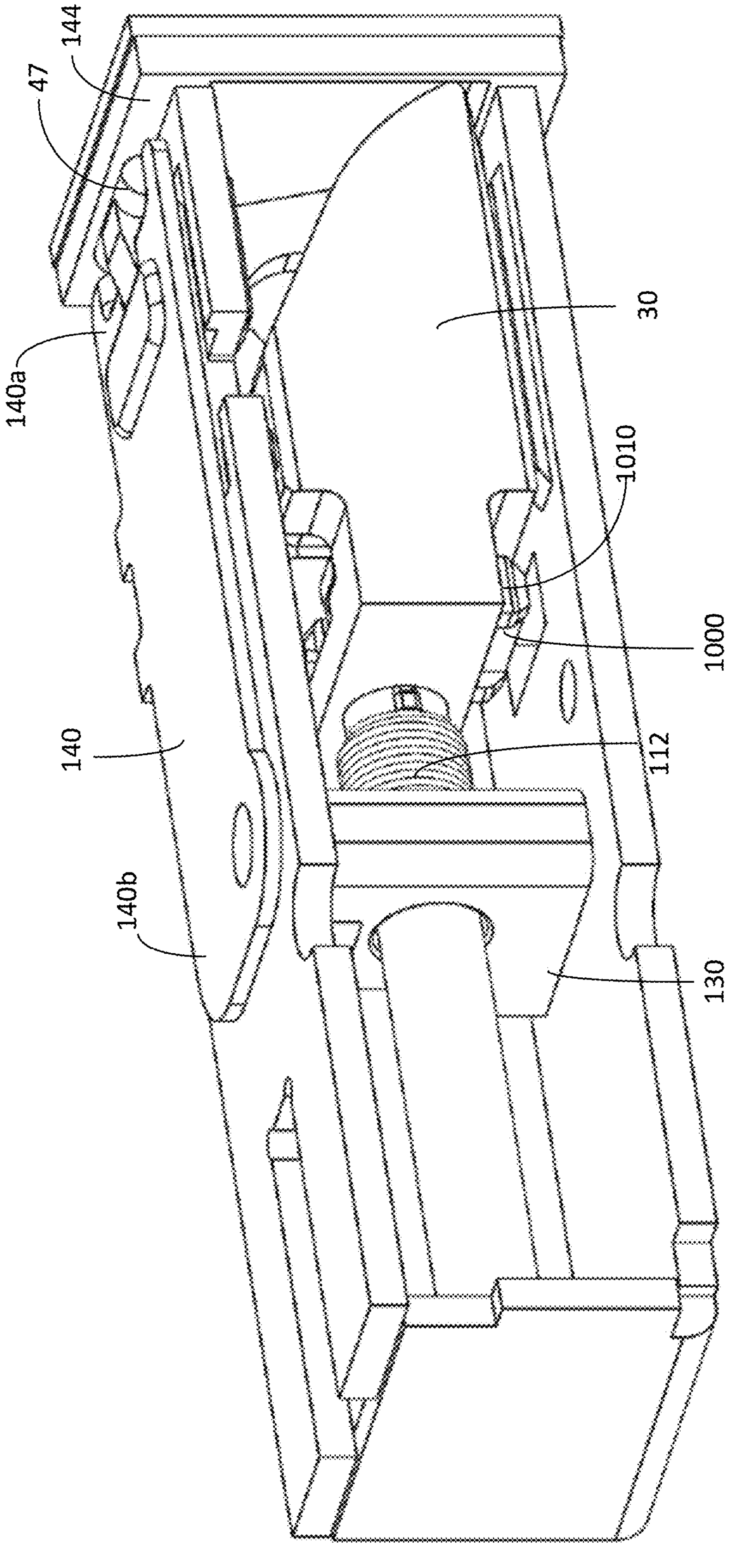
FIG. 25B is a perspective cut away view of the latch bolt in a retracted position mounted in the case according to embodiments of the present invention.
Figure 26:
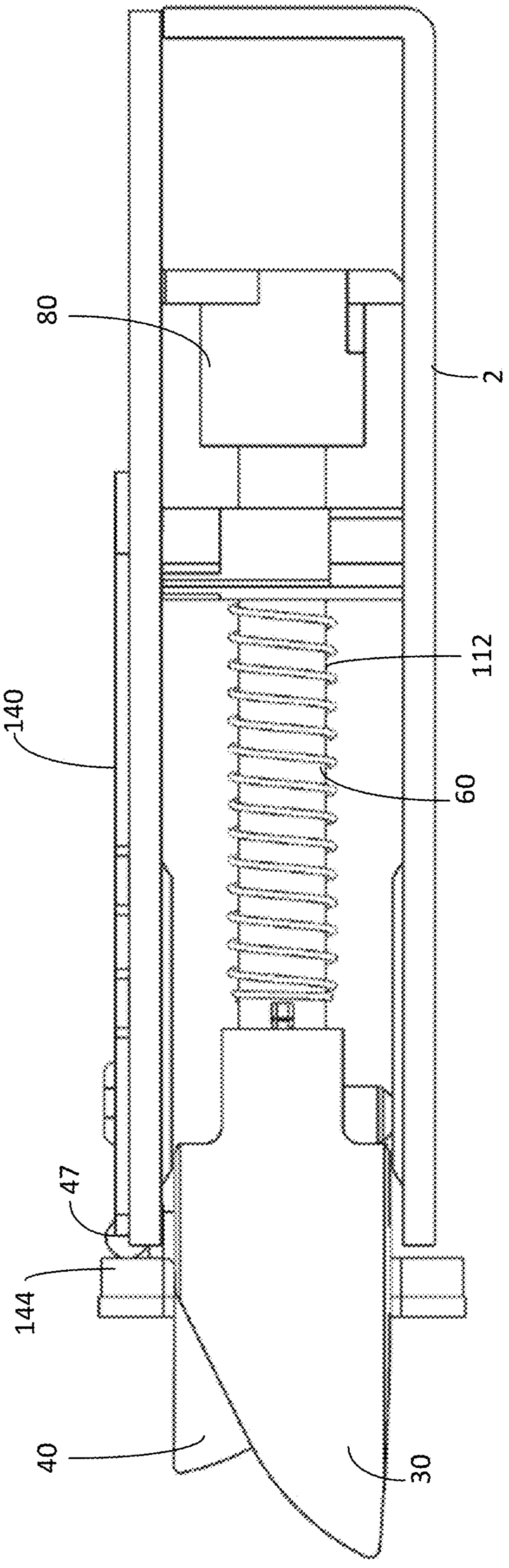
FIG. 26 is a top cut away view of the latch bolt mounted in the case according to embodiments of the present invention.
Figure 27:
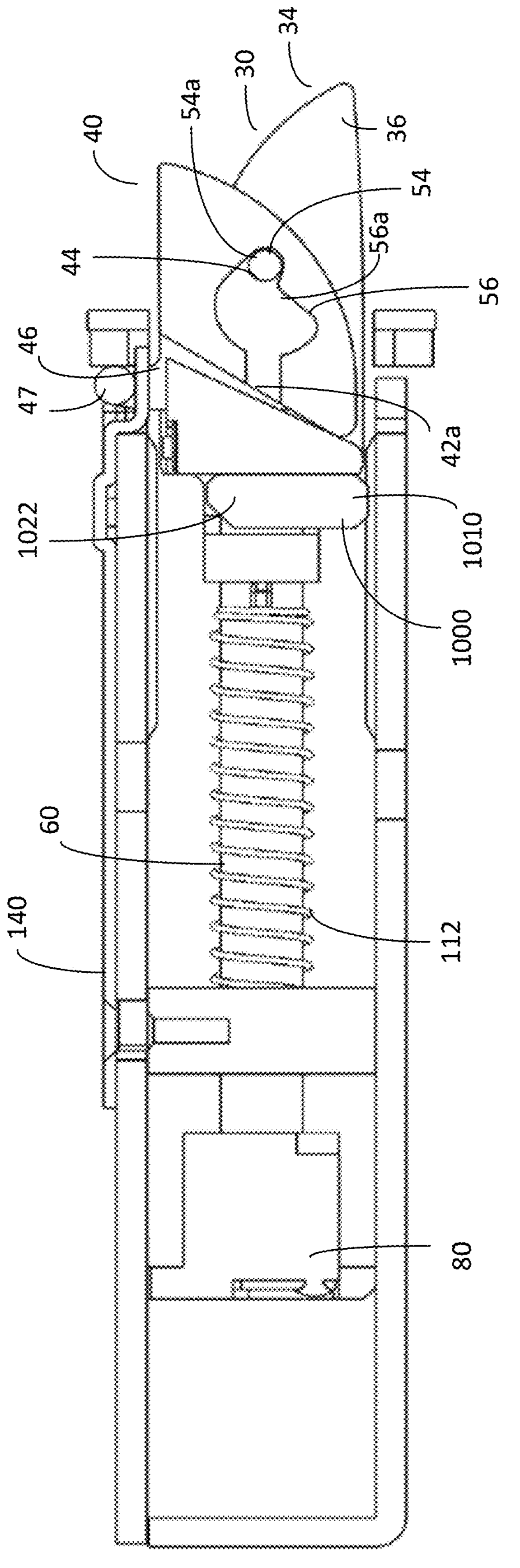
FIG. 27 is a top section view of the latch bolt with a flange removed mounted in the case according to embodiments of the present invention.
Figure 28:
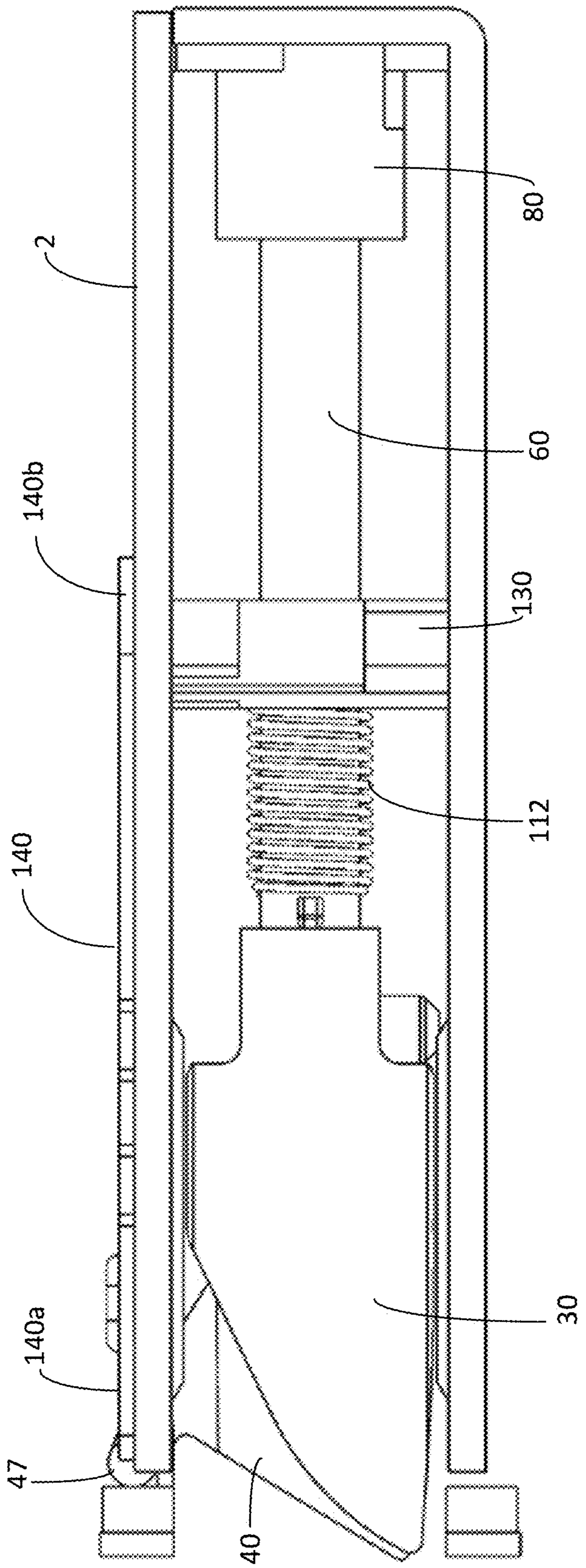
FIG. 28 is a top cut away view of the latch bolt mounted in the case and in a retracted position according to embodiments of the present invention.
Figure 29:
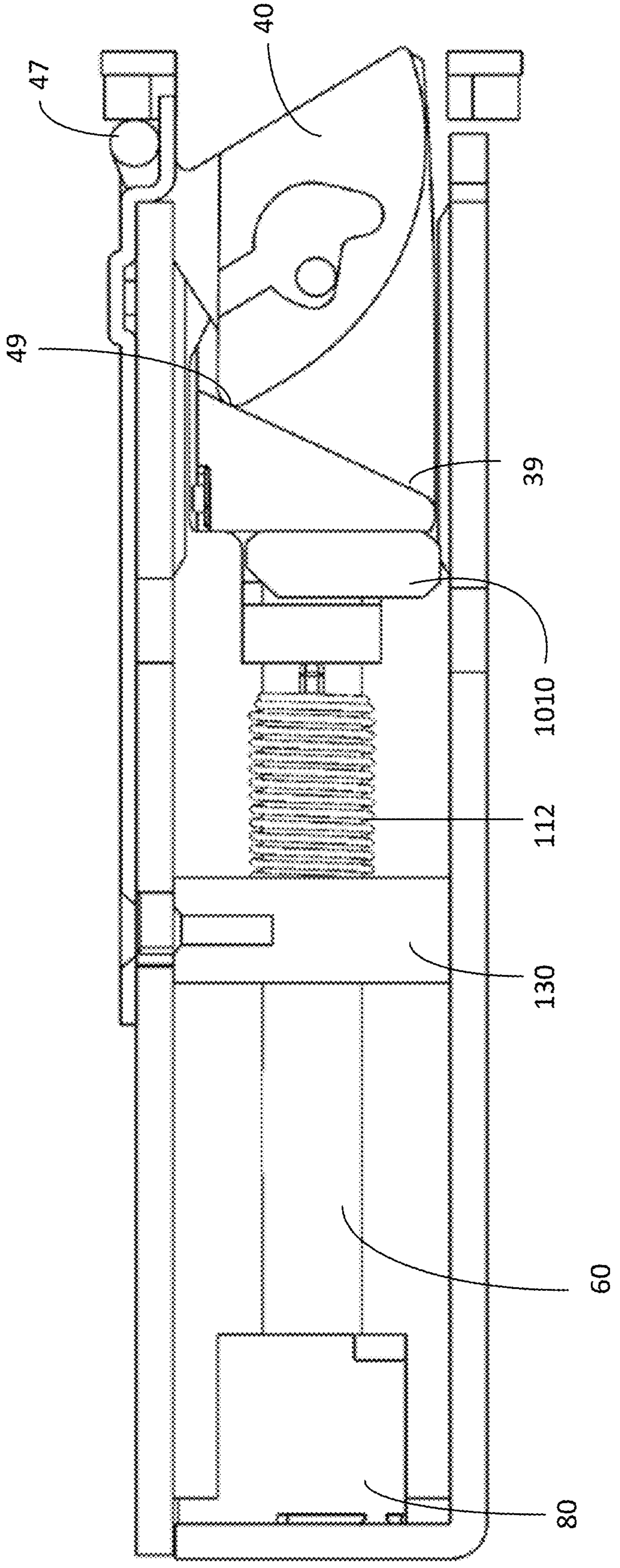
FIG. 29 is a top section view of the latch bolt with a flange removed mounted in the case and in a retracted position according to embodiments of the present invention.

It should be understood that the latch bolt 400 illustrated in FIGS. 23 and 24 will operate in a door the same or similar way as described with respect to the latch bolt 4 described with respect to FIGS. 4 through 6 and 18 through 21.

Figure 30:
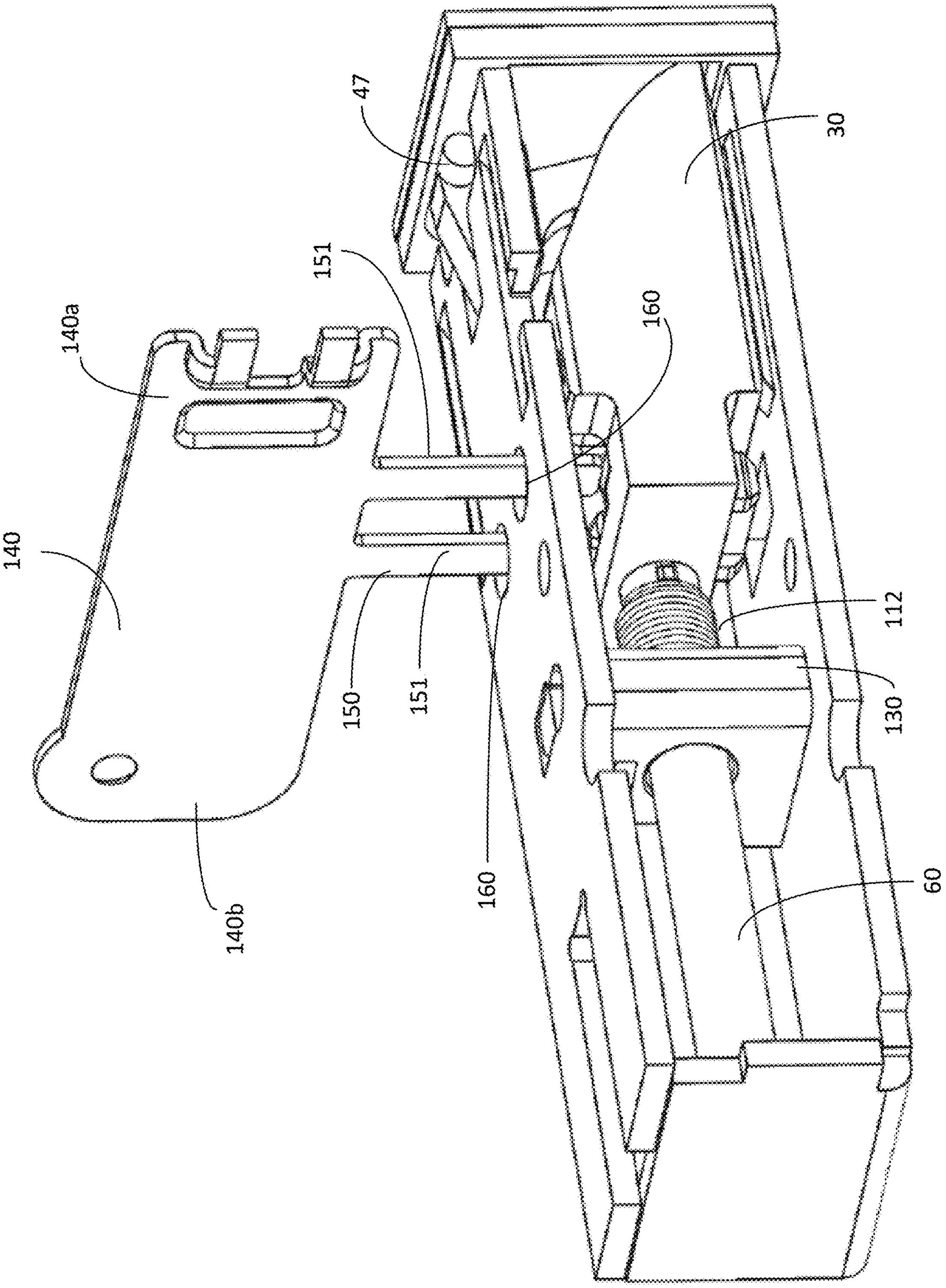
FIG. 30 is a perspective cut away view of the latch bolt in a retracted position mounted for tool insertion according to embodiments of the present invention.
Figure 31:
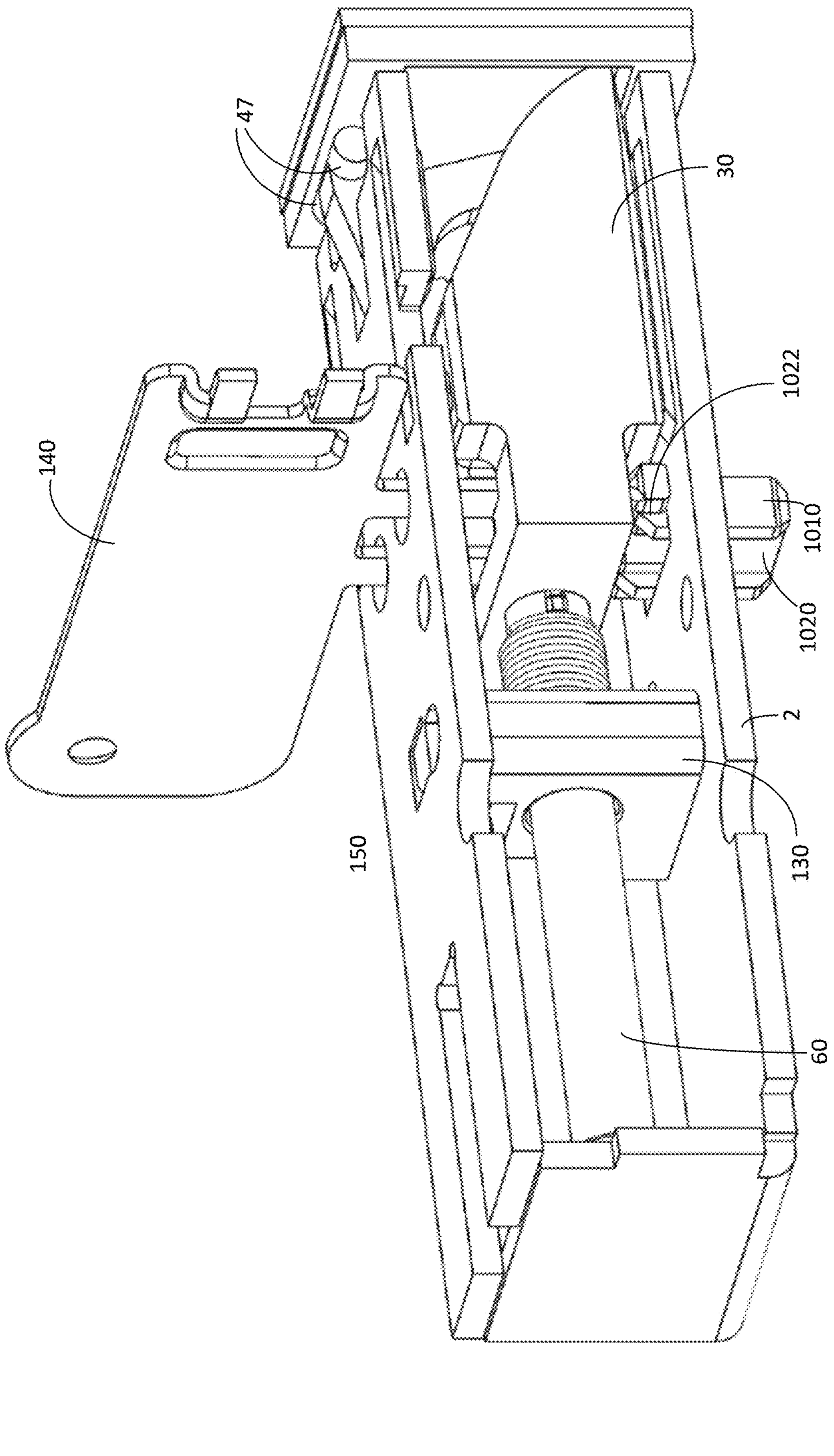
FIG. 31 is a perspective cut away view of the latch bolt in a retracted position mounted with the tool engaged according to embodiments of the present invention.
Figure 32:
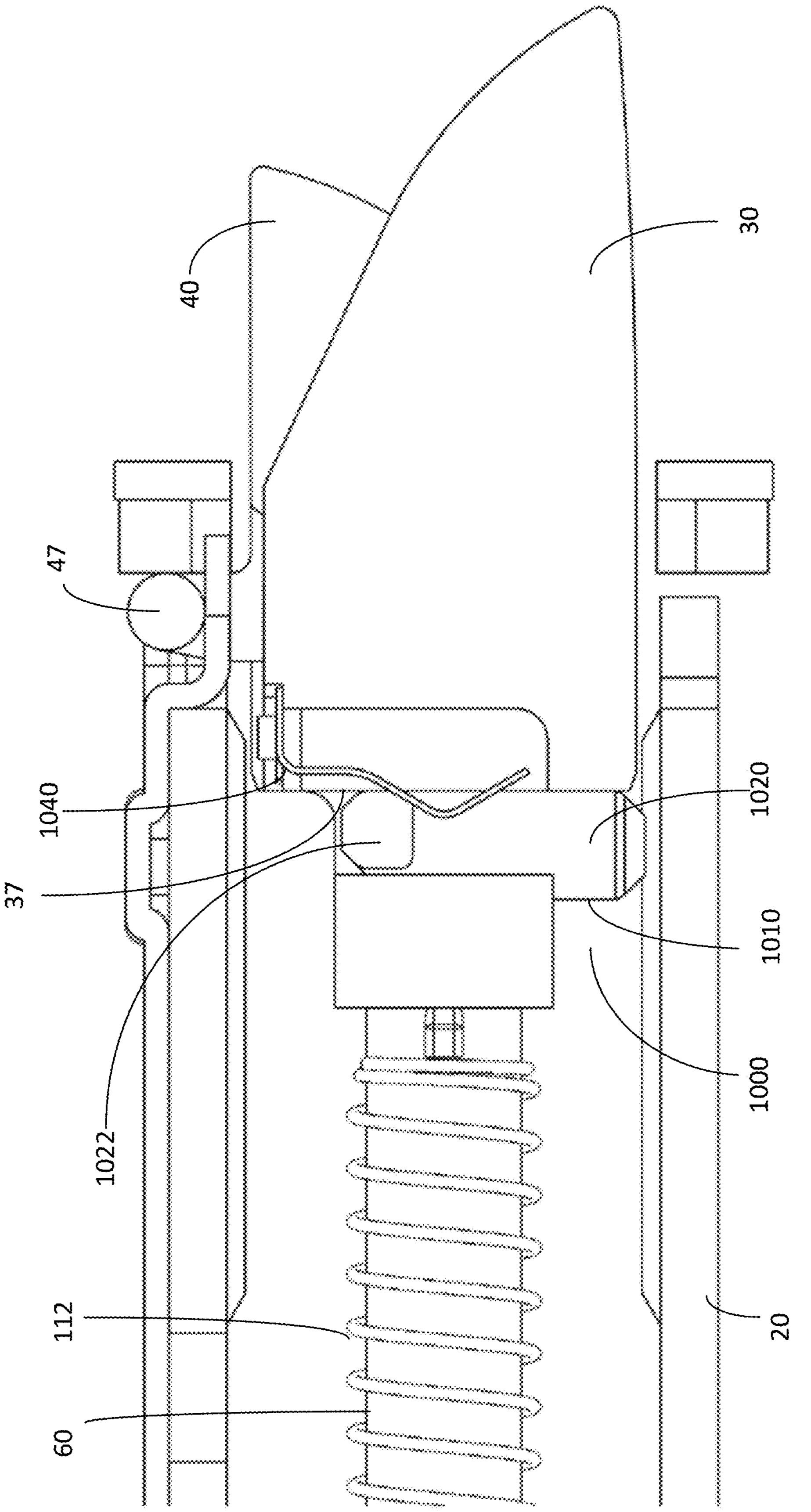
FIG. 32 is an expanded view of a bolt head adjustment mechanism according to embodiments of the present invention.

The reversibility of the latch bolt 400 will now be addressed in further detail with respect to FIGS. 30 and 31. As was previously discussed, the screw 148 is removed and the distal end 140*b* of the retaining member 140, which is lifted away from the case 2, such that the front edge 140*a* of the retaining member 140 may be removed from under the edge of the case 2. Removing the retaining member 140 releases tabs 47 of the anti-friction latch 40 from being secured to the case 2. It should be understood that with the retaining member 140 released and/or removed from the case 20, the latch bolt 400, specifically the bolt head 30 may be pushed into the case farther (e.g., to an assembly position) than it would normally move (e.g., the retracted position) with the retaining member 140 coupled to the case 2 (e.g., retaining the tabs 47). In this way, in the assembly position (or disassembly position) the one or more bolt head locking members 1010 (e.g., clip 1020) may be aligned with the one or more apertures 160 (e.g., locking release apertures) in the side wall of the case 2 (see FIGS. 30 and 31).

The tool 150 is then inserted into apertures 160 formed in the case side wall (see FIGS. 30 and 31). Specifically, the prongs 151 are inserted into apertures 160 such that the prongs 151 are disposed to release the bolt head locking member 1010 (e.g., the clip 1020) from operative coupling with the stub locking member 68 and/or remove the bolt head locking member 1010 (e.g., the clip 1020) from the bolt head locking aperture 37. Moreover, any rigid device that may be inserted into the one or more apertures 160 may release the bolt head locking member 1010 (e.g., clip 1010). Alternatively, with the retaining member 140 removed, a user may be able to disengage (or reengage during assembly) the one or more locking members 1010 by hand (e.g., using a finger, engaging another component in the case 2 that disengages the one or more locking members 1010, or the like).

A user may pull the bolt head 30 out of the case. It should be understood that even with the bolt head removed the bolt head locking member 1010 (e.g., the clip) may remain located within the case 2. In particular, a portion of the bolt head locking member 1010 may extend outside of a side wall of the case, as illustrated by FIG. 31. However, the bolt head locking member 1010 may not be removed from the case 2 due to arms 1022 that engage with the case (e.g., an inside wall of the case 2). Furthermore, when the bolt head is removed, the spring 112 will fire the latch tail 60 back into an extended position, which will retain the bolt head locking member 1010 (e.g., the clip) between the latch tail 60 and the wall of the case 2. After the bolt head 30 is removed from the case 2, it is rotated 180 degrees (e.g., from a left hand orientation to a right hand orientation, or from a right hand ordination to a left hand orientation) and reinserted into the case 2. The user may push the bolt head 30 back into a position (e.g., assembly position) where the bolt head locking aperture 37 lines up with the one or more bolt head locking members 1010. Thereafter, the one or more locking members 1010 may be re-engaged, such as the clip 1020 may be re-inserted into the bolt head locking aperture 37 to engage with the stub locking members 68 on the latch tail 60. The bolt head locking member 1010 may be reengaged in the same way that it was removed, as previously discussed herein. Finally, the retaining member 140 is operatively coupled back to the case 2, such as on the opposite side of the case wall, in order to secure the tabs 47 of the stub 46 of the anti-friction latch 40 back into the desired pivot location.

As illustrated in FIG. 33, instead of the bolt head locking member 1010 being a clip, the bolt head locking member 1010 may comprise a set-screw that be operatively coupled to the latch tail 60, as previously discussed with respect to the clip.

Figure 34:
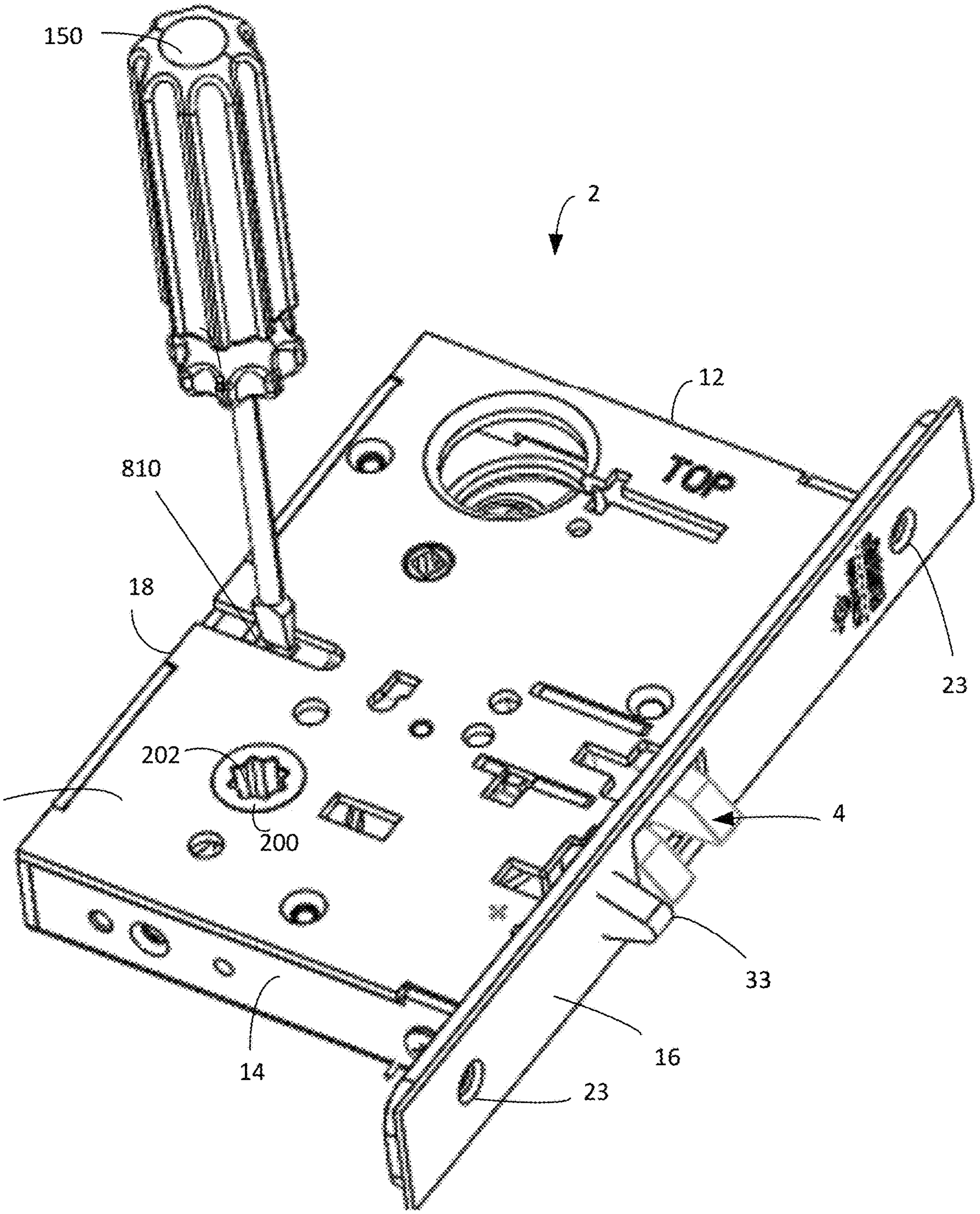
FIG. 34 is a perspective view of a mortise lock assembly according to embodiments of the present invention.

The one or more embodiments illustrated in FIGS. 34 through 39 will now be discussed in further detail, which may have the same, similar, and/or alternate features than were previously described with respect to FIGS. 1 through 21, FIGS. 22-32, and/or FIG. 33. FIG. 34 illustrates a mortise lock 1 comprising a case 2 and a reversible latch bolt 800. As previously discussed with respect to FIG. 1 and FIG. 22, the case 2 of FIG. 34 has the same or similar features as discussed with respect to FIG. 1 and FIG. 22. The case 2 of FIG. 34 also houses the lock components and is configured and dimensioned to be received in a mortise in a free, or unhinged, edge of a door.

Figure 35:
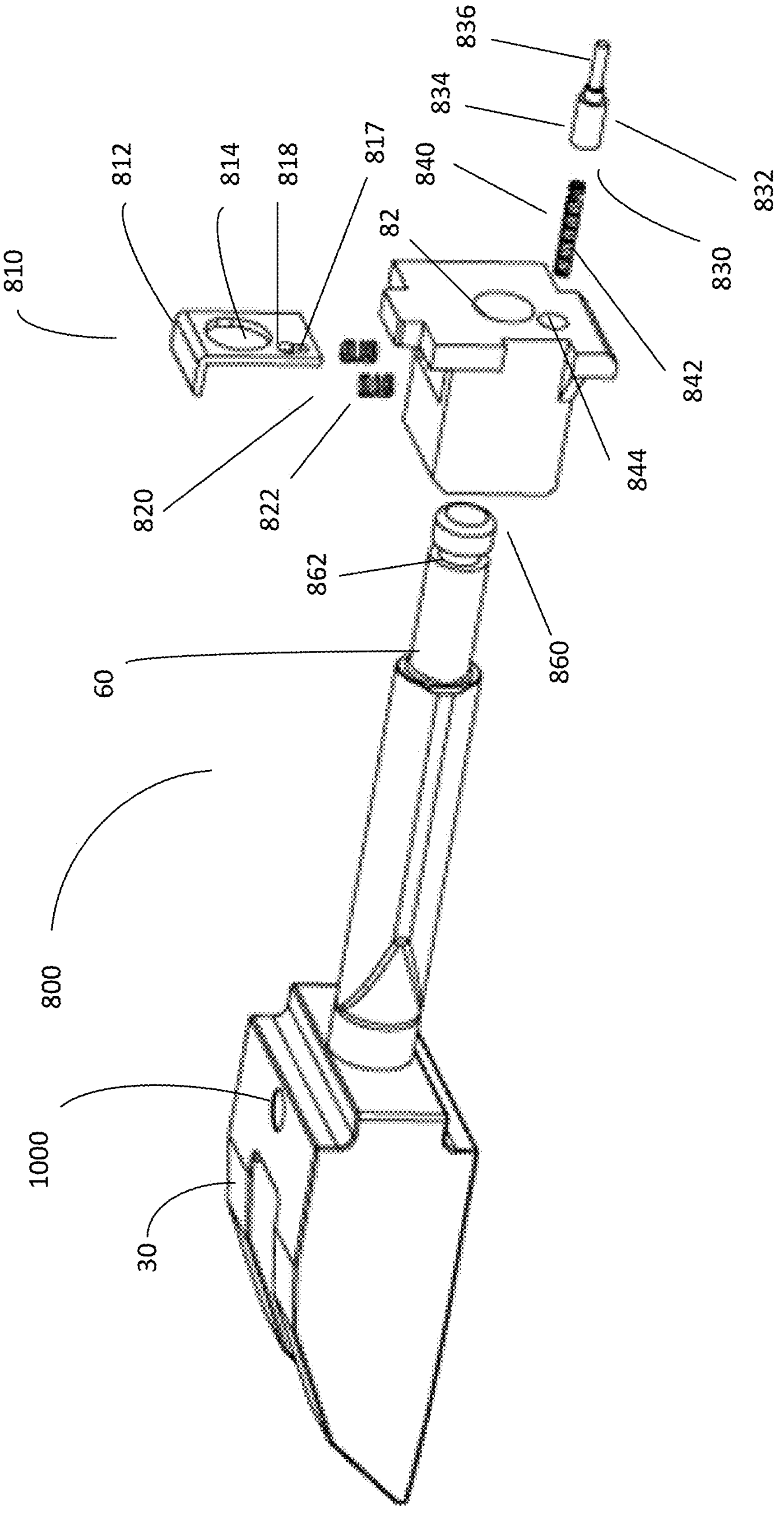
FIG. 35 is a perspective exploded view of the reversible latch bolt according to embodiments of the present invention.
Figure 36:
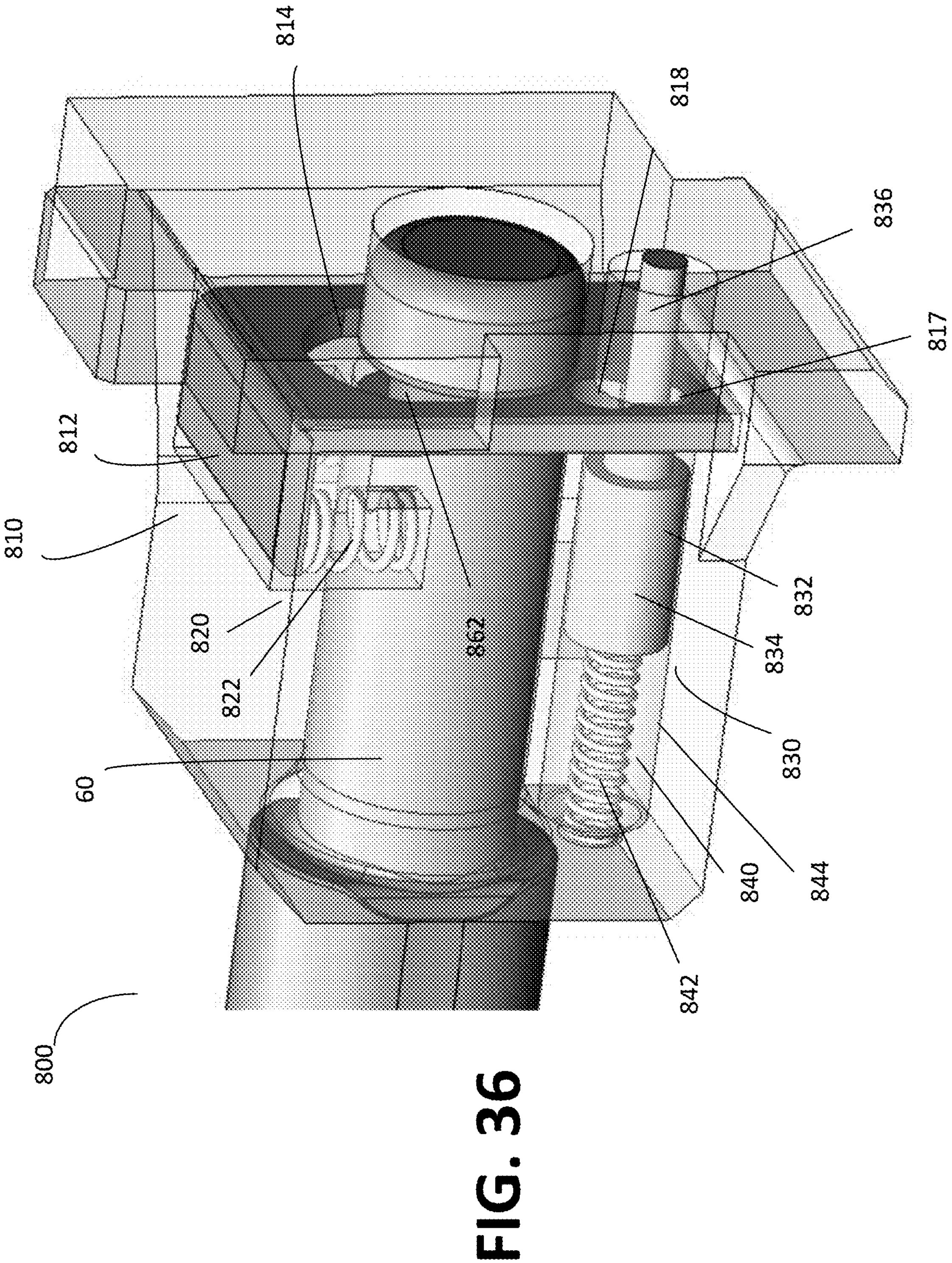
FIG. 36 is a perspective view of the tail plate portion of the reversible latch bolt according to embodiments of the present invention.
Figure 37:
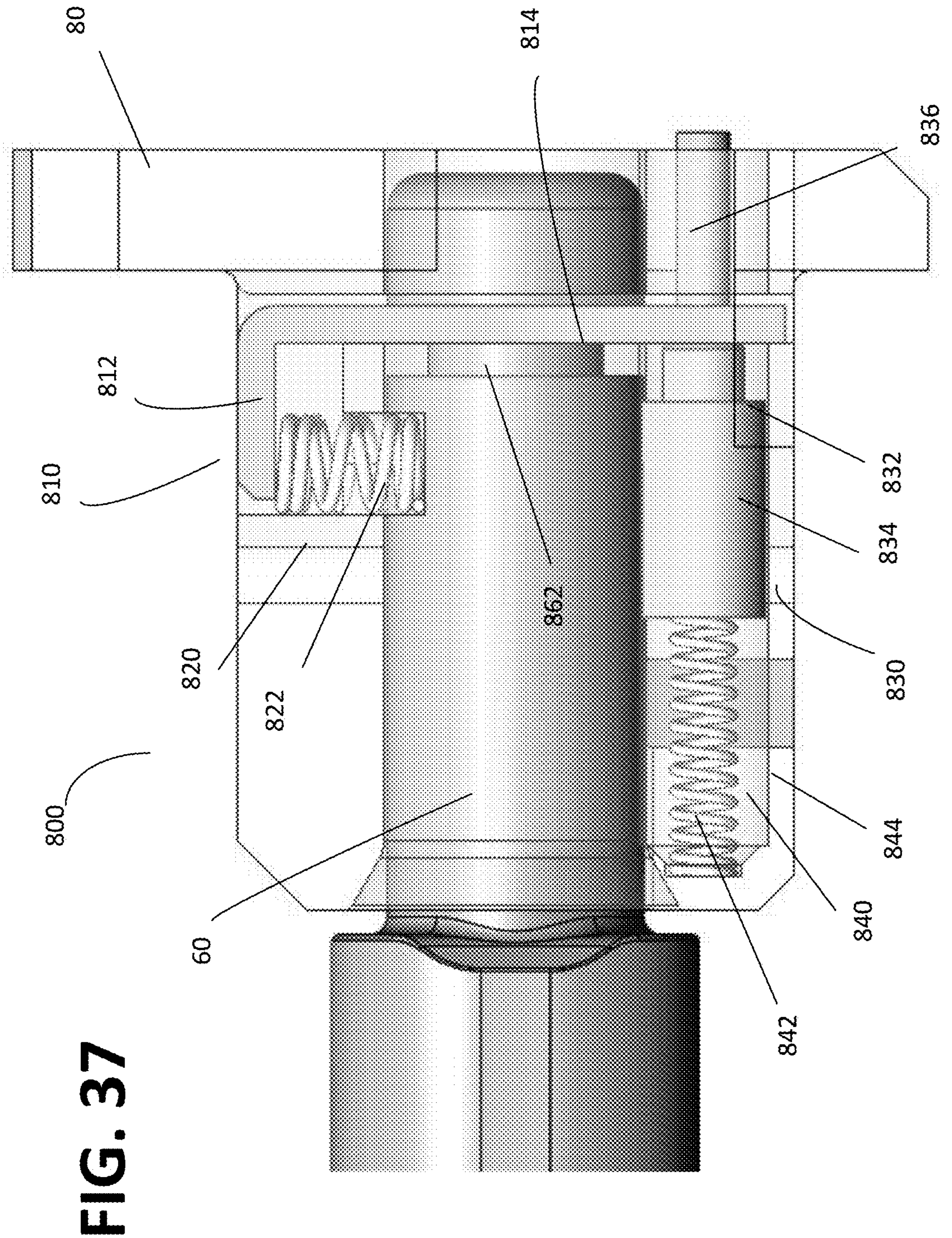
FIG. 37 is a side view of the tail plate portion of the reversible latch bolt according to embodiments of the present invention.
Figure 38:
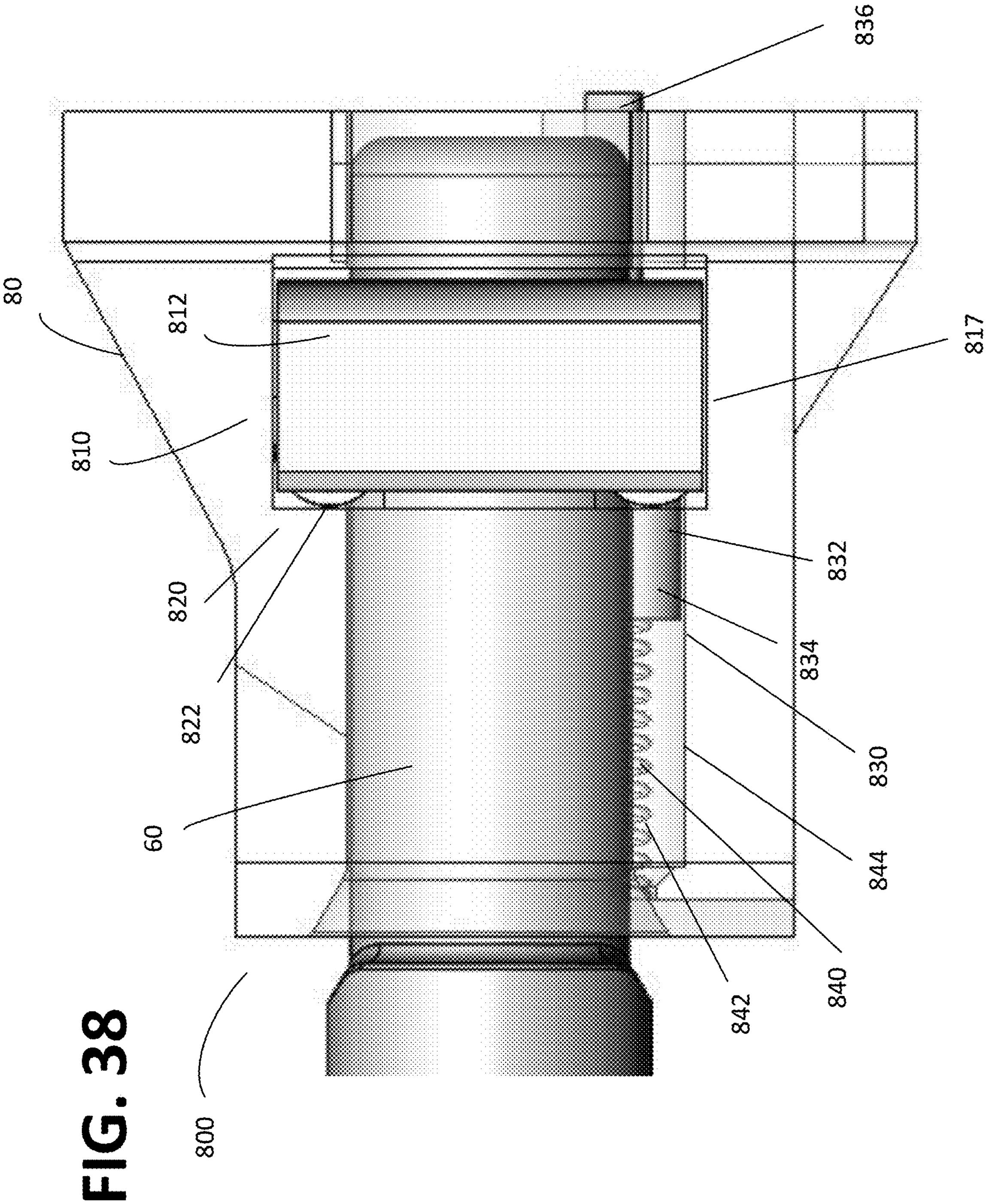
FIG. 38 is a top view of the tail plate portion of the reversible latch bolt according to embodiments of the present invention.

Referring to FIG. 35, the latch bolt 800 comprises a bolt head 30 that is removably mounted on a latch tail 60 through the use of a bolt head adjustment mechanism 1000, as previously referenced herein. Moreover, as illustrated in FIGS. 35, the latch tail 60 is inserted through the tail plate 80 (e.g., with or without a cradle 130). The tail plate 80 may be the same as, or similar to, the tail plate 80 previously discussed herein. The tail plate 80 may comprise a generally block shaped body 81, although the body may have other shapes and/or configurations. The body 81 defines an aperture 82 in the tail plate 80 (e.g., a through hole, or the like) that extends at least partially into or entirely through the tail plate 80. The aperture 82 of the tail plate 80 may be countersunk, have a key, a key hole, or the like that can be operatively coupled to a mating flange, key, and/or key hole on the latch tail 80.

FIGS. 34 through 39 further illustrate other embodiments of a reversibility assembly that is utilized to allow for reversing the orientation of the bolt head 30 and/or the latch tail 60 without having to open the casing 2, as previously discussed herein. As illustrated in FIG. 35, the tail plate 80 may be operatively coupled to a catch 810 (e.g., a catch plate 812), a catch biasing member 820 (e.g., one or more catch springs 822, such as a catch compression spring), a restraint member 830 (e.g., pin 832, or the like), a restraint biasing member 840 (e.g., an engagement spring 842), or the like.

As illustrated in FIGS. 35 to 39, the latch tail 60 and tail plate 80 may have a connector 860, such as one or more locking members. For example, the latch tail 60 may have a tail lock 862 (e.g., channel, protrusions, keys, or the like), which is used for operatively coupling with a tail plate locking member, such as within a catch 810 of the tail plate 80. That is, in some embodiments, the catch 810 may comprise a catch lock 814, such as a tail aperture (e.g., a through-hole, or the like), channel, key, protrusion(s), or the like. When the catch 810 is in the disengaged position the latch tail 60 (e.g., the tail lock 862) may be inserted into and/or removed from the catch 810 (e.g., to and/or from the catch lock 814) operatively coupled to the tail plate 80. That is, the tail lock 862 and the catch lock 814 may be disengaged. Alternatively, when the catch 810 is in the engaged position the tail lock 862 is engaged with the catch lock 814 and the latch tail 60 may not move with respect to the tail plate 80. For example, a portion of the tail aperture of the catch 810 may be located within a channel of the catch 810. In this way, the tail lock 862 is engaged with the catch lock 814 to allow the bolt head 30 and/or the latch tail 60 to be engaged for assembly of the bolt head 30 and/or the latch tail 60 to the tail plate 80. Furthermore, while the tail lock 862 is illustrated as a channel and the catch lock 814 is illustrated as a hole, the tail lock 862 and/or the catch lock 814 (e.g., the connector 860, or the like) may be any type of locking feature or combination of locking features (e.g., one or more locking members), as previously discussed herein. For example, the locking features may be stubs, keys, protrusions, or other like locking features.

During operation, the catch 810 may be moved from an engaged (e.g., locked position) to a disengaged position (e.g., unlocked position) through the use of the catch biasing member 820. For example, the catch biasing member 820 may comprise one or more catch springs 822, such as one or more compression springs, or the like. The catch 810 may be pressed such that the catch biasing member 820 is compressed, in order to disengage the connector 860, such as disengage the tail lock 862 from the catch lock 814. Moreover, it should be understood that the catch 810 may be held in the disengaged position through the use of a restraint member 830. In some embodiments, the restraint member 830 may be a pin 832, or other like member that may have portions of different thicknesses (e.g., of any type of cross-section, such as circle, oval, square, rectangular, uniform, non-uniform, or the like). For example, the pin 832 may have a first portion 834 (e.g., a first pin portion) with a diameter that is different than (e.g., smaller than) a second portion 836 (e.g., a second pin portion). Moreover, the catch 810 may have one or more restraint apertures 816 (e.g., a single aperture having different sizes, such as a slot as illustrated, separate apertures, or the like). In some embodiments, the one or more restraint apertures 816 may vary in size, and in particular, as illustrated may have a first catch aperture portion 817 or a second catch aperture portion 818. The first catch aperture portion 817 may be configured for operative coupling with (e.g., to mate with, or the like) the first portion 834 of the pin 832 when the catch 810 is in the engaged position (e.g., to keep the catch 810 in the engaged position, allow for moving of the catch in the desired orientation and/or direction, or the like). That is, the first catch aperture portion 817 has an opening (e.g., diameter, or the like) slightly larger than the size (e.g., diameter, or the like) of the first portion 834 of the pin 832. Furthermore, the second catch aperture portion 818 may be configured for operative coupling with (e.g., to mate with, or the like) the second portion 836 of the pin 832 when the catch 810 is moved to the disengaged position (e.g., to keep the catch 810 in the disengaged portion). That is, the second catch aperture portion 818 has an opening (e.g., diameter, or the like) slightly larger than the size (e.g., diameter, or the like) of the second portion 836 of the pin 832. Moreover, the restraint member 830 may be operatively coupled to the tail plate 80 through the use of a restraint tail plate aperture 844 in the tail plate 80 and a restraint biasing member 840, such as a restraint spring 842 (e.g., a compression spring). For example, the restraint biasing member 840 (e.g., the restraint spring 842) and at least a portion of the restraint member 830 may be operatively coupled to the tail plate 80 within the restraint tail plate aperture 844. As such, when the catch 810 is in the engaged position the restraint biasing member 840 may be constrained (e.g., spring may be compressed within the restraint tail plate aperture 844) such that the restraint member 830 is held in the deactivated position. For example, the first portion 834 of the pin 832 may be located within the first catch aperture portion 817 of the one or more restraint apertures 816. When the catch 810 is moved from the engaged position to the disengaged position, the restraint member 830 may be moved from the deactivated position to the activated position. For example, the pin 832 is fired, through the activation of the restraint biasing member 840 (e.g., restraint spring 842), such that the second portion 834 of the pin 834 is moved into the second catch aperture portion 818 of the catch 810. In this way, the restraint member 830 holds the catch 810 in the disengaged position.

In the disengaged position of the catch 810 and the activated position of the restraint member 830, a portion of the restraint member 830 (e.g., a first portion 834, a second portion, or the like) may extend past the tail plate 80. For example, a portion of the restraint member 830 may be located adjacent a portion of the casing 2 (or another component operatively coupled to the casing 2). As will be discussed in further detail herein, when the bolt head 30 and/or latch tail 60 is pushed into the casing 2 (e.g., past the retracted position into an assembly position), the restraint member 830 may engage and/or further engage a portion of the casing 2 (or other like component operatively coupled to the casing 2), which moves the tail plate 80 while the restraint member 830 remains stationary. In this way, the restraint biasing member 840 is biased (e.g., the spring 842 is compressed, or the like) and the restraint member 830 moves from the activated position to the deactivated position. For example, the second portion 836 of the pin 832 is removed from the second catch aperture portion 818 of the one or more restraint catch apertures 816 of the catch 810. As such, the first portion 834 of the pin 832 slides into and/or within the first aperture portion 817, which allows the catch 810 to move from the disengaged position to the engaged position, as previously described herein.

As such, when installing or changing the orientation of the latch bolt 4 (e.g., the bolt head 30, the latch tail 60, or the like), as was previously discussed, should a retaining member 140 be utilized, the screw 148 is removed from the distal end **140*b* of the retaining member 140. The retaining member may then be lifted away from the case 2 such that the front edge 140*a* of the retaining member 140 may be removed from under the edge of the case 2. Removing the retaining member 140 may release tabs 47 of the anti-friction latch 40 from being secured to the case 2. It should be understood that with the retaining member 140 released and/or removed from the case 20 the catch 810 may be accessed, such as through apertures in the case 2, for example as shown in FIG. 34. It should be understood that in some embodiments a retaining member 140 is not utilized. For example, the catch 810 may be accessed directly through apertures in the case 2 without having to remove a retaining member 140**.

Figure 39:
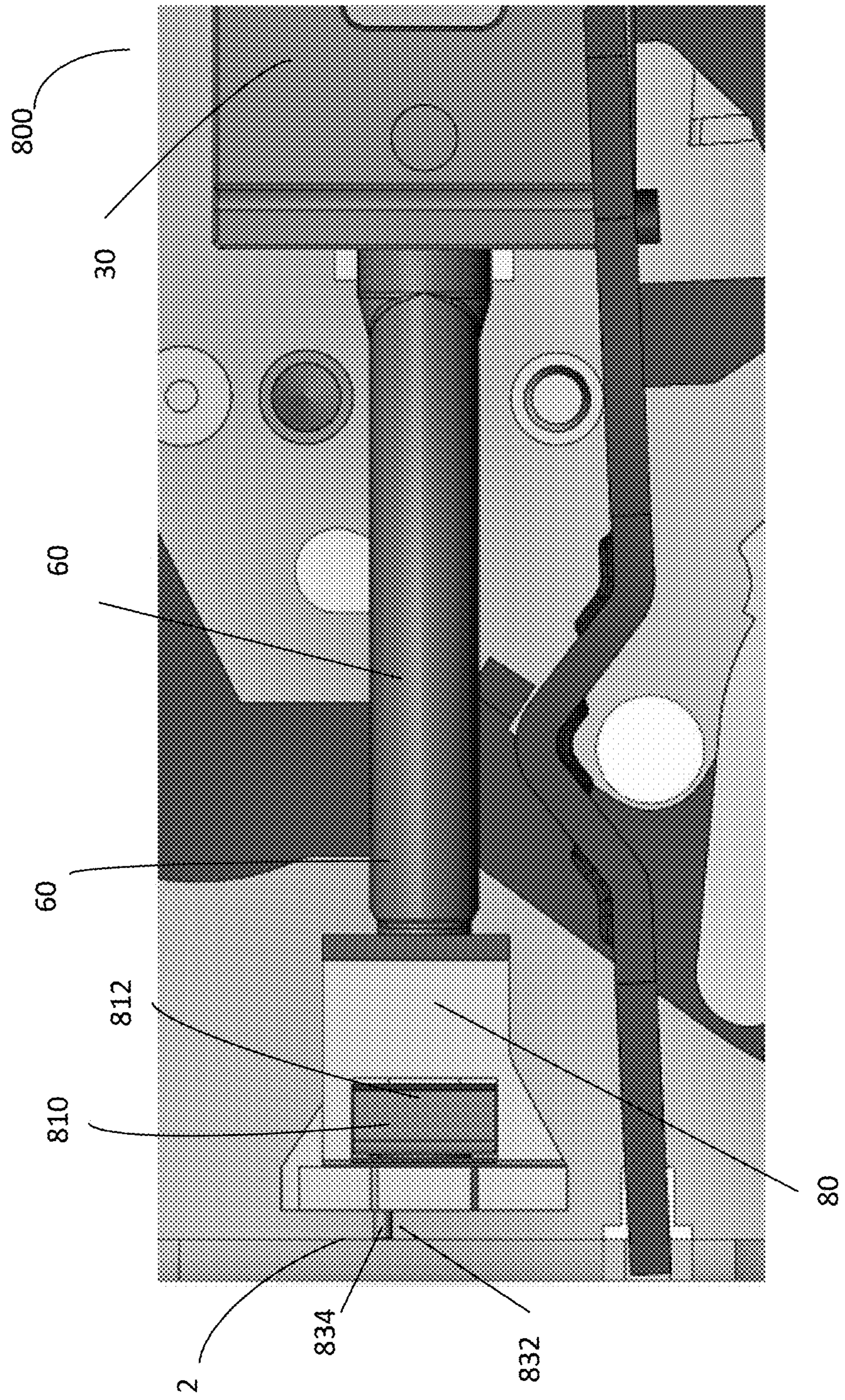
FIG. 39 is a side view of a portion of the mortise lock with the a portion of the housing removed according to embodiments of the present invention.

Moreover, as illustrated in FIGS. 34 to 39, the catch 810 may be disengaged (e.g., by overcoming the force of the catch biasing member 820) using a user's hand (e.g., using a finger to push the catch 810 through the case 2), using a tool (e.g., a screwdriver as illustrated in FIG. 34, or other like tool), a tool portion 150 of the retaining remember 140 as previously discussed herein, or the like. In response to disengaging the catch 810, the restraint member 830 (e.g., the pin 832) engages a portion of the catch 810. For example, the second pin portion 836 of the pin 832 engages with the second aperture portion 818 of the catch 810 when the catch is moved to the disengaged position (e.g., to keep the catch 810 in the disengaged portion). As previously discussed herein, as illustrated in FIG. 39, in this position the restraint member 830, such as the pin 832 may extend outside of the tail plate 80 (e.g., out of the back end of the tail plate 80). In some embodiments, the restraint member 830 may touch the interior of the casting 2, or a component attached thereto.

While the catch 810 is in the disengaged position, the bolt head 30 and/or latch tail 60 may be removed from the casing 2 and rotated to the alternate position (e.g., 180 degrees from the original position, or the like). The rotated bolt head 30 and/or latch tail 60 are re-inserted into the tail plate 80 through the casing 2. As the bolt head 30 and/or latch tail 60 engage the tail plate 80 and/or catch 810, and the bolt head 30 and/or latch tail 60 continue to move into the casing 2 (e.g., past the retracted position to an assembly position, or the like), the restraint member 830 may be deactivated. For example, the restraint member (e.g., pin 832) engages with the casing 2 (as illustrated in FIG. 39), as the tail plate 80 moves towards the rear wall 18 of the casing 2 and the restraint member 830 (e.g., pin 832) remains stationary. For example, restraint member 830 slides into the tail plate 80 (e.g., the tail plate restraint aperture 844), and the restraint biasing member 840 is biased (e.g., the spring 842 is compressed) until the restraint member 830 is deactivated from the catch 810. For example, the second portion 836 of the pin 832 may be deactivated (e.g., removed from) from the second catch aperture portion 818 of the catch 810. When the restraint member 830 is deactivated from the catch 810, the catch biasing member 820 (e.g., the one or more catch springs 822, or the like) may move the catch 810 from the disengaged position to the engaged position. That is, the catch 810 may be operatively coupled with the latch tail 60 when the catch 810 is moved to the engaged position. For example, the a tail lock 862 (e.g., channel, protrusions, keys, or the like) on the latch tail 60 is operatively coupled to the catch 810 through the catch lock 814, such as a tail aperture (e.g., a through-hole, or the like), channel, key, protrusion(s), or the like. In some embodiments, when the catch 810 is engaged with the latch tail 60, the restraint member 830 may be operatively coupled to the catch 810 in order to allow for future reversing of the latch 30, if needed. For example, the first portion 834 of the pin 832 may be located within the first catch aperture portion 817 of the catch 810 when the catch 810 is in the engaged position and the restraint member 830 is in the deactivated position.

Finally, if a retaining member 140 is used, the retaining member 140 may be operatively coupled back to the case 2, such as on the opposite side of the case wall, in order to secure the tabs 47 of the stub 46 of the anti-friction latch 40 back into the desired pivot location, as previously discussed herein.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A latch bolt comprising:

a latch tail:

a bolt head operatively coupled to the latch tail;

a tail plate operatively coupled to the latch tail; and a reversibility assembly, wherein the reversibility assembly comprises:

a catch operatively coupled to the tail plate;

a catch biasing member operatively coupled to the catch;

a restraint member operatively coupled to the catch; and a restraint biasing member operatively coupled to the restraint member;

wherein the catch is moveable between an engaged position and a disengaged position through the catch biasing member;

wherein the restraint member is moveable between an activated position and a deactivated position;

wherein when the catch is in the engaged position the restraint member is in the deactivated position and the latch tail is operatively coupled to the tail plate; and wherein when the catch is in the disengaged position the restraint member is in the activated position and the latch tail is removable from the tail plate.

2. The latch bolt of claim 1, wherein the catch comprises a catch lock and the latch tail comprises a tail lock, wherein the catch lock and the tail lock are locked when the catch is in the engaged position, and wherein the catch lock and the tail lock are unlocked when the catch is in the disengaged position.

3. The latch bolt of claim 1, wherein the restraint member comprises:

a first portion; and a second portion;

wherein the second portion has a width larger than the first portion;

wherein when the restraint member is activated with the catch in the disengaged position, the second portion is operatively coupled to a second aperture portion of the catch; and wherein when the restraint member is deactivated with the catch in the engaged position, the first portion is operatively coupled to a first aperture portion of the catch.

4. The latch bolt of claim 1, wherein the reversibility assembly further comprises:

a bolt head adjustment mechanism operatively coupled to the latch tail;

wherein the bolt head and the latch tail allow for reciprocating motion between an extended position and a retracted position; and wherein the bolt head adjustment mechanism allows for reversible assembly of the bolt head to the latch tail.

5. The latch bolt of claim 4, wherein the bolt head adjustment mechanism comprises one or more locking members operatively coupled to the bolt head or the latch tail, wherein the bolt head comprises a locking aperture and a latch tail aperture, and wherein the one or more locking members comprise:

a bolt head locking member; and a stub locking member operatively coupled to the latch tail;

wherein the latch tail is located within the latch tail aperture of the bolt head; and wherein the bolt head locking member is located within the locking aperture and is operatively coupled to the stub locking member of the latch tail; and wherein the bolt head locking member is removably operatively coupled to the bolt head.

6. The latch bolt of claim 5, wherein the bolt head locking member comprises a clip and a locking spring, wherein the clip is located within the locking aperture and is operatively coupled to the stub locking member of the latch tail, and wherein the locking spring is operatively coupled to the clip to secure the clip in the locking aperture of the bolt head.

7. The latch bolt of claim 5, wherein the bolt head locking member comprises a locking pin, wherein the locking pin is located within the locking aperture and is operatively coupled to the stub locking member of the latch tail.

8. The latch bolt of claim 5, wherein the bolt head locking member is releasably operatively coupled to the latch tail.

9. The latch bolt of claim 1, wherein the bolt head comprises:

a first flange;

a second flange;

an angular surface operatively coupling the first flange to the second flange and forming a slot there between; and an anti-friction latch comprising a sliding face and a strike engaging face;

wherein the anti-friction latch is located within the slot between the first flange and the second flange;

wherein the strike engaging face is configured to engage a strike plate or door frame as the bolt head is retracted and prevent the first flange and the second flange from contacting the strike plate or the door frame until a door is closed; and wherein the sliding face is configured to contact the angular surface as the bolt head is retracted and the strike engaging face is engaging the strike plate or the door frame.

10. A mortise lock comprising:

a case;

a retaining member; and a latch bolt comprising:

a latch tail;

a bolt head operatively coupled to the latch tail;

a tail plate operatively coupled to the latch tail; and a reversibility assembly, wherein the reversibility assembly comprises:

a catch operatively coupled to the tail plate;

a catch biasing member operatively coupled to the catch;

a restraint member operatively coupled to the catch; and a restraint biasing member operatively coupled to the restraint member;

wherein the catch is moveable between an engaged position and a disengaged position through the catch biasing member;

wherein the restraint member is moveable between an activated position and a deactivated position;

wherein when the catch is in the engaged position the restraint member is in the deactivated position and the latch tail is operatively coupled to the tail plate; and wherein when the catch is in the disengaged position the restraint member is in the activated position and the latch tail is removable from the tail plate.

11. The mortise lock of claim 10, wherein the reversibility assembly further comprises:

a bolt head adjustment mechanism operatively coupled to the latch tail;

wherein the bolt head and the latch tail allow for reciprocating motion between an extended position and a retracted position; and wherein the bolt head adjustment mechanism allows for reversible assembly of the bolt head to the latch tail.

12. The mortise lock of claim 11, wherein the bolt head adjustment mechanism of the latch bolt comprises one or more locking members operatively coupled to the bolt head or the latch tail, wherein the bolt head comprises a locking aperture and a latch tail aperture, and wherein the one or more locking members comprise:

a bolt head locking member; and a stub locking member operatively coupled to the latch tail;

wherein the latch tail is located within the latch tail aperture of the bolt head;

wherein the bolt head locking member is located within the locking aperture and is operatively coupled to the stub locking member of the latch tail; and wherein the bolt head locking member is removably operatively coupled to the bolt head.

13. The mortise lock of claim 10, wherein the catch comprises a catch lock and the latch tail comprises a tail lock, wherein the catch lock and the tail lock are locked when the catch is in the engaged position, and wherein the catch lock and the tail lock are unlocked when the catch is in the disengaged position.

14. The mortise lock of claim 10, wherein the restraint member comprises:

a first portion; and a second portion;

wherein the second portion has a width larger than the first portion;

wherein when the restraint member is activated with the catch in the disengaged position, the second portion is operatively coupled to a second aperture portion of the catch; and wherein when the restraint member is deactivated with the catch in the engaged position, the first portion is operatively coupled to a first aperture portion of the catch.

15. A method of reversing a latch bolt within a case of a mortise lock, wherein the latch bolt comprises a bolt head operatively coupled to a latch tail, wherein the latch tail is operatively coupled to a tail plate, and wherein the latch bolt further comprises a reversibility assembly, wherein the reversibility assembly comprises a catch operatively coupled to the tail plate, a catch biasing member operatively coupled to the catch, a restraint member operatively coupled to the catch, and a restraint biasing member operatively coupled to the restraint member, wherein the catch is moveable between an engaged position and a disengaged position through the catch biasing member, wherein the restraint member is moveable between an activated position and a deactivated position, wherein when the catch is in the engaged position the restraint member is in the deactivated position and the latch tail is operatively coupled to the tail plate, and wherein when the catch is in the disengaged position the restraint member is in the activated position and the latch tail is removable from the tail plate, and wherein the method comprises:

disengaging the latch tail from the tail plate, while the latch bolt is within a casing by disengaging the catch and activating the restraint member;

removing the bolt head or the latch tail from the case in a first position;

rotating the bolt head or the latch tail to a second position that is different from the first position;

inserting the bolt head or the latch tail into the case; and engaging the bolt head to the latch tail, or the latch tail to the tail plate, while the latch bolt is within the case.

16. The method of claim 15, wherein the catch comprises a catch lock and the latch tail comprises a tail lock, wherein the catch lock and the tail lock are locked when the catch is in the engaged position, and wherein the catch lock and the tail lock are unlocked when the catch is in the disengaged position.

17. The method of claim 15, wherein the restraint member comprises:

a first portion; and a second portion;

wherein the second portion has a width larger than the first portion;

wherein when the restraint member is activated with the catch in the disengaged position, the second portion is operatively coupled to a second aperture portion of the catch; and wherein when the restraint member is deactivated with the catch in the engaged position, the first portion is operatively coupled to a first aperture portion of the catch.

18. The method of claim 15, wherein the reversibility assembly further comprises:

a bolt head adjustment mechanism operatively coupled to the latch tail;

wherein the bolt head and the latch tail allow for reciprocating motion between an extended position and a retracted position; and wherein the bolt head adjustment mechanism allows for reversible assembly of the bolt head to the latch tail.

19. The method of claim 18, wherein the bolt head adjustment mechanism of the latch bolt comprises one or more locking members operatively coupled to the bolt head or the latch tail, wherein the bolt head comprises a locking aperture and a latch tail aperture, and wherein the one or more locking members comprise:

a bolt head locking member; and a stub locking member operatively coupled to the latch tail;

wherein the latch tail is located within the latch tail aperture of the bolt head;

wherein the bolt head locking member is located within the locking aperture and is operatively coupled to the stub locking member of the latch tail; and wherein the bolt head locking member is removably operatively coupled to the bolt head.

* * * * *